US012190742B2

(12) United States Patent
Benedek

(10) Patent No.: US 12,190,742 B2
(45) Date of Patent: Jan. 7, 2025

(54) FLIGHT MANAGEMENT APPARATUS, FLYING OBJECT, FLIGHT MANAGEMENT SYSTEM, DISTRIBUTED SYSTEM, FLIGHT MANAGEMENT METHOD, FLIGHT CONTROL METHOD AND PROGRAM

(71) Applicant: Aaron Sanjaya Benedek, Yokohama (JP)

(72) Inventor: Aaron Sanjaya Benedek, Yokohama (JP)

( * ) Notice: Subject to any disclaimer, the term of this patent is extended or adjusted under 35 U.S.C. 154(b) by 0 days.

(21) Appl. No.: 18/026,346

(22) PCT Filed: Oct. 27, 2021

(86) PCT No.: PCT/JP2021/039633

§ 371 (c)(1),
(2) Date: Mar. 14, 2023

(87) PCT Pub. No.: WO2022/092143

PCT Pub. Date: May 5, 2022

(65) Prior Publication Data

US 2023/0394981 A1 Dec. 7, 2023

Related U.S. Application Data

(63) Continuation-in-part of application No. PCT/JP2020/040323, filed on Oct. 27, 2020.

(51) Int. Cl.
*G08G 5/00* (2006.01)

(52) U.S. Cl.
CPC ........... *G08G 5/006* (2013.01); *G08G 5/0008* (2013.01); *G08G 5/0013* (2013.01); *G08G 5/0039* (2013.01)

(58) Field of Classification Search
CPC .... G08G 5/006; G08G 5/0008; G08G 5/0013; G08G 5/0039
See application file for complete search history.

(56) References Cited

U.S. PATENT DOCUMENTS 5,450,329 A * 9/1995 Tanner ................. G08G 5/0008 701/4
6,243,647 B1 * 6/2001 Berstis ................. G08G 5/0013 340/8.1

(Continued)

FOREIGN PATENT DOCUMENTS

JP 2000241191 A * 9/2000 ........... G01S 5/0072
JP 2019-066381 A 4/2019

(Continued)

OTHER PUBLICATIONS

Translation of JP-2000241191-A, 13 pages (Year: 2000).*

(Continued)

*Primary Examiner* — Dale W Hilgendorf
(74) *Attorney, Agent, or Firm* — Procopio, Cory, Hargreaves & Savitch LLP

(57) ABSTRACT

An object of the present disclosure is to provide a flight management apparatus capable of improving the safety of flying objects. In one example, a flight management apparatus (10) of the present disclosure includes a determination unit (12) configured to determine whether a specific space cell in a space is already reserved based on a reservation state about the specific space cell, when the flight management apparatus receives a request for permission to move to the specific space cell from a flying object; and a permission unit (13) configured to permit the movement to the specific space cell of the flying object when the determination unit determines the specific space cell is not reserved, and not to permit the movement to the specific space cell of the flying object when the determination unit determines the specific space cell is already reserved.

20 Claims, 53 Drawing Sheets

(56) References Cited

U.S. PATENT DOCUMENTS

| | | | | |
|---|---|---|---|---|
| 7,912,574 | B2 | 3/2011 | Wurman et al. | |
| 8,082,102 | B2 * | 12/2011 | Ravenscroft | G08G 5/0069 701/2 |
| 10,591,931 | B1 * | 3/2020 | Aggarwal | G05D 1/0297 |
| 11,537,149 | B2 * | 12/2022 | Sekiyama | G08G 5/0034 |
| 11,579,611 | B1 * | 2/2023 | Lopez | G08G 5/0034 |
| 2009/0210109 | A1 * | 8/2009 | Ravenscroft | G01C 21/20 701/25 |
| 2012/0303253 | A1 * | 11/2012 | Irfan | G08G 5/0082 701/120 |
| 2015/0323931 | A1 * | 11/2015 | Downey | G08G 5/0069 701/2 |
| 2016/0117931 | A1 * | 4/2016 | Chan | G08G 5/0043 701/120 |
| 2018/0253979 | A1 * | 9/2018 | Rey | G08G 5/0069 |
| 2018/0373270 | A1 * | 12/2018 | Lopez | G08G 5/0069 |
| 2020/0241573 | A1 * | 7/2020 | Sekiyama | G08G 5/0069 |
| 2020/0365037 | A1 * | 11/2020 | Yamada | G05D 1/102 |

FOREIGN PATENT DOCUMENTS

| | | |
|---|---|---|
| JP | 2019-121405 A | 7/2019 |
| KR | 2016-0082195 A | 7/2016 |

OTHER PUBLICATIONS

JPO, Office Action of Application Ser. No. JP2021-175337, dated Jan. 25, 2022.

JPO, Office Action of Application Ser. No. JP2021-175337, dated Jan. 25, 2022 (English translation).

JPO, Office Action of Application Ser. No. JP2021-175337, dated Apr. 19, 2022.

JPO, Office Action of Application Ser. No. JP2021-175337, dated Apr. 19, 2022 (English translation).

International Search Report (ISR) and Written Opinion relating to International Application No. PCT/JP2020/040323, dated Jan. 19, 2022.

International Search Report (ISR) relating to International Application No. PCT/JP2021/039633, dated Apr. 7, 2022.

First Examination Report issued on Feb. 1, 2024, in the counterpart foreign application AU 2021372108, 5 pages.

Second Examination Report issued on Jul. 25, 2024, in the counterpart foreign application AU 2021372108, 5 pages.

First Examination Report issued on Jul. 30, 2024 in the counterpart foreign application CA 3,191,275, 4 pages.

* cited by examiner

Replacement Sheet

FLIGHT MANAGEMENT APPARATUS, FLYING OBJECT, FLIGHT MANAGEMENT SYSTEM, DISTRIBUTED SYSTEM, FLIGHT MANAGEMENT METHOD, FLIGHT CONTROL METHOD AND PROGRAM

CROSS REFERENCE TO PRIOR APPLICATION(S)

This application is a U.S. National Stage Patent Application, under 35 U.S.C. § 371, of PCT International Patent Application Ser. No. PCT/JP2021/039633 (filed on Oct. 27, 2021), which is a continuation-in-part application that claims the benefit, under 35 U.S.C. § 120, of international patent application Ser. No. PCT/JP2020/040323 (filed on Oct. 27, 2020), all of which are hereby incorporated by reference herein in their entireties.

TECHNICAL FIELD

The present disclosure relates to a flight management apparatus, a flying object, a flight management system, a distributed system, a flight management method, a flight control method and a program.

BACKGROUND ART

Recently, technologies related to aircraft such as drones and flying cars have been developed. For example, PTL 1 discloses that a route control apparatus can determine a mobile unit's route denoted by blocks, which are divided spaces. In detail, if there is a block common to the movement paths of a plurality of mobile units, the apparatus changes the movement path of one of the mobile units so as not to let the mobile unit to pass through the common block in the same time zone. In this way, the apparatus generates the movement path of the mobile units.

As other related technology, PTL 2 discloses that when management module receives a reservation request for a destination segment from mobile drive unit, it reserves the segment for the mobile drive unit. Because of this procedure of reservation, the management module prevents the mobile drive units from crashing into each other.

In addition, PTL 3 discloses that a central station can reserve destination zone for a mobile drive unit and act as a space allocator.

CITATION LIST

Patent Literature

PTL 1: JP 2019-066381A
PTL 2: U.S. Pat. No. 7,912,574 B2
PTL 3: U.S. Pat. No. 10,591,931 B1

SUMMARY OF INVENTION

Technical Problem

Flying objects, such as flying cars or drones, could have to turn or make an emergency landing during flight. In such a case, it is desirable to provide a control method for guiding the flying object so that it can maintain a distance from other flying objects and fly safely.

An object of the present disclosure is to provide a flight management apparatus, a flying object, a flight management system, a distributed system, a flight management method, a flight control method and a program capable of improving the safety of flying objects.

Solution to Problem

In a first example aspect, a flight management apparatus includes:

- a receiving unit configured to receive, from one of a plurality of flying objects, request for permission to move to a specific space cell in a space on a flight route of the one flying object determined by the one flying object;
- a determination unit configured to determine whether the specific space cell is already reserved for another flying object of the plurality of flying objects based on a reservation state about the specific space cell, when the receiving unit receives the request; and
- a permission unit configured to permit the movement to the specific space cell of the one flying object when the determination unit determines the specific space cell is not reserved for another flying object, and not to permit the movement to the specific space cell of the one flying object when the determination unit determines the specific space cell is already reserved for another flying object.

In a second example aspect, a flying object includes:

- a request generation unit configured to determine own flight route and generate a request for permission to move to a specific space cell on the flight route in a space;
- a transmission unit configured to transmit the request, generated by the request generation unit, to a flight management apparatus; and
- a flight control unit configured to move an airframe to the specific space cell when the specific space cell is not reserved by another flying object and the flying object receives permission information permitting movement to the specific space cell from the flight management apparatus, and not to move the airframe to the specific space cell when the specific space cell is already reserved by another flying object and the flying object receives non-permission information not permitting the movement to the specific space cell from the flight management apparatus, wherein
- the request generation unit updates the flight route based on the non-permission information received from the flight management apparatus.

In a third example aspect, a flight management system includes:

- a plurality of flying objects; and
- a flight management apparatus for managing the plurality of flying objects, wherein each of the plurality of flying objects includes:

- a request generation unit configured to determine own flight route and generate a request for permission to move to a specific space cell on the flight route in a space;
- a request transmission unit configured to transmit the request, generated by the request generation unit, to the flight management apparatus; and wherein the flight management apparatus includes:

- a receiving unit configured to receive the request from one of the plurality of flying objects;
- a determination unit configured to determine whether the specific space cell is already reserved for another flying object of the plurality of flying objects based on a reservation state about the specific space cell, when the receiving unit receives the request; and a permission unit configured to permit the movement to the specific space cell of the one flying object when the determination unit determines the specific space cell is not reserved for another flying object and not to permit the movement to the specific space cell of the one flying object when the determination unit determines the specific space cell is already reserved for another flying object.

In a fourth example aspect, the distributed system includes:

a plurality of flying objects;

wherein each of the plurality of flying objects includes a communication unit configured to communicate with other flying objects using a peer-to-peer communication system to form the distributed system including the flying object itself and the other flying objects, and an adjudication unit configured to cause the communication unit to transmit its own vote with a predetermined weighting for a specific space cell in a space to the other flying objects; and the adjudication unit of the flying object which transmitted the heaviest weighted vote executes an adjudication of which flying object the specific space cell is to be allocated.

In a fifth example aspect, a flight management method includes:

receiving, from one of a plurality of flying objects, a request for permission to move to a specific space cell in a space on a flight route of the one flying object determined by the one flying object;

determining whether the specific space cell is already reserved for another flying object of the plurality of flying objects based on a reservation state about the specific space cell; and permitting the movement to the specific space cell of the one flying object when determining the specific space cell is not reserved for another flying object and not permitting the movement to the specific space cell of the one flying object when determining the specific space cell is already reserved for another flying object.

In a sixth example aspect, a flight control method includes:

determining own flight route, generating a request for permission to move to a specific space cell on the flight route in a space;

transmitting the request to a flight management apparatus;

moving an airframe to the specific space cell when the specific space cell is not reserved by another flying object and the flying object receives permission information permitting movement to the specific space cell from the flight management apparatus, and not moving the airframe to the specific space cell when the specific space cell is already reserved by another flying object and the flying object receives non-permission information not permitting the movement to the specific space cell from the flight management apparatus; and updating the flight route based on the non-permission information received from the flight management apparatus.

In a seventh example aspect, a program for causing a computer to execute:

receiving, from one of a plurality of flying objects, a request for permission to move to a specific space cell in a space on a flight route of the one flying object determined by the one flying object;

determining whether the specific space cell is already reserved for another flying object of the plurality of flying objects based on a reservation state about the specific space cell; and permitting the movement to the specific space cell of the one flying object when determining the specific space cell is not reserved for another flying object and not permitting the movement to the specific space cell of the one flying object when determining the specific space cell is already reserved for another flying object.

In an eighth example aspect, a program for causing a computer to execute:

determining own flight route, generating a request for permission to move to a specific space cell on the flight route in a space;

transmitting the request to a flight management apparatus;

moving an airframe to the specific space cell when the specific space cell is not reserved by another flying object and receiving permission information permitting movement to the specific space cell from the flight management apparatus, and not moving the airframe to the specific space cell when the specific space cell is already reserved by another flying object and receiving non-permission information not permitting the movement to the specific space cell from the flight management apparatus; and updating the flight route based on the non-permission information received from the flight management apparatus.

Advantageous Effects of Invention

According to the present disclosure, it is possible to provide a flight management apparatus, a flying object, a flight management system, a distributed system, a flight management method, a flight control method and a program capable of improving the safety of flying objects.

DESCRIPTION OF EMBODIMENTS

First Example Embodiment (1-1)

A first example embodiment of the disclosure is explained below referring to Figures.

Figure 1:
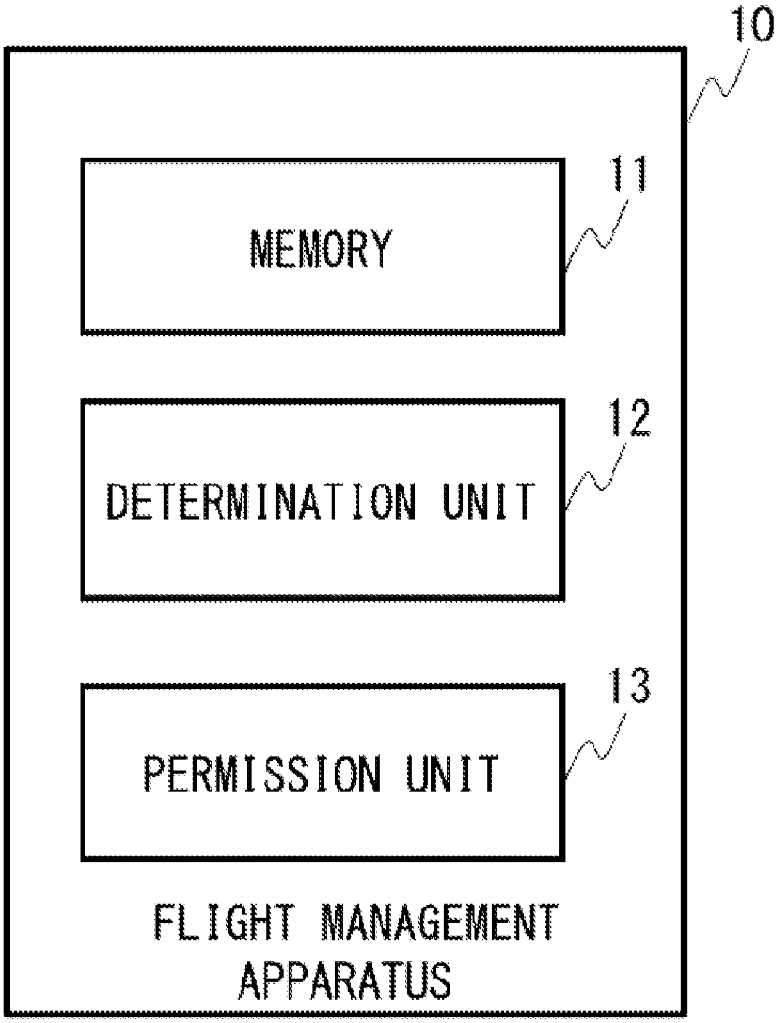
FIG. 1 is a block diagram of a flight management apparatus 10 of a first example embodiment.

FIG. 1 is a block diagram of a flight management apparatus 10. The flight management apparatus 10 comprises a memory 11, a determination unit 12 and a permission unit 13. The flight management apparatus 10 may comprise a general computer and be applied as controller devices, traffic management apparatus, etc. The details of each unit of the flight management apparatus 10 will be described below.

The memory 11 stores a reservation state about space cells of flying objects, the space cells being divided spaces. The flying objects are managed by the flight management apparatus 10 and fly in the space cells. Flying objects are any flyable devices, such as drones, flying cars, or airplanes.

Figure 2:
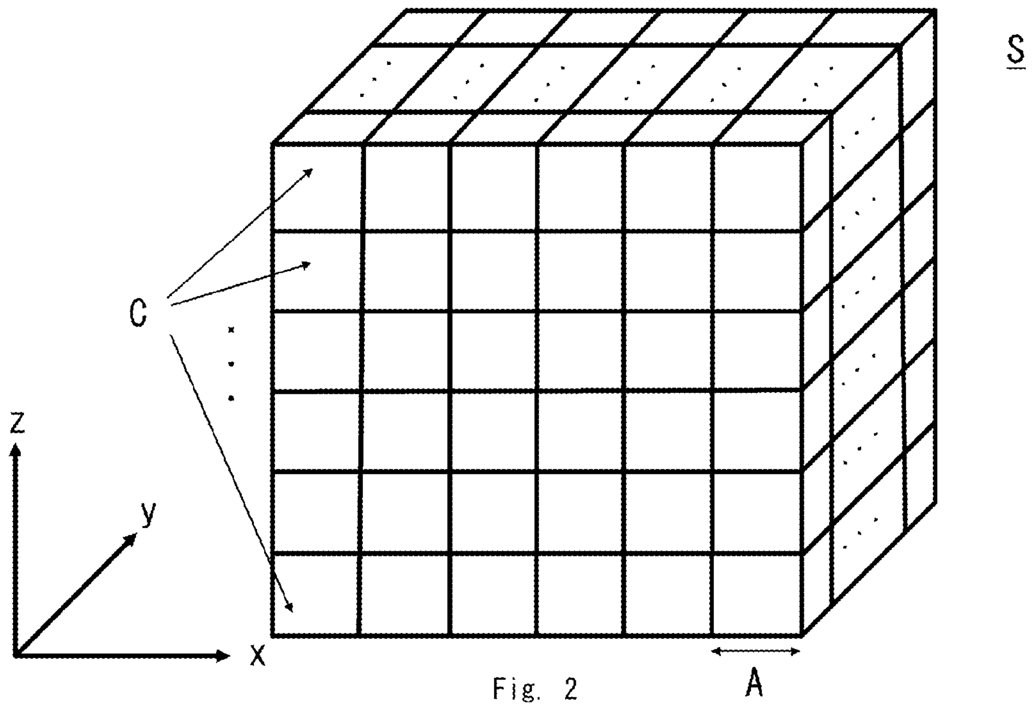
FIG. 2 is a schematic diagram of the space cells of the first example embodiment.

FIG. 2 is a schematic diagram of the space cells which are divided spaces. The space S is divided into a plurality of space cells C having a cube shape whose one side is length A in order to manage the flight of the flying objects. Each space cell C is adjacent to another space cell C in six directions of the three-dimensional space. In order for the flight management apparatus 10 to recognize the position of the flying objects, each space cell C is set continuously with another space cell C. The flying object 60 flies in the space S by moving from one space cell C to an adjacent space cell C whose surface faces the space cell C. Here, the reservation of one flying object is permitted for one space cell C. That is, one flying object is permitted to fly one space cell C.

The reservation state of the space cells C includes at least position information of the space cells C to be reserved. In addition, the reserved space cell C means that a flying object is flying at present or is going to fly in the future in the space cell C, for example. However, the space cell C may be reserved for an object other than the flying object.

The flight management apparatus 10 can specify each space cell C by spatial coordinates, for example. Further, when there is an area that cannot be flown because a building or the like exists in the space S, the flight management apparatus 10 may store the area in the memory 11 as a non-flyable area. The non-flyable area may be, for example, space cell(s) entirely or partially occupied by a building or classified as a "no-fly zone" or the like, or may further include a space cell (For example, adjacent space cells) in the vicinity of such a space cell.

In FIG. 2, the space S is divided into six equal parts in the x direction, the y direction, and the z direction by the space cell C, but the method of dividing the space S in each direction is not limited to this one. The length A of the side of the space cell C may be constant, or the flight management apparatus 10 may change the length A depending on the situation as described later. The space cell C may be a rectangular parallelepiped, a sphere, or other three-dimensional figure, instead of a cubic shape, as long as it fills the space S.

Referring back to FIG. 1, the description will be continued. The determination unit 12 determines whether a specific space cell is already reserved using the reservation state stored by the memory 11, when the flight management apparatus receives a request for permission for another of the flying objects to move to the specific space cell. When another flying object is flying through the specific space cell or moving toward the specific space cell, the specific space cell is already reserved.

The permission unit 13 permits the movement to the specific space of the flying object when the determination unit 12 determines the specific space cell is not reserved. This is because when the specific space cell is not reserved, even if the flying object moves to the specific space cell, it is considered that the flying object does not come into contact with another flying object. However, the permission unit 13 does not permit the movement to the specific space of the flying object when the determination unit 12 determines the specific space cell is reserved. This is because when the specific space cell is reserved, when the flying object moves to the specific space cell, it may come in contact with another flying object.

Figure 3:
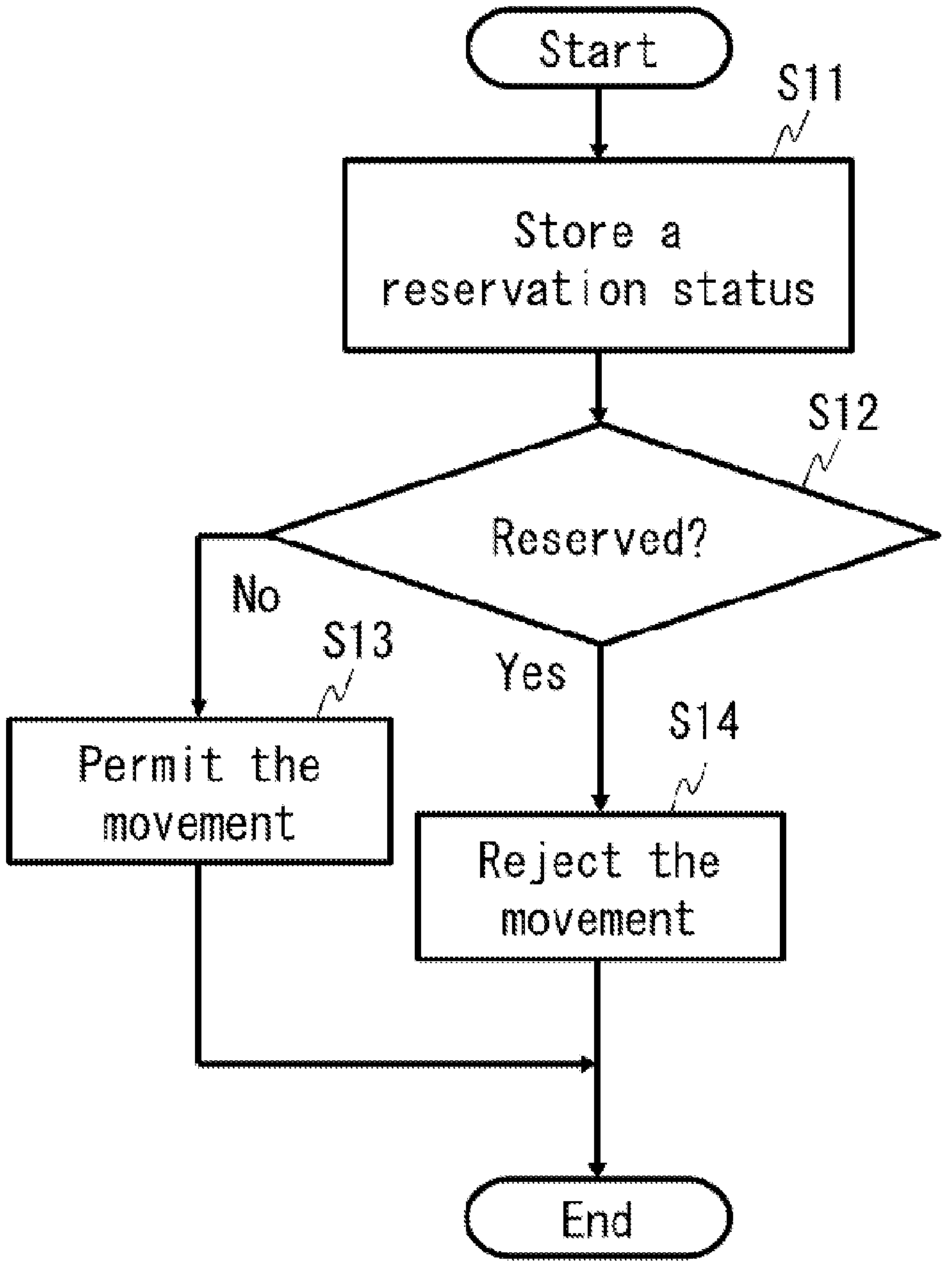
FIG. 3 is a flowchart showing a method executed by the flight management apparatus 10 of the first example embodiment.

FIG. 3 is a flowchart showing a flight management method executed by the flight management apparatus 10. The method executed by flight management apparatus 10 will be described below with reference to FIG. 3.

First, the flight management apparatus 10 causes the memory 11 to store the reservation state of the space cells in the space cells C (Step S11). One example method is, the flight management apparatus 10 may store the reservation state by deciding that the space cell(s) requested by the flying objects are reserved and the other space cell(s) are not reserved. Instead of or in combination with this method, the flight management apparatus 10 may store the reservation state by deciding that the space cell(s) in which the flying objects cannot fly are a reserved cell and the other space cell(s) are unreserved. "The space cell(s) in which the flying objects cannot fly" may include, but are not limited to, areas where the flight is restricted due to the presence of buildings, areas where the flight of general flying objects is restricted due to the assumed passage of emergency flying objects, etc.

Next, the determination unit 12 determines whether a specific space cell is already reserved using the reservation state stored by the memory 11, when the flight management apparatus receives a request for permission for the flying object to move to the specific space cell (Step S12). For example, the flying objects and the flight management apparatus 10 may recognize the space cells in a common coordinate system. When the flying object transmits coordinates of the specific space cell as a reservation object to the flight management apparatus 10, the flight management apparatus 10 recognizes the specific space cell as a determination object based on the transmitted coordinates.

Then, when the determination unit 12 determines the specific space cell is not reserved (No at Step S12), the permission unit 13 permits the movement to the specific space of the flying object (Step S13). In this case, the flight management apparatus 10 can transmit the permission information for permitting the movement to the flying object that has transmitted the request. The flight management apparatus 10 may transmit the permission information using a communication circuit (not shown), for example.

On the other hand, when the determination unit 12 determines the specific space cell is reserved (Yes at Step S12), reject the movement of the flying object to the specific space cell without permitting it (Step S14).

At Step S13, the flight management apparatus 10 can transmit the permission information for permitting the movement to the flying object that has transmitted the request. Similarly, at Step S14, the flight management apparatus 10 can transmit the rejection information for rejecting the movement to the flying object that has transmitted the request. The flight management apparatus 10 may transmit the permission or rejection information using a communication circuit (not shown), for example.

As described above, in response to a request from the flying object, the flight management apparatus 10 can permit or reject the movement to the space cell where the flying object is to fly. For example, even if the flying object changes direction during the flight or makes an emergency landing, the flight management apparatus 10 can reject the movement of the flying object if the space cell in which the flying object is hurriedly moved is reserved. Therefore, since the flying object is prevented from approaching other flying objects, it can fly safely.

It should be noted that the determination unit 12 may determine whether or not the specific space cell falls into the non-flyable area in parallel with the processing of step S12, or before and after the process of step S12. When the specific space cell corresponds to the non-flight area, the permission unit 13 does not permit the movement of the flying object to the specific space cell and rejects it. Therefore, since the flying object is prevented from approaching buildings, it can fly safely.

The reservation state may indicate whether all the space cells in the space S are reserved or not, or may indicate whether a part of the space including the space cell requested by the flying object is reserved or not. Further, the reservation state may be input to the flight management apparatus 10 from the outside instead of the memory 11 of the flight management apparatus 10.

(1-2)

Figure 4:
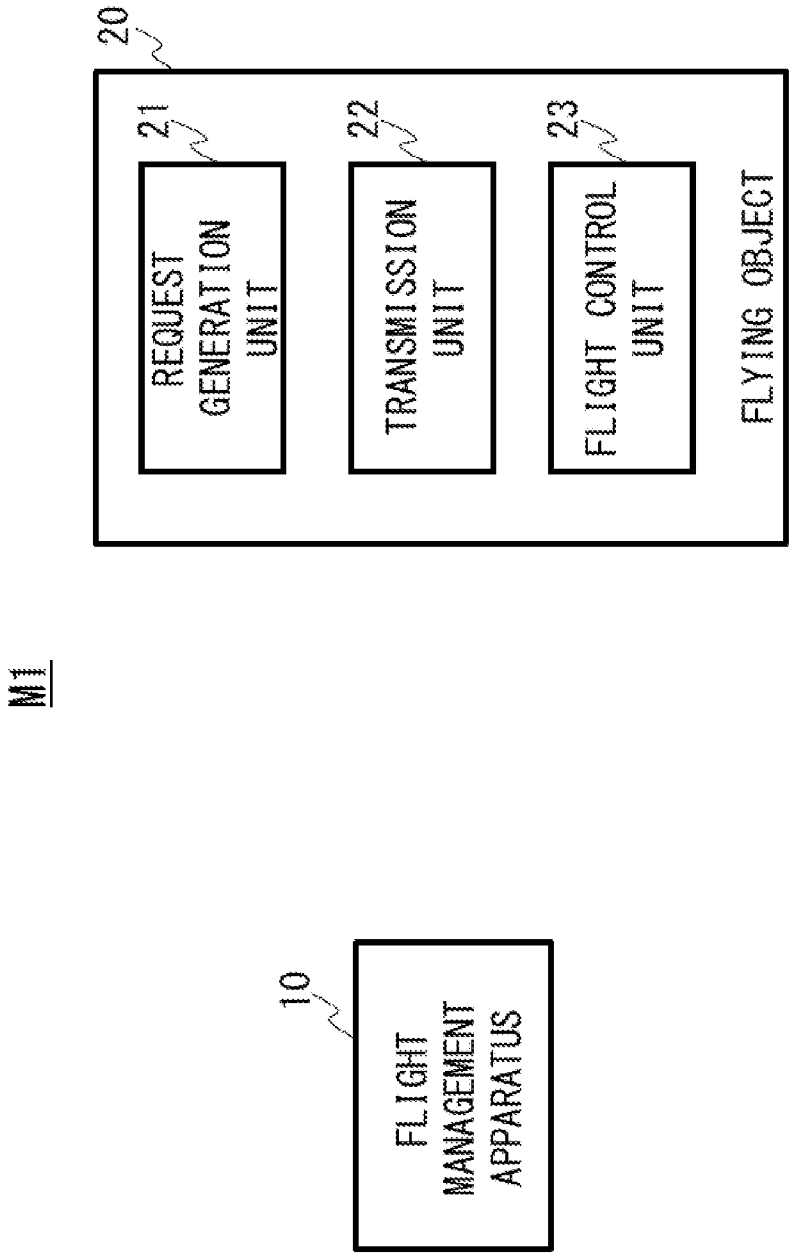
FIG. 4 is a block diagram of a flight management system M1 of the first example embodiment.

Here, a flight management system of a first example embodiment will be described. FIG. 4 is a block diagram of a flight management system M1. The flight management system M1 includes the flight management apparatus 10 and a plurality of flying objects 20. Since the configuration of the flight management apparatus 10 is as described above, a description thereof will be omitted.

Each of flying objects 20 is provided with a request generation unit 21, a transmission unit 22, and fight control unit 23. The plurality of flying objects 20 are registered in advance in the flight management apparatus 10 by an operator, for example, so that communication with the flight management apparatus 10 can be executed. It should be noted that the flying object 20 includes an engine part for flying, or a buoyancy generating part such as a propeller as appropriate, but will not be described in detail here. The communication between the flight management apparatus 10 and the flying objects 20 can be performed by, for example, a dedicated protocol.

The request generation unit 21 generates the request for requesting permission to move to a specific space cell in a plurality of space cells. The "specific space cell" may be a space cell adjacent to the space cell in which the flying object 20 is currently flying, or may not be a space cell adjacent to the space cell in which the flying object is currently flying.

The transmission unit 22, which is capable of communicating with the flight management apparatus 10, transmits the request generated by the request generation unit 21. The flying object 20 may determine a space cell as the next destination during normal flight, and may transmit the request for permission to move to the space cell using the transmission unit 22. Alternatively, the flying object 20 may recognize that an exceptional situation has occurred, and may transmit the request for permission of movement to another space cell instead of the space cell of the scheduled route by using the transmission unit 22.

Upon receiving the request from the flying object 20, the flight management apparatus 10 uses the reservation state stored in the memory 11 to determine whether the specific space cell has already been reserved. Then it permits or rejects the movement of the flying object to the space cell on the basis of the reservation state. The details are as described above.

In response to the request, the flight control unit 23 moves the airframe of the flying object 20 to the specific space cell when the flying object 20 receives the permission information permitting movement to the specific space cell from the flight management apparatus 10. However, the flight control unit 23 does not move the airframe to the specific space cell when the flying object 20 receives rejection information that does not permit movement to the specific space cell. The flight control unit 23 moves the airframe by controlling the engine unit and the like.

As the flying object 20 executes such a flight control method, the flying object 20 can safely fly. Note that the space cell to which the flying objects 20 request may be 1 or a plurality of space cells.

Second Example Embodiment (2-1)

A second example embodiment of the disclosure is explained below referring to Figures. In the second embodiment, an example embodiment in which the flight management apparatus or the flying object determines the flight route of the flying object according to various situations will be described. The flight route is information indicating which space cell C the flying object flies at and when, and is expressed by a combination of position information and time information.

Figure 5:
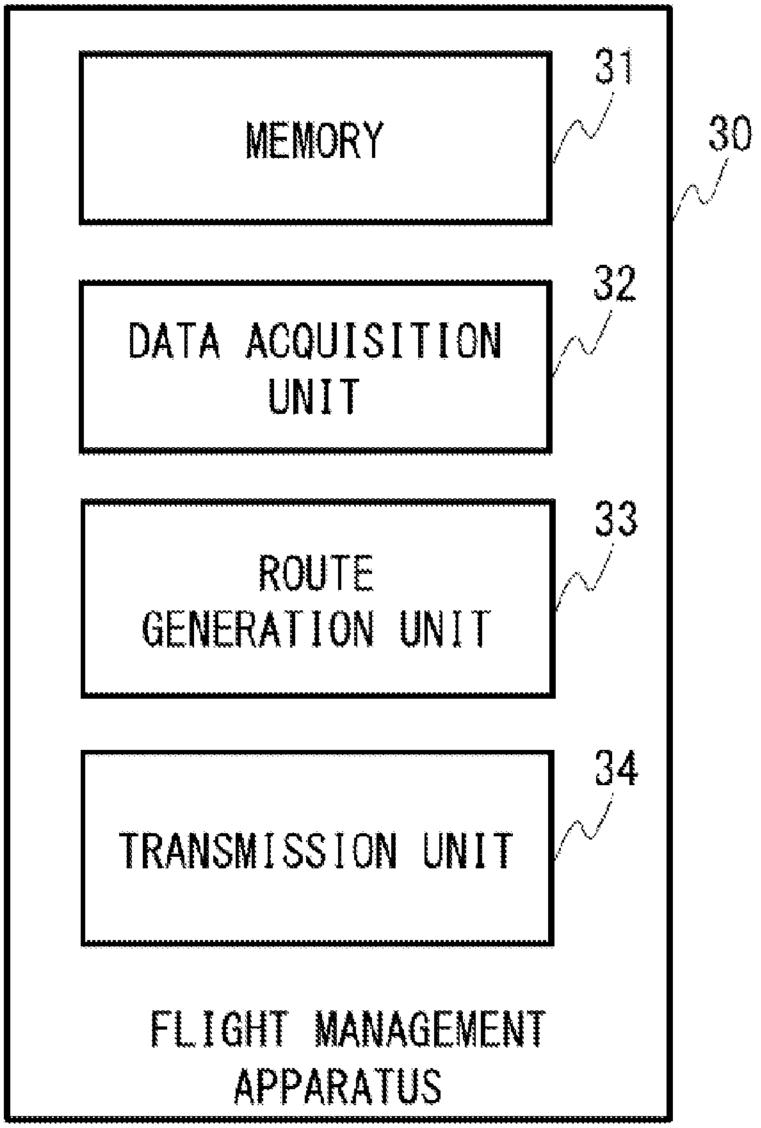
FIG. 5 is a block diagram of a flight management apparatus 30 of a second example embodiment.

FIG. 5 is a block diagram of a flight management apparatus 30. The flight management apparatus 30 comprises a memory 31, a data acquisition unit 32, a route generation unit 33 and a transmission unit 34.

The memory 31 stores a plurality of space cells C for dividing the space S to be managed by the flight management apparatus 30 in a form that can be specified by coordinates or the like. In addition, the memory 31 may store the flight routes of the respective flying objects generated by the route generation unit 33. Further, when there is an area that cannot be flown because a building or the like exists in the space S, the flight management apparatus 30 may store the area in the memory 31 as a non-flyable area.

In addition, the memory 31 may store the reservation state of the space cells of a plurality of flying objects as in the memory 11. The reservation state stored here may include not only the position information of the space cells C to be reserved but also information of the time zone in which the space cells C are reserved.

The data acquisition unit 32 acquires data used for determining the flight route of the flying objects, and is constituted by a communication unit for executing communication with the flying objects or the external network, for example. The data to be acquired include the departure point and the destination of the flight route, and at least one of the following: a remaining amount of the resources necessary for the flight of the flying object, priority of the flying object, and the weather between the departure point and the destination. The remaining amount of the resources necessary for the flight of the flying objects will be described below as the remaining amount of the battery, but other items such as the remaining amount of the fuel may be used. In addition, although the data acquisition unit 32 can acquire the identification information of the flying object and the position information of the flying object by the satellite positioning system such as GPS (Global Positioning System), the information that can be acquired by the data acquisition unit 32 is not limited to these. The data acquisition unit 32 can acquire telemetry data relating to the main body of the flying object and the internal equipment of the flying object such as the remaining battery level by communication from the flying object.

For example, the data acquisition unit 32 acquires the information on the departure point and the destination of the itinerary, the remaining battery level, and the priority of the flying object from the flying object to be determined in the flight route before taking off from the departure point. Further, the data acquisition unit 32 may periodically or intermittently acquire real-time data including the remaining battery level, current speed and the like from the flying object during the flight. The weather between the departure point and the destination can be obtained by communication with an external network.

The priority of the flying object indicates the following meanings. For example, if the priority of one flying object is "high" and the priority of another flying object is "low", and the flight route of the one flying object overlaps with the flight route of another flying object, the one flying object can fly with priority (e.g., chronologically first) over another flying object at least in the overlapped section. However, if the priority of the one flying object is "low", the one flying object cannot fly in preference to another flying object (for example, chronologically first). The priority, as described below, is a property of the flying object which may be used to determine allocation status for a specific space cell, the number of space cells which may be allocated, etc. A flying object having priority of "high" is a flying object used for emergency or important purposes such as police, fire fighting, emergency, etc., and a flying object having priority of "low" is a flying object generally used. Further, the flight management apparatus 30 may set the priority of the flying object 40 whose battery remaining amount is less than a predetermined value to "high" and the priority of the other flying object 40 to "low".

The route generation unit 33 is a navigation unit that determines the flight route of each flying object by using the information stored in the memory 31 and the data acquired by the data acquisition unit 32. Ideally, the flight route of each flying object should be such that the space cells other than the non-fly zone are connected at the shortest distance from the departure point to the destination of each flying object. However, for safety reasons, it is preferable that the flight route of each flying object be set so as not to be close to the flight route of other flying objects. In other words, near misses are preferably prevented. Here, "near miss" may mean that two flying objects are closer than a predetermined distance, or that two flying objects exist at the same timing with respect to a predetermined space cell. The route generation unit 33 may generate a flight route by using the flight route of another flying object already generated and stored in the memory 31 so that the flight route of the flying object does not become a near miss.

The route generation unit 33 may generate a flight route of the flying object by using the reservation state of the space cell C stored in the memory 31 so that other flying objects do not overlap the reserved space cell. Note that the fact that the flight route does not overlap with the reserved space cell may mean, for example, that the flight route does not pass through the reserved space cell.

Further, when the information of the time zone in which the space cell C is reserved is included in the stored reservation state, the route generation unit 33 may generate the flight route so as to avoid the time zone in which the flight route is reserved in the space cell when the flight route passes through the reserved space cell. In order to ensure the safety of the flying object, it is preferable to set a margin time between a time zone in which the flight route passes through the reserved space cell and a time zone in which the space cell is reserved.

In addition, it may be desirable to set a route other than the shortest distance depending on the conditions such as the battery level of the flying object and the weather. For example, if it is predicted that the battery consumption in another flight route is smaller than that in the shortest flight route, the route generation unit 33 can set the former flight route. For example, when the remaining battery of the flying object is less than a predetermined value, the route generation unit 33 may calculate the battery consumption of each of the candidate flight routes and select the flight route with the lowest battery consumption. The route generation unit 33 may estimate the battery consumption by using the flyable area other than the non-flyable area of the space S stored in the memory 31 and the weather information between the departure point and the destination (For example, information on the presence or absence of rainfall, wind velocity, and wind direction).

Also, depending on the weather, it is assumed that the time required from the departure point to the destination on another flight route may be shorter than that on the shortest flight route. In such a case as well, the route generation unit 33 can set the former flight route.

Further, when there is a building, such as a building, between the departure point and the destination, and the wind that causes an obstacle to flight may occur, the route generation unit 33 may derive a route for avoiding the wind generated by the building or a route for avoiding the wind by the building in consideration of the influence of the building.

Further, the above-described flight route generation method can be changed depending on whether the priority of the flying object is high or low. When the priority of the flying object to be the flight route generation is "high", the route generation unit 33 can set the derived flight route as the flight route of the flying object regardless of the flight route or the reservation state of other flying objects having the priority "low", if any one of the flight route having the shortest distance, the flight route having the lowest battery consumption, and the flight route having the shortest required time is derived. That is, the flight route of the flying object having the priority "high" can be set in preference to the flight route of the flying objects having the priority "low".

In this case, the route generation unit 33 re-sets the flight route for the flying object of the priority "low" and its flight route becomes near miss with the set flight route. Further, regarding the flying object of the low priority, the route generation unit 33 cancels the reservation of the space cell which becomes a near miss position. In the case where the derived flight route is a near-miss with the flight route of the flying object having the already set priority "high", the route generation unit 33 changes the derived flight route so as not to cause the near-miss.

The route generation unit 33 can generate the flight route of each flying object by using one or more pieces of information among the already generated flight route of the flying object, the reservation state of the space cell C, the remaining battery of the flying object, weather information, and the priority of the flying object. The transmission unit 34 transmits the information of the generated flight route to the flying object. The flying object flies from the departure point to the destination using the transmitted flight route. The flight route generated by the route generation unit 33 is stored in the memory 31.

The flight management apparatus 30 may generate or update a flight route to the present position and the destination not only in a state where the flying object whose flight route is to be generated stops on the ground, but also during a flight. For example, the flying object is provided with a sensor capable of measuring rainfall or wind velocity and wind direction information, and the flight management apparatus 30 acquires information obtained from the sensor via the communication unit of the flying object. The flying object may also transmit its own remaining battery level to the flight management apparatus 30.

The route generation unit 33 of the flight management apparatus 30 can generate or update the flight route of each flying object by using one or more pieces of information among the already generated flight route of the flying object, the reservation state of the space cell C, the remaining battery of the flying object, weather information, and the priority of the flying object. The flight route generated or updated here may be, for example, one in which the battery consumption or required time from the present position of the flying object to the destination is the shortest. Also, even if at least either the flight routes of other flying objects stored in the memory 31 or the reservation state of the space cell C is updated and the flight route of the object flying object becomes a near-miss, the flight management apparatus 30 can update the flight route.

(2-2)

Figure 6:
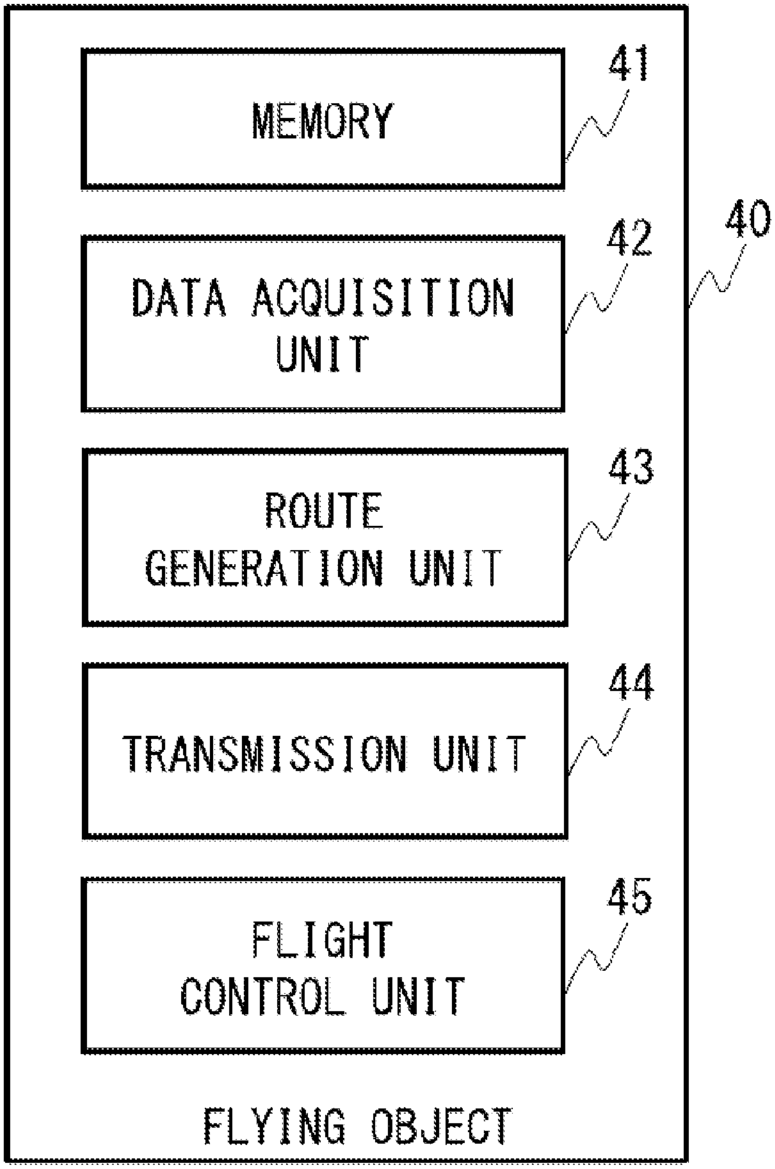
FIG. 6 is a block diagram of a flying object 40 of the second example embodiment.

Here, an example will be described in which the flying object, not the flight management apparatus, generates its own flight route. FIG. 6 is a block diagram of the flying object 40. The flying object 40 includes a memory 41, a data acquisition unit 42, a route generation unit 43, a transmission unit 44, and a flight control unit 45.

The memory 41 stores a plurality of space cells C for dividing the space S in which the flying object flies in a form that can be specified by coordinates or the like. Further, when a building or the like exists in the space S and an area that cannot be flown is generated, the flight management apparatus 30 may store the area in the memory 31 as a non-flyable area. Further, the memory 41 may store the remaining amount of resources necessary for the flight of the flying object and the priority of the flying object 40.

The data acquisition unit 42 acquires data used for determining the flight route of the flying object, and includes, for example, at least 1 of a sensor, an input unit, a communication unit for executing communication with an external network, and the like. For example, the data acquisition unit 42 can acquire weather information between a departure point and a destination point by detection by a sensor or communication with an external network. The data acquisition unit 42 can acquire telemetry data relating to the main body of the flying object and the internal equipment thereof, such as the remaining battery level, from the sensor of the flying object 40. The data acquisition unit 42 may acquire information such as the priority of the flying object 40 from the memory 41. Further, when the flying object 40 is a vehicle on which a person can board, the user inputs the information on the departure point and the destination of the flight route into the flying object 40 and the flying object 40 can acquire the information.

Further, the data acquisition unit 42 may acquire at least one of the flight routes of other flying objects and the reservation state of the space cells of other flying objects stored in the flight management apparatus by communication with the flight management apparatus.

The route generation unit 43 is a navigation unit that uses information stored in the memory 41 and data acquired by the data acquisition unit 42 to determine the flight route of the flying object 40. Since the details of the determination method are as described in (2-1), the description thereof is omitted.

The transmission unit 44 transmits the information of the flight route generated by the route generation unit 43 to the flight management apparatus. The flight management apparatus stores the information of the flight route in its storage unit. The flight control unit 45 controls the movement of the airframe of the flying object 40 in the same manner as the flight control unit 23.

In addition, the flying object 40 may generate or update a flight route to a destination not only in a state where the flying object whose flight route is to be generated stops on the ground, but also during flight. For example, the flying object 40 is provided with a sensor capable of measuring rainfall or wind velocity and wind direction information, and the flying object 40 may acquire weather information from the sensor during flight. Further, when at least either a flight route of another flying object or the reservation state of the space cell C stored in the memory unit of the flight management apparatus is updated and the flight route of the flying object 40 becomes a near miss, the flight management apparatus transmits information indicating the fact to the flying object 40. The flying object 40 receives the information from the flight management apparatus and can update its own flight route based on the received information.

As described above, the flight management apparatus 30 or the flying object 40 can set the flight route of the flying object according to information such as weather, the reservation state of the space cell, and the like. Therefore, the flight management apparatus 30 or the flying object 40 can set the optimal flight route with respect to safety, required time, battery consumption, and the like.

It should be noted that the flying object may transmit a request for permission to move to the space cell C on the set flight route to the flight management apparatus as shown in (1-2). The flight management apparatus determines permission or non-permission of movement to the space cell according to the request. The configuration and processing of the flight management apparatus for executing this determination are as described in the first example embodiment.

Here, the flying object may reserve all the space cells on the flight route or reserve a part of the space cells on the flight route in one request. As an example, the flying object may reserve a space cell at its present position and one or more space cells on a scheduled route for its own flight. The "One or more space cells on the scheduled route" may include only an adjacent space cell adjacent to the space cell at the present position, or may include N (N>1) space cells on the flight route such as the space cell adjacent to the adjacent space cell.

However, when the priority of the flying object is "high", the number of space cells on the flight route to be reserved in one request may be increased as compared with the case where the priority is "low". For example, when the priority of the flying object is "high", a request to reserve all the space cells on the flight route may be transmitted when the flight route is set. Thus, the flight route of the high-importance flying object is determined, and such flying object can be flown without any trouble.

Further, in (2-1), when the priority of the flying object for which the flight route is to be set is "high", the flight management apparatus 30 may execute the reservation processing for all the space cells on the flight route when the route generation unit 33 generates the flight route. Similarly, in (2-2), when the flight route is transmitted from the flying object 40 having the priority "high", the flight management apparatus may execute the reservation processing for all the space cells on the flight route.

The flight management apparatus 30 may include information on a time zone in which the space cell is reserved in the reservation state of the space cell. As an example, the flight management apparatus 30 may set the time zone in which the space cell is reserved as a time zone in which the time as a margin is added before and after the passage time zone in which the flying object passes through the space cell. For example, if t is the time for the flying object to pass through one space cell and $t_0$ is the time at which the flying object reaches the space cell, the flight management apparatus 30 may set the margin to t and reserve the space cell from the time $t_0-t$. Thus, when the flying object reaches a space cell in front of the space cell, there is no other flying object in the space cell as the next moving destination of the flying object, and the safety of the flying object can be ensured.

When the priority of the flying object for reserving the space cell is high, the flight management apparatus 30 makes the margin longer than in the case where the priority is low (For example, the former margin may be 2t and the latter margin may be t). The flight management apparatus 30 may change the length of the margin based on weather information. For example, in the case where the weather information acquired by the data acquisition unit 32 is rainy, the flight management apparatus 30 may increase the margin as compared with the case where the weather is fine. Further, when the wind velocity is equal to or greater than a predetermined value, the margin may be made longer than when the wind velocity is less than the predetermined value. The margin may be set to increase continuously or stepwise as the wind velocity increases.

In the following example embodiments, detailed specific examples of the processing performed in the first and second example embodiments will be described. It is needless to say that the technical features described in the following example embodiments are appropriately combined.

Third Example Embodiment (3-1)

A third example embodiment of the present disclosure will be described below with reference to the drawings. In this example embodiment, more specific processing will be described with respect to (1-2). The following flight management apparatus 50 and the plurality of flying objects 60 constitute a flight management system.

Figure 7:
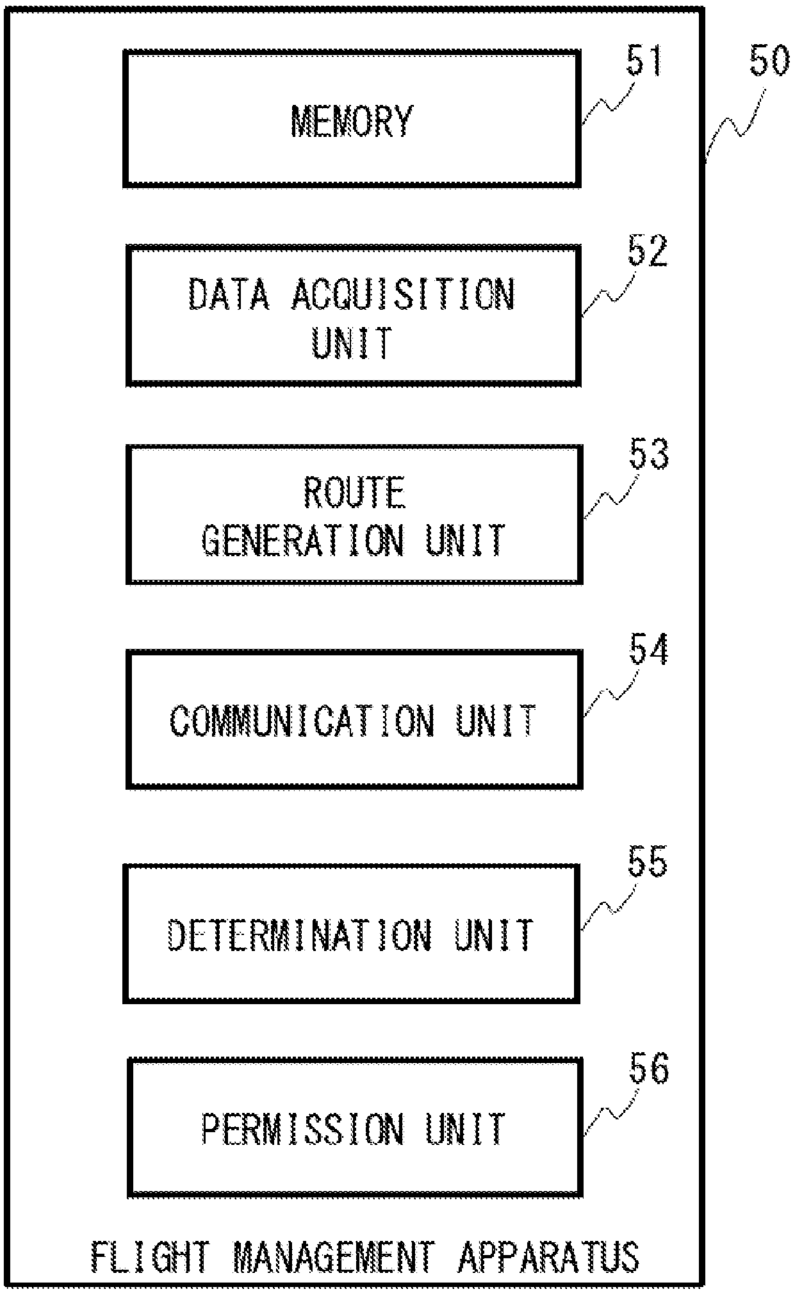
FIG. 7 is a block diagram of a flight management apparatus 50 of a third example embodiment.

FIG. 7 is a block diagram of the flight management apparatus 50. The flight management apparatus 50 includes a memory 51, a data acquisition unit 52, a route generation unit 53, a communication unit 54, a determination unit 55, and a permission unit 56.

The memory 51 stores information of a plurality of space cells C which can be specified by coordinates or the like, reservation states of the space cells of the plurality of flying objects, flight routes of the respective flying objects generated by the route generation unit 53, and reservation states of the space cells.

The data acquisition unit 52 acquires various types of data used for determining the flight route of the flying object, similarly to the data acquisition unit 32. The route generation unit 53, like the route generation unit 33, determines the flight route of each flying object by using the information stored in the memory 51 and the data acquired by the data acquisition unit 52.

The communication unit 54 is an interface for communicating with a later-described flying object 60 or an external network, and includes a function of the transmission unit 34.

When the flight management apparatus 50 receives a request for permission to move to a specific one space cell from one of the flying objects, the determination unit 55 determines whether the space cell has already been reserved using the reservation state stored in the memory 51.

A permission unit 56 permits movement of the flying object to the specific space cell when the determination unit 55 determines that the specific space cell is not reserved, but does not permit the movement of the flying object to the specific space cell when the determination unit 55 determines that the specific space cell is reserved.

Figure 8:
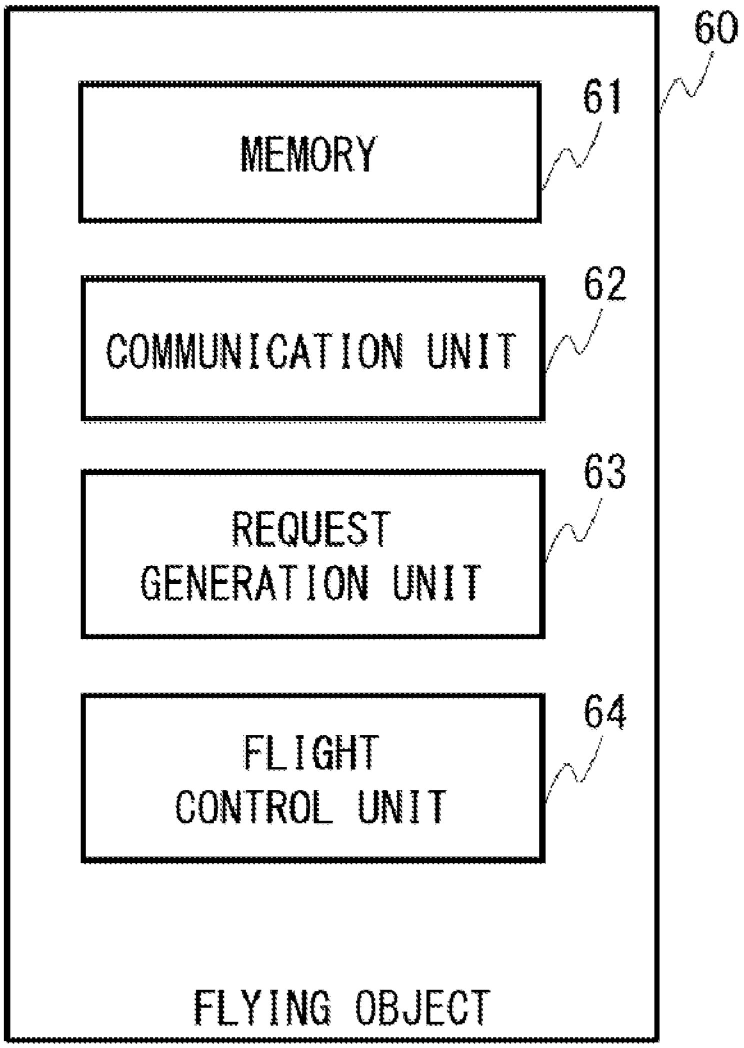
FIG. 8 is a block diagram of a flying object 60 of the third example embodiment.

FIG. 8 is a block diagram of the flying object 60. The flying object 60 includes a memory 61, a communication unit 62, a request generation unit 63, and a flight control unit 64.

The memory 61 stores information of a plurality of space cells C which can be specified by coordinates, etc., the present position of the flying object 60, the flight route of the flying object 60, and information of the space cells C reserved by the flying object 60 on the flight route.

The communication unit 62 is an interface for communicating with the flight management apparatus 50 or an external network, and includes the function of the transmission unit 22 described above. In particular, the communication unit 62 also functions as a request transmission unit for transmitting the request generated by the request generation unit 63 to the flight management apparatus 50.

The request generation unit 63 selects, based on the flight route of the flying object 60 stored in the memory 61 and the present position of the flying object 60, a space cell adjacent to the space cell at the present position to be reserved by the flying object 60. The request generation unit 63 generates the request for the reservation of the selected space cell.

Further, the request generation unit 63 selects a space cell adjacent to the space cell currently located other than the rejected space cell when the determination unit 55 rejects the request from the flying object 60 and the rejection information is transmitted from the communication unit 54. The request generation unit 63 generates a request for reservation of the selected space cell again.

The flight control unit 64 controls the movement of the airframe of the flying object 60. In particular, the flight control unit 64 controls each part of the flying object 60 so as to move the airframe of the flying object 60 to the permitted specific space cell based on the permission information.

Figure 9:
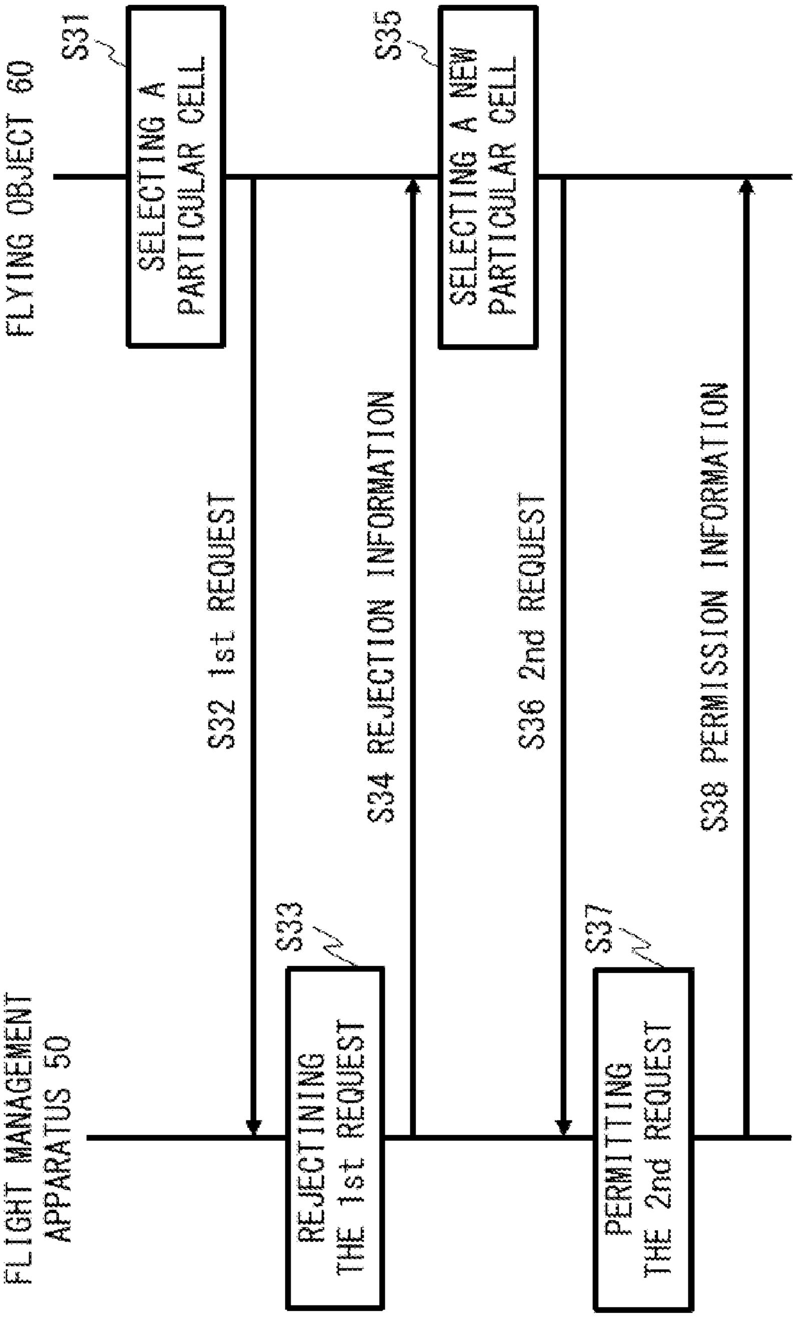
FIG. 9 is a flowchart showing a method executed by the flight management system of the third example embodiment.

The specific processing of the third example embodiment will be described below with reference to FIG. 9. FIG. 9 is a sequence diagram showing processing executed by the flight management system.

The request generation unit 63 of the flying object 60 refers to the flight route and the present position stored in the memory 61 during the flight, and selects a space cell on the flight route adjacent to the space cell at the present position as a specific space cell (Step S31). Since the flight route reflects the current flight condition of the flying object 60, the present position of the space cell is included.

The request generation unit 63 generates a 1st request (first request) for requesting permission to move to the selected space cell. The communication unit 62 transmits this request to the flight management apparatus 50 (Step S32). The 1st request may include information indicating the space cell C in which the flying object 60 is present (For example, location information). In this case, the flight management apparatus 50 can store the present positions of the plurality of flying objects 60 in the memory 51.

The communication unit 54 of the flight management apparatus 50 receives the 1st request. Based on this request, the determination unit 55 of the flight management apparatus 50 determines whether the specific space cell related to this request has already been reserved using the reservation state stored in the memory 51. Here, the determination unit 55 determines that the specific space cell is reserved. Therefore, the permission unit 56 does not permit the movement of the flying object 60 to the specific space cell and rejects it (Step S33). The permission unit 56 uses the communication unit 54 to transmit rejection information for rejecting the movement (Step S34).

The communication unit 62 receives the rejection information. The request generation unit 63 selects, based on a predetermined algorithm, a space cell other than the rejected specific space cell, which is adjacent to the space cell currently positioned (Step S35). The request generation unit 63 generates a 2nd request (second request) for requesting permission to move to the selected space cell. The communication unit 62 transmits this request to the flight management apparatus 50 (Step S36).

The communication unit 54 of the flight management apparatus 50 receives the 2nd request. Based on this request, the determination unit 55 of the flight management apparatus 50 determines whether the specific space cell related to this request has already been reserved using the reservation state stored in the memory 51. Here, the determination unit 55 determines that the new specific space cell is not reserved. Therefore, the permission unit 56 permits the movement of the flying object 60 to the new specific space cell (Step S37). The permission unit 56 uses the communication unit 54 to transmit permission information for permitting the movement (Step S38). The flight control unit 64 moves the flying object 60 to the new specific space cell on the basis of the permission information.

In addition, the flight management apparatus 50 updates the reservation state stored in the memory 51 for the specific space cell for which the reservation was permitted in step 37 for the flying object 60. Further, the flight management apparatus 50 generates a new flight route to the destination with the specific space cell permitted to be reserved as a departure point for the flying object 60. The method of generating this flight route is as described in the second example embodiment. The flight management apparatus 50 stores the generated flight route in the memory 51 and transmits it to the flying object 60. The flying object 60 stores the flight route in the memory 61. Each time the flying object 60 enters another space cell, it repeats the process described in FIG. 9 based on the flight route stored in the memory 61. The flight management apparatus 50 also repeats the processing shown in FIG. 9 each time.

In step S37, if the permission unit 56 does not permit the movement of the flying object 60 to the specific space cell and rejects the movement, the flight management apparatus 50 transmits rejection information for rejecting the movement in the same manner as in step S34. The flight management apparatus 50 and the flying object 60 repeatedly execute the processes described in steps S31 to S36 until the flight management apparatus 50 permits the request.

Figure 10A:
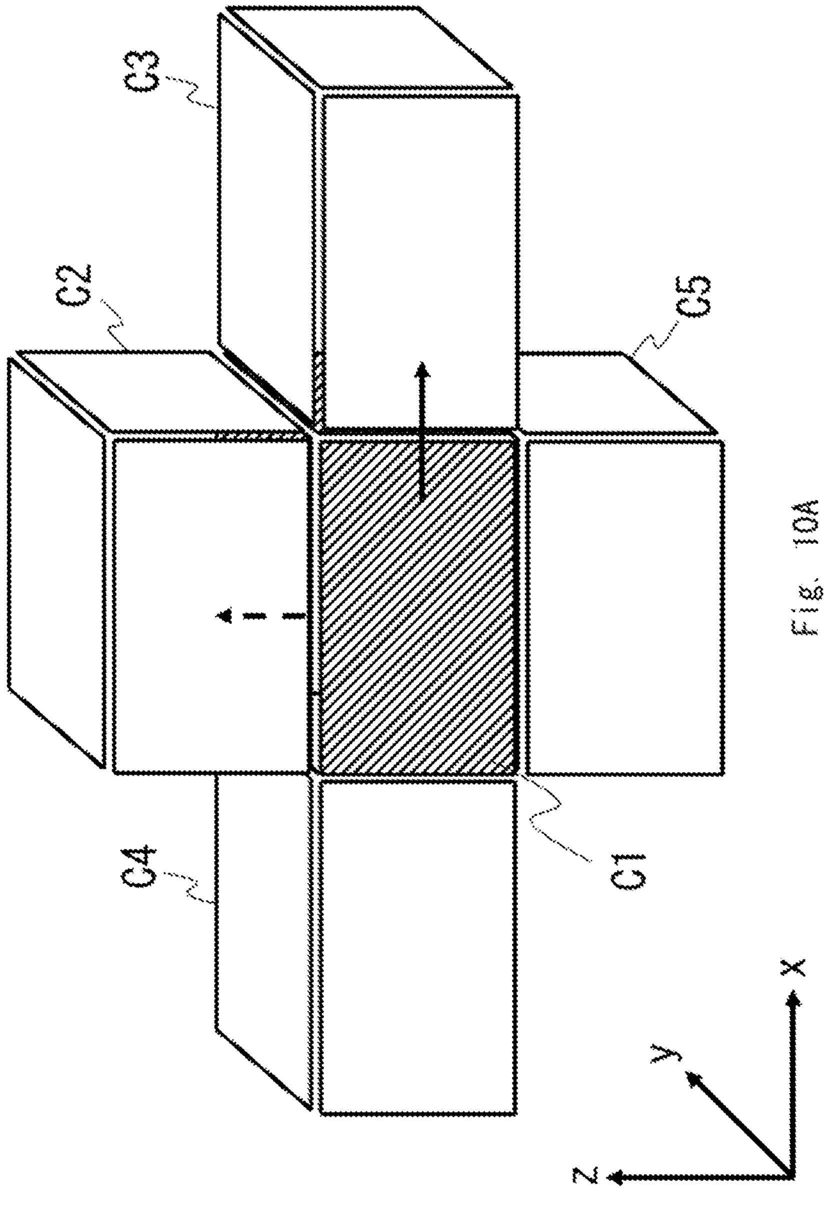
FIG. 10A is one example of schematic views showing a space cell C1 in which the flying object 60 is flying and its surrounding space cells of the third example embodiment.
Figure 10B:
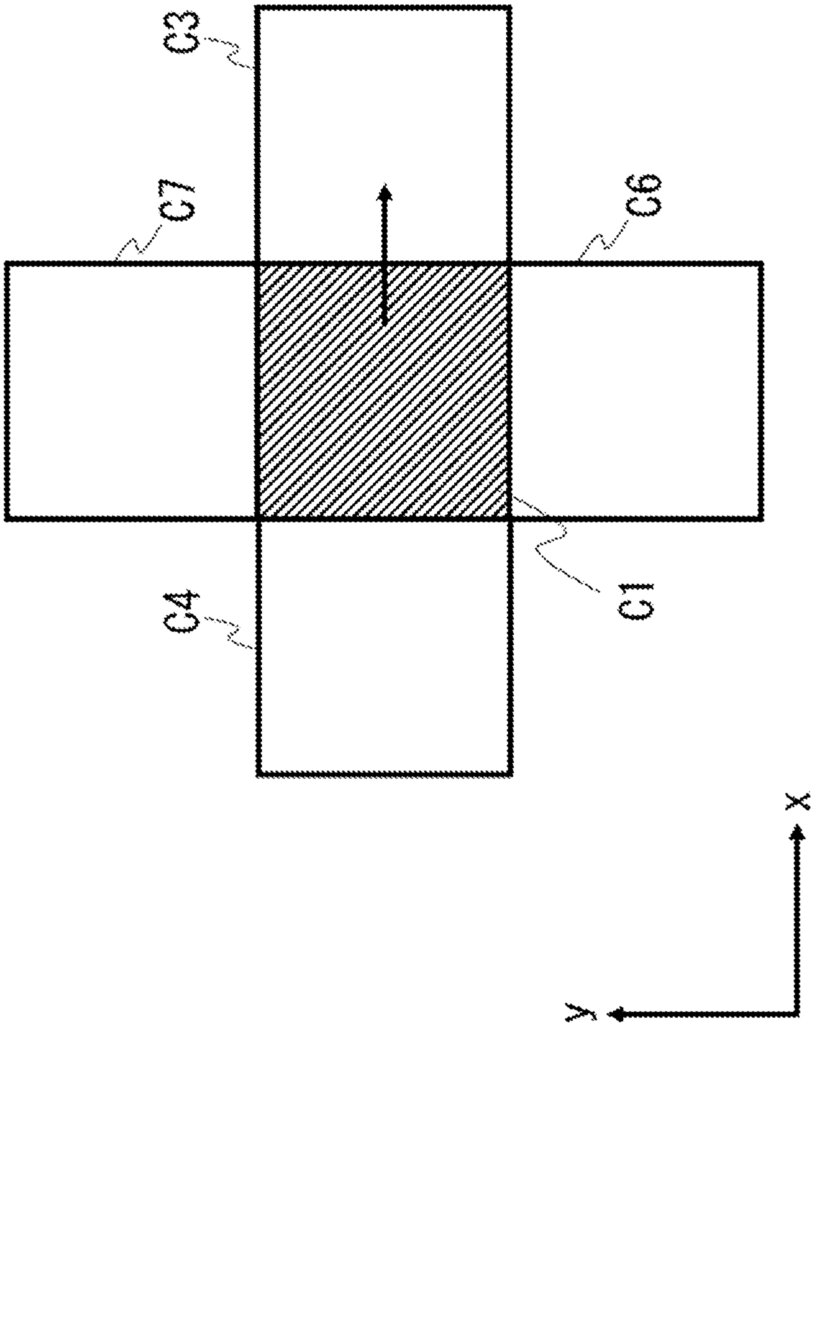
FIG. 10B is another example of schematic views showing the space cell C1 in which the flying object 60 is flying and its surrounding space cells of the third example embodiment.

The processing of steps S31 to S37 will be further described with reference to FIGS. 10A and 10B. FIGS. 10A and 10B are schematic diagrams showing a space cell C1 in which the flying object 60 is flying and space cells around it. FIG. 10A is a side view and shows the space cells C1 to C5. FIG. 10B is a top view and shows the space cells C1, C3, C4, C6 and C7. The space cells C2 to C7 are all adjacent to the space cell C1.

The request generation unit 63 of the flying object 60 selects the space cell C2 adjacent to the space cell C1 in which the flying object 60 is currently flying and located on the flight route stored in the memory 61 (Step S31). Then, the request generation unit 63 generates a 1st request concerning the space cell C2, and the communication unit 62 transmits the request (Step S32).

The determination unit 55 of the flight management apparatus 50 determines that the space cell C2 is reserved, and the permission unit 56 rejects the movement of the space cell C2 of the flying object 60 (Step S33). The flight management apparatus 50 transmits rejection information for rejecting the movement of the space cell C2 (Step S34).

The request generation unit 63 of the flying object 60 selects one of the space cells C3, C4, C5, C6 and C7 which are the space cells other than the space cell C2 and are adjacent to the space cell C1 at the present position, based on the rejection information (Step S35). In this manner, the request generation unit 63 updates the flight route based on the rejection information. When the flight management device 50 transmits the rejection information to the flying object 60, it may also transmit a notification urging the change of the flight route, and the request generation unit 63 may update the flight route in response to the reception of the notification. At step S35, when the request generation unit 63 selects the space cell C3, the request generation unit 63 generates a 2nd request for the reservation of the space cell C3. The communication unit 62 transmits the 2nd request to the flight management apparatus 50 (Step S36). The determination unit 55 of the flight management apparatus 50 determines that the space cell C3 is not reserved, and the permission unit 56 permits the movement from the space cell C2 of the flying object 60 (Step S37).

In step S36, the space cells C3 to C7 to be selected are not stored in the memory 61 as non-flyable areas. The request generation unit 63 may select one space cell using the positional relationships between the present position and the destination. For example, the request generation unit 63 can select a space cell capable of constituting the shortest distance from the present position to the destination. Further, the request generation unit 63 may not select the space cell in which the flying object 60 was positioned immediately before the current space cell C, or may select the space cell with the lowest priority as the selection object. This is because if the flying object 60 moves to the space cell located immediately before the present space cell C, the flying object 60 reverses the flight route to the destination, and the movement may not be efficient.

The request generation unit 63 can select the space cell C3 from the space cells C3 to C7 based on real-time data. The real-time data may include, but is not limited to, at least one of the remaining battery of the flying object 60, weather information (e.g. wind speed and wind direction information), current speed of the flying object 60, and the like. These data are measured by the sensors of the flying object 60 and stored in the memory 61.

For example, in step S35, based on the information of the wind velocity and the wind direction and the current speed of the flying object 60, the request generation unit 63 can select a space cell from the space cells C3 to C7 in which the battery consumption is minimized upon movement from the space cell C1. This process may be executed, for example, when the remaining battery capacity of the flying object 60 is less than a predetermined value. Further, the request generation unit 63 may select a space cell that can be moved from the space cell C1 in the shortest time based on the same real-time data in step S35.

Figure 11:
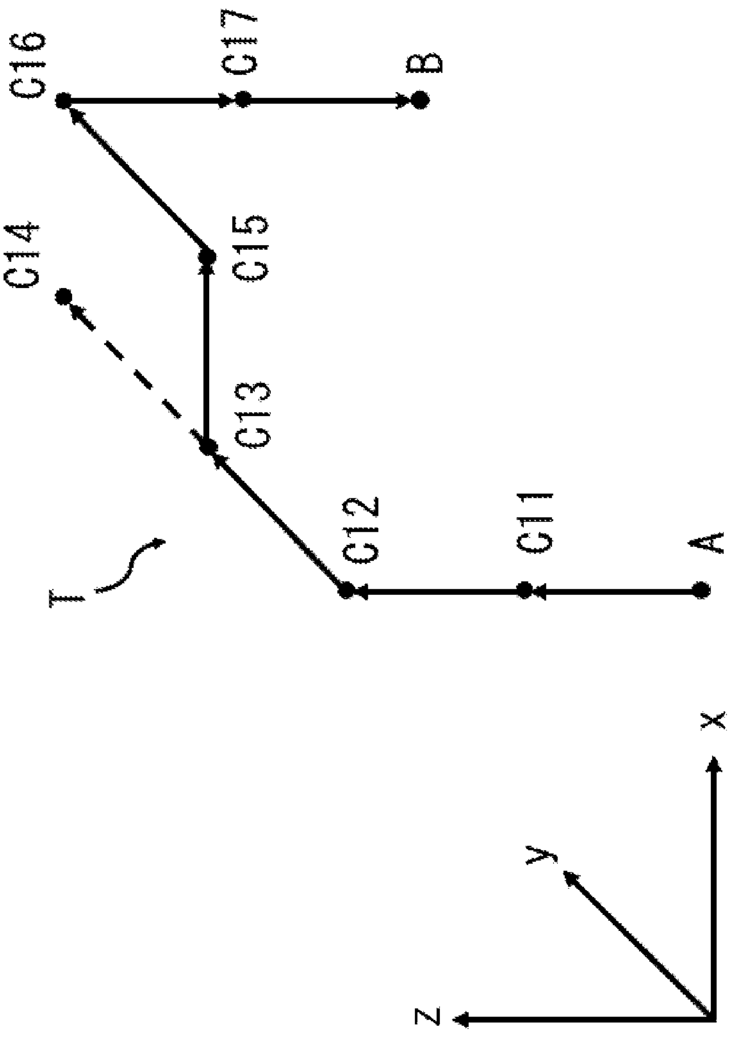
FIG. 11 is a schematic diagram showing a movement path of the flying object 60 using the space cell reservation method of the third example embodiment.

With reference to FIG. 11, a moving path of the flying object 60 using the space cell reservation method described above will be described. In FIG. 11, the flying object 60 moves from the departure point A to the destination point B via the route T. Points C11 to C17 conveniently indicate the space cell C through which the flying object 60 passes on the path T.

First, the flying object 60 moves (rise) in the z-axis direction from the departure point A, passes through the space cell C11, and reaches the space cell C12. Next, the flying object 60 moves in the y-axis direction and reaches the space cell C13. The movement thus far is a result of the flying object 60 requesting the space cells C11 to C13 as specific space cells based on the flight route of the flying object 60, and the flight management apparatus 50 permitting the request.

Next, the flying object 60 requests the space cell C14 as a specific space cell based on its own flight route. However, the flight management apparatus 50 rejects the movement of the flying object 60 to the space cell C14 based on the reservation of the space cell C14. Here, the flying object 60 selects the space cell C15, which is a space cell other than the space cell C14 and constitutes the shortest distance from the current space cell C13 to the destination B. The flying object 60 transmits a request concerning the space cell C15 to the flight management apparatus 50.

The flight management apparatus 50 determines that the space cell C15 is not reserved and permits movement to the space cell C15. Based on the permission information, the flying object 60 moves in the x-axis direction and reaches the space cell C15. Here, the flight route of the flying object 60 is updated when the space cell to be moved changes from the space cell C14 to the space cell C15. The flying object 60 moves along the updated flight route with the space cells C16 to C17 and reaches the destination B.

As described above, when the space cell C requested first is reserved, the flying object requests reservation for another space cell C. Thus, the flying object 60 can be evacuated to another space cell C without staying in the same space cell C for a long period. Therefore, in the future, another flying object 60 can move to the space cell C where the flying object 60 is currently located, and the plurality of flying objects 60 can move smoothly.

In step S33 of FIG. 9, when the permission unit 56 does not permit movement of the flying object 60 to a specific space cell and rejects the movement, the determination unit 55 may present a space cell in which the flying object 60 moves next. Specifically, the determination unit specifies a space cell other than the rejected space cell C, which does not fall under the non-flyable area and is not reserved by another flying object 60 among the space cells adjacent to the space cell C where the flying object 60 is present. In this specification, information indicating the space cell C in which the flying object 60 is present included in the 1st request, information on the space cell stored in the memory 51, and their reservation states are used.

If the determination unit 55 specifies one space cell C, the permission unit 56 may reserve the space cell C specified by the determination unit 55 and notify the flying object 60 of permission information related to the space cell. The flying object 60 moves to the space cell based on the received permission information. Thus, the flight management apparatus 50 can reliably evacuate the flying object 60.

When the determination unit 55 specifies a plurality of space cells C, the determination unit 55 may use the communication unit 54 to transmit information of the specified plurality of space cells C to the flying object 60. The flying object 60 selects one out of the plurality of received space cells C. Here, the flying object 60 may select a space cell in which the shortest distance from the present position to the destination can be configured. Alternatively, based on data such as the remaining battery capacity of the flying object 60, weather information (e.g. wind speed and wind direction information), and the current speed of the flying object 60, one space cell in which battery consumption or travel time is most advantageous may be selected. The details of this method are as described above. The flying object 60 transmits a request for movement permission to the flight management apparatus 50 for the newly selected space cell C. The flight management apparatus 50 permits the request. This method is particularly effective when the flying object 60 does not share its own real-time data with the flight management apparatus 50.

When the determination unit 55 specifies a plurality of space cells C, the determination unit 55 may select an optimum one of the plurality of space cells C. As a method by which the determination unit 55 selects one space cell C, a method similar to the method by which the flying object 60 selects one space cell C can be applied.

Further, the determination unit 55 may select the space cell C in a direction in which the current or future density of other flying objects 60 is low based on at least one of the present positions of the plurality of flying objects 60 and the reservation states of the space cells reserved by other flying objects 60 stored in the memory 51. That is, the determination unit 55 can select the space cell C in the direction that is not congested. For example, in the example shown in FIGS. 10A and 10B, assume that the determination unit 55 selects one cell from the space cells C3 to C7, when the flying object 60 flies in the space cell C1. The determination unit 55 calculates, with respect to the space cell C3, the number of flying objects 60, the number of reserved cells, or both of them in the predetermined space cells C. The predetermined space cells C are in a region within a predetermined distance from the space cell C3, the center of the region. The determination unit 55 performs the same calculation for each of the space cells C4 to C7 and can select a space cell having the smallest calculated value from the space cells C3 to C7. Further, when the space cell whose surface is adjacent to the space cell C3 is defined as 1 adjacent cell of the space cell C3, and the space cell whose surface is adjacent to the 1 adjacent cell is defined as 2 adjacent cell of the space cell C3, the determination unit 55 may calculate the above-mentioned value for a region having 1 to N adjacent cells (N is greater than or equal to 1) of the space cells C3. The determination unit 55 performs the same calculation for each of the space cells C4 to C7, and can select a space cell having the smallest calculated value from the space cells C3 to C7.

The flight management apparatus 50 may reserve one selected space cell C and notify the flying object 60 of permission information related to the space cell. Thereafter, the flying object 60 moves to the space cell based on the received permission information. The flight management apparatus 50 may notify the information of the selected one space cell C to the flying object 60 without reserving the space cell C. The flying object 60 may transmit a request for reserving the notified space cell C based on the notified information. At this time, the flying object 60 may transmit a request for a space cell adjacent to the space cell C which is present other than the received space cell C and the space cell C which is requested first.

In the above example, when the flight management apparatus 50 permits a reservation for a specific space cell in step S37, the route generation unit 53 of the flight management apparatus 50 decides a flight route for the flying object 60. However, other examples can be envisioned for the generation of flight routes.

For example, the route generation unit 53 of the flight management apparatus 50 may not directly determine the flight route of each flying object when the flight management apparatus 50 permits a reservation for a specific space cell in step 37. The route generating unit 53 functions as a route proposal unit which proposes a flight route starting from the permitted space cell as a candidate and inquires the flying object 60 about the agreement or disagreement of the flight route as the candidate through the communication unit 54. The route generation unit 53 calculates the flight route as the candidate so that the flight route does not overlap with the ones of flying objects. The details of this calculation are the same as the flight route setting method described in (2-1). Then, when the flying object 60 receives the inquiry, the request generation unit 63 determines whether to agree or disagree with the candidate flight route. When the flight management apparatus 50 transmits the rejection information to the flying object 60 in step 34, it may similarly propose the flight route as the candidate and perform control so as to inquire. In particular, in this case, the flight management apparatus 50 can propose a flight route as a candidate, using the space cell as a starting point, when the determination unit 55 specifies the space cell in which the flying object 60 moves next.

At this time, the request generation unit 63 may determine whether or not it can fly the flight route as the candidate based on the telemetry data. For example, if it is calculated, based on information such as the remaining battery level and weather information, that the remaining battery level is less than a predetermined threshold during flight along the flight route, it may be determined that this candidate flight route is not flyable, and in other cases, it may be determined that the flight route is flyable. In addition, the request generation unit 63 may determine, from the detection results by the detection units such as sensors, radars, and cameras mounted on the flying object 60, that the candidate flight route is not flyable when another flying object exists in the candidate flight route in the vicinity of the aircraft, and that the flight route is flyable in other cases. This agreement or disagreement may also be determined on the computer by a passenger of the flying object 60.

When a signal indicating agreement is transmitted from the flying object 60, the request generation unit 63 stores the flight route in the memory 61 as a new flight route or updates the previously stored flight route to the new flight route. When receiving the signal indicating agreement from the flying object 60, the route generation unit 53 stores the flight route in the memory 51 as a new flight route or updates the previously stored flight route to the new flight route.

When a signal indicating disagreement is received from the flying object 60, the route generation unit 53 again proposes a candidate route which is different from the proposed route and satisfies the above conditions such as not overlapping with the flight routes of other flying objects, and queries the flying object 60 for the route. This inquiry continues until a signal indicating agreement is received from the flying object 60. The request generation unit 63 may agree with the entire route proposed by the route generation unit 53. In addition, if there is a subroute that can be flown by the flying object 60 as a part of the route (part of the route adjacent to the current location of the flying object 60), but not the entire route, the request generation unit 63 may transmit a signal indicating agreement with the subroute. In this case, the flying object 60 can fly on at least the subroute.

In addition, the flying object 60 may set the request object in one request as a sub-route composed of a plurality of cells which is a part of its own flight route. The flying object 60 determines the cell to be requested so that the sub-route satisfying the conditions is set based on the conditions such as the flight schedule of the flying object 60, the battery life, the configured intermediate point on the route, etc. When receiving this request, the flight management apparatus 50 permits the allocation of a subroute if no space cell of the subroute is reserved, and reserves the corresponding cell. On the other hand, if another flying object has reserved any space cell of the subroute, the sub route is rejected. At this time, the route generation unit 53 may generate another subroute as an alternative set of space cells (a set of space cells that may be allocated to the flying object) composed of all or part of the rejected subroute. The first space cell of this alternate subroute is a cell adjacent to a space cell (For example, the current or future position of the flying object 60 at the time the subroute was rejected) that exists before the rejected subroute in the route allocated by the flying object 60. Note that the flight management apparatus 50 receives information on its route from the flying object 60 in advance. Also, the last space cell of the alternate subroute is the same as the last space cell in the rejected subroute. The flight management device 50 transmits the information of the generated another subroute for proposal together with the rejection information to the flying object 60. The flying object 60 transmits the signal indicating agreement or disagreement to the proposal through the process described above. In the case of disagreement, the flight management apparatus 50 generates an alternative subroute different from the one rejected by itself and the one rejected by the flying object 60 using the methods described above, and proposes it to the flying object 60. This process is repeated until the flying object 60 transmits an agreement signal.

If the flying object 60 agrees, the flight management apparatus 50 reserves the cells for all or part of the agreed subroute. The flying object 60 updates the route or sub-route set to itself so as to pass through the allocated space cell. In this manner, the route generation unit 53 of the flight management apparatus 50 can assist the flying object 60 in determining its route. It should be noted that the entire route of the flying object 60, not the sub-route, may be determined by performing the same processing by the flight management apparatus 50 and the flying object 60. In this way, the flying object 60 can fly by selecting a flight route or sub-route convenient for itself from those presented.

Note that, in the above example, the route generation unit 53 may query one candidate flight route in one query, but may query a plurality of candidate routes in one query. The request generation unit 63 of the flying object 60 determines whether or not there is a route that can be flyable, and if there is no such a route, transmits a signal indicating disagreement. When there is one route that can be flyable, a signal indicating agreement to the route is transmitted. Furthermore, when there is a plurality of routes that can be flyable, the request generation unit 63 may select, for example, one route in which at least one of the battery consumption, the flight time, and the distance in the flight of the flight route is the best, and transmit a signal indicating agreement for the route.

In this way, when the flying object 60 needs to initially set or change its flight route, the request generation unit 63 can also function as a route determination unit for determining the flight route by agreeing with the flight route proposed by the route generation unit 53. By using the information stored in the memory 51, the flight management apparatus 50 has a computing capability of visualizing in real time the reservation status of the space cells and flight routes of all the flying objects in the space to be managed and analyzing them. Therefore, according to this method, the flying object can determine a safer flight route in consideration of the state of other flying objects rather than determining the flight route of the flying object only with its own data. At this time, the flying object is the subject that determines its own flight route, and the flight management apparatus functions as a traffic control apparatus that assists the flying object.

As another example the route generation unit 53 may not be provided in the flight management apparatus 50. For example, the flying object 60 may include the route generation unit 43 as described in (2-1), and when the flight management apparatus 50 permits a reservation for a specific space cell in step S37, the flying object 60 itself may generate a new flight route to the destination with the specific space cell permitted to be reserved as a departure point for the flying object 60. In addition, neither the flight management apparatus 50 nor the flying object 60 is provided with a route generation part, and the flight route of the flying object may not be decided. In either case, the flight management apparatus 50 does not manage the flight route of the flying object 60. However, as described above, the flight management apparatus 50 grasps the reservation status of each space cell and the current position of each flying object, and when it receives a request from the flying object 60 regarding a space cell to which the flying object is scheduled to fly, it executes the process of permitting or denying the movement to the cell.

Fourth Example Embodiment

In this example embodiment, a reservation and a cancelation of the space cell C of the flying object 60 will be further described.

Figure 12:
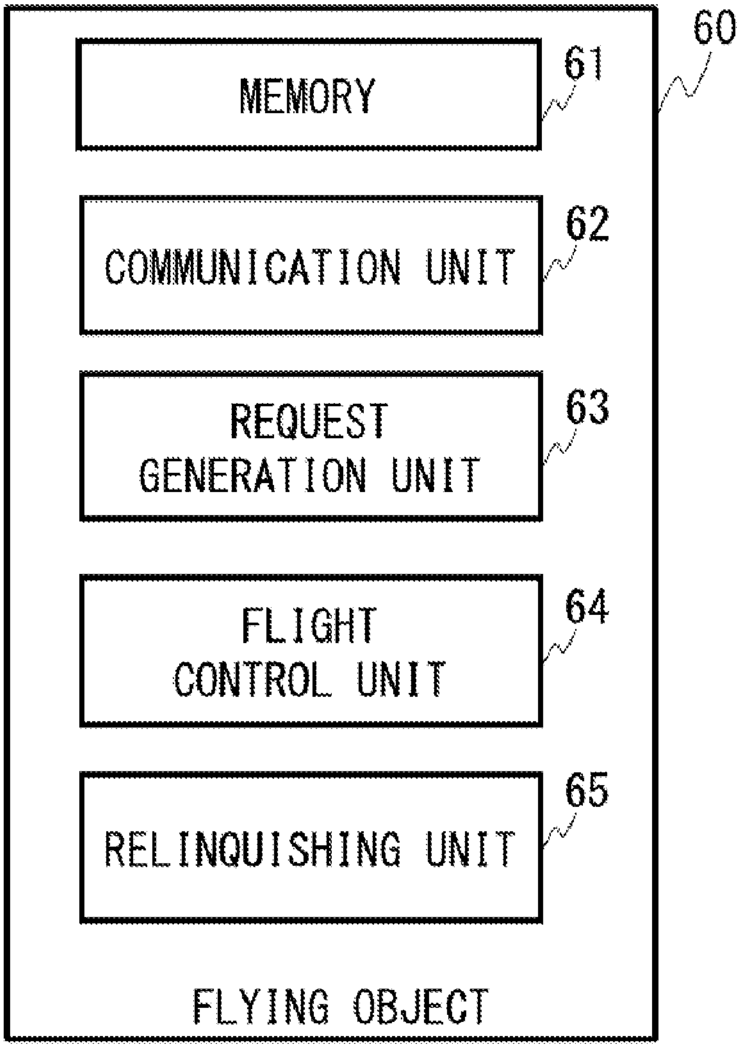
FIG. 12 is a block diagram of a flying object 60 of a fourth example embodiment.

FIG. 12 is a block diagram of the flying object 60 according to the fourth example embodiment. The flying object includes a memory 61, a communication unit 62, a request generation unit 63, a flight control unit 64, and a relinquishing unit 65. Components other than the relinquishing unit 65 are as described in the third example embodiment.

The flying object 60 reserves at least a space cell C in which the flying object is present and an adjacent space cell C adjacent to the space cell C and flying in the future by a request generated by the request generation unit 63. When the flying object 60 passes through the space cell C in which it currently resides and enters the adjacent reserved space cell C, the relinquishing unit 65 generates a request (third request) for relinquishing the reservation of the passed space cell C. The communication unit 62 transmits the request to the flight management apparatus 50. Upon receiving the request via the communication unit 54, the flight management apparatus 50 cancels the reservation state of the passed space cell C in the reservation state stored in the memory 51.

As described above, in the space cell C through which the flying object 60 has passed, other flying objects can be reserved. Therefore, many flying objects can simultaneously fly in a predetermined space and ensuring safe flight passage of the described flying object from its currently occupied cell to its newly reserved cell.

Fifth Example Embodiment

A fifth example embodiment of the present disclosure will be described below with reference to the drawings.

When many flying objects fly in a space, each of the flying objects can safely fly by moving in the same axial direction in principle, rather than moving each of the flying objects in different directions in a plane composed of space cells of the same height. In the fifth example embodiment, such a method of managing the space will be described.

Figure 13:
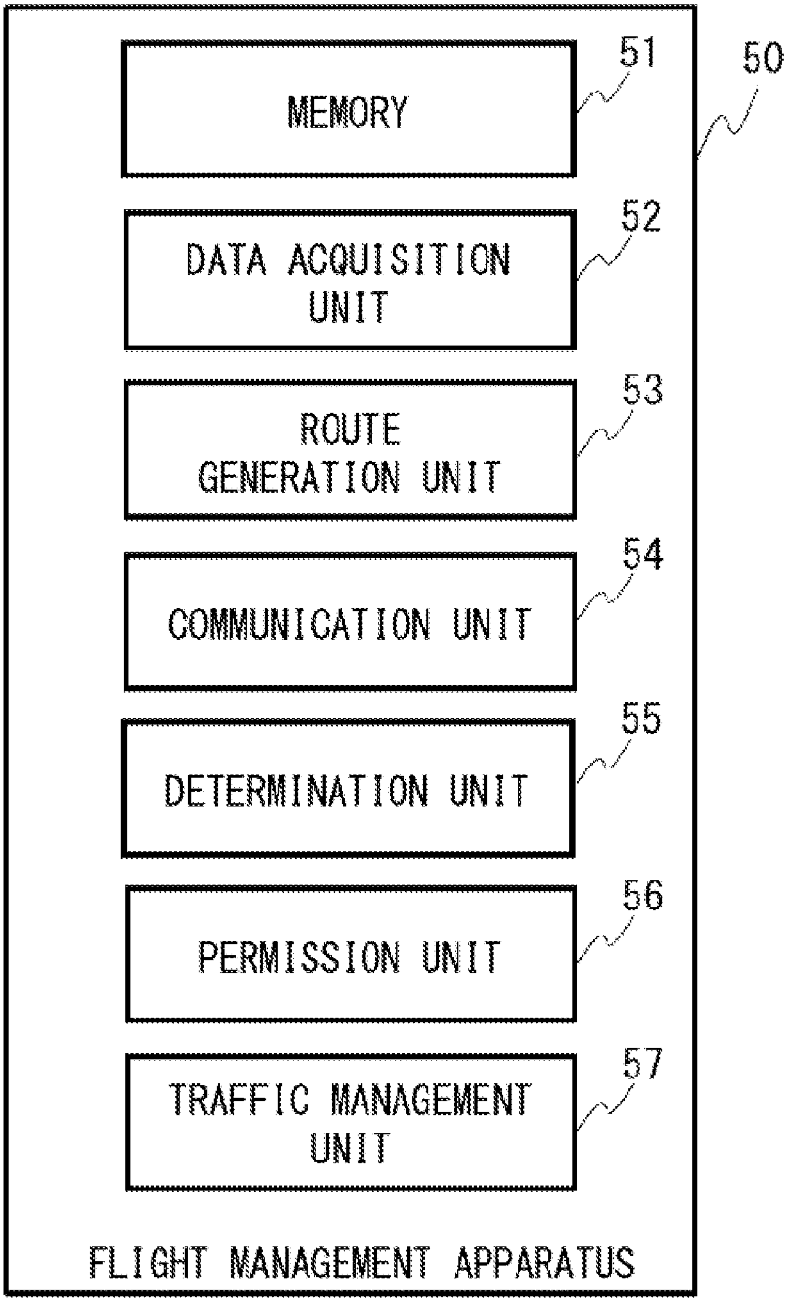
FIG. 13 is a block diagram of a flight management apparatus 50 of a fifth example embodiment.

FIG. 13 is a block diagram of the flight management apparatus 50 according to the fifth example embodiment. The flight management apparatus 50 includes a memory 51, a data acquisition unit 52, a route generation unit 53, a communication unit 54, a determination unit 55, a permission unit 56, and a traffic management unit 57 (movement management unit). Components other than the traffic management unit 57 are as described in the third example embodiment.

The traffic management unit 57 manages the flight (transportation) of the flying object in the plane as follows.

Figure 14:
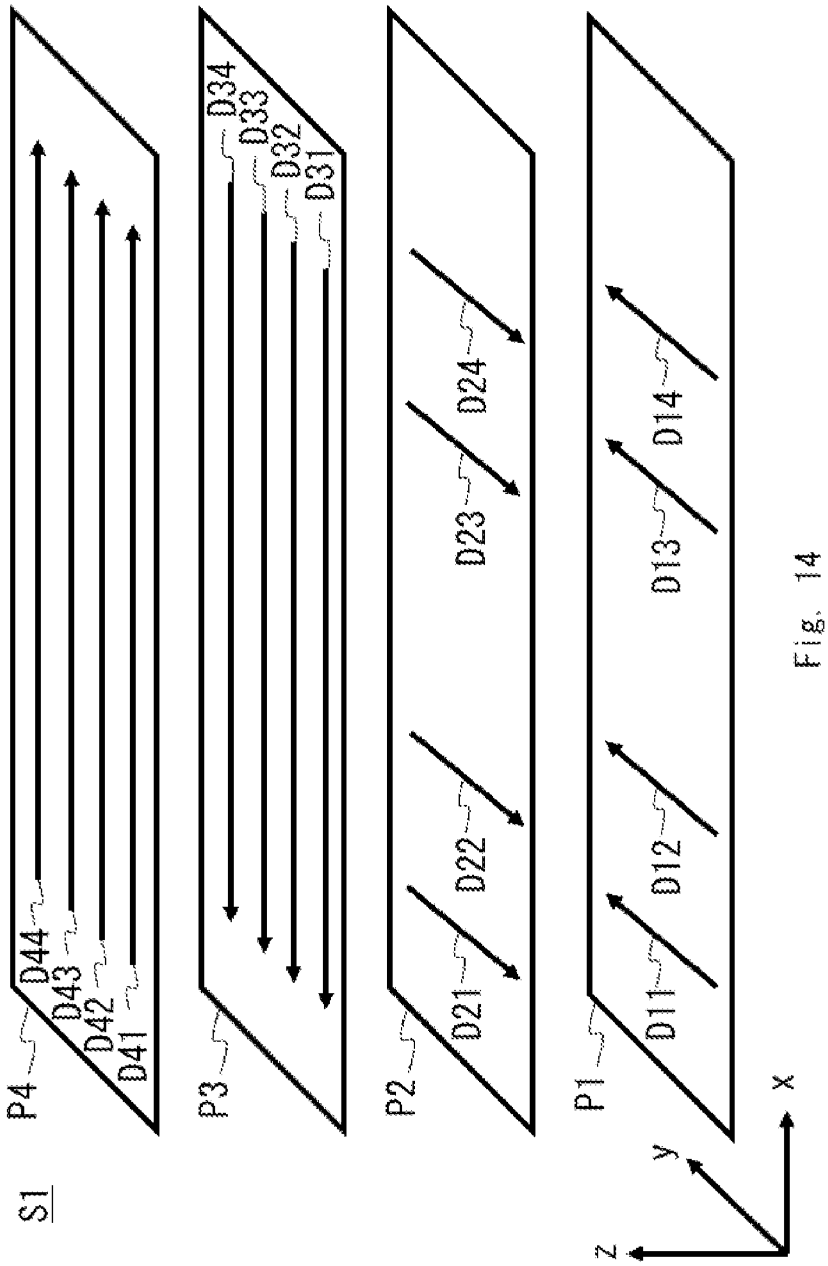
FIG. 14 is a first schematic diagram showing a traffic management method of the fifth example embodiment.

FIG. 14 is a first example showing a traffic management method. In FIG. 14, in the space S1, four planes P1 to P4 having different heights are set. The planes P1 to P4 are set at intervals of one space cell or more in the height direction, respectively, and one-way lanes with the same vector direction as the moving direction are set by the traffic management unit 57 in the planes P1 to P4. A space cell C at a start point and a space cell C at an end point are determined in each lane. The plane P1 has lanes D11 to D14 with the y direction as the moving direction, the plane P2 has lanes D21 to D24 with the −y direction as the moving direction, the plane P3 has lanes D31 to D34 with the −x direction as the moving direction, and the plane P4 has lanes D41 to D44 with the x direction as the moving direction.

Figure 15:
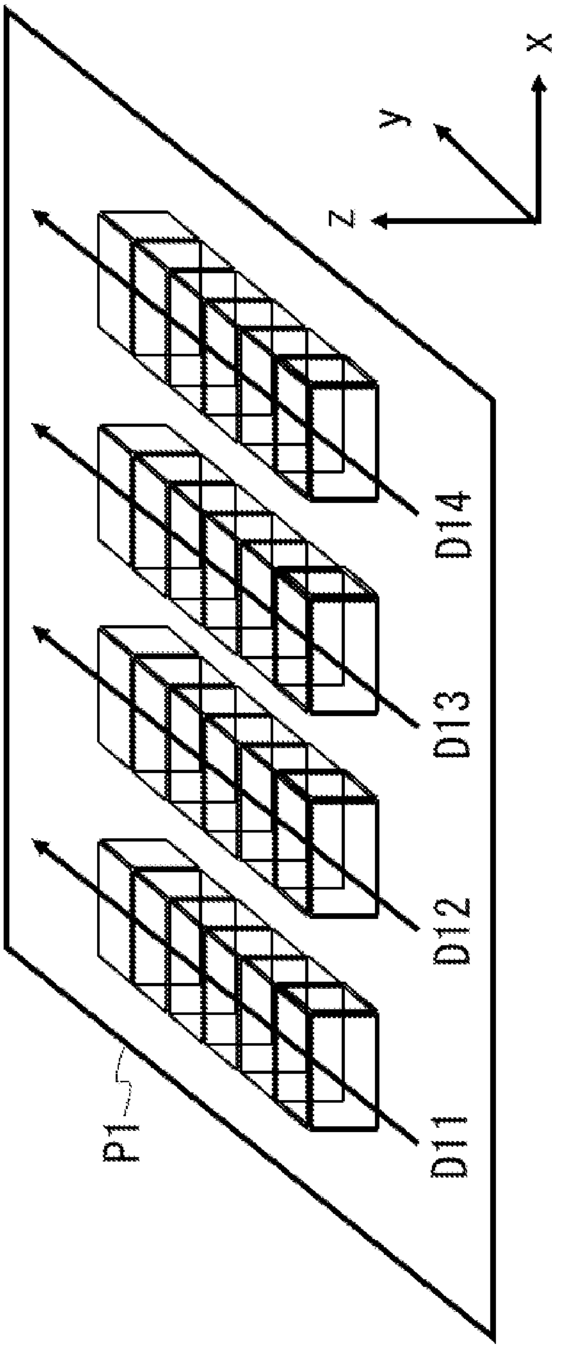
FIG. 15 is a schematic view showing a plane P1 and lanes D11 to D14 of the fifth example embodiment.

FIG. 15 is a schematic diagram illustrating the plane P1 and the lanes D11 to D14. The thickness of the plane P1 in the z-direction and the width of the lanes D11 to D14 in the x-direction are one space cell C. The flying objects can fly in the y direction by passing through any one of the lanes D11 to D14 continuous in the y direction. However, the thickness of the plane P1 in the z-direction and the width of the lanes D11 to D14 in the x-direction may be equal to a plurality of space cells C. The number of lanes in one plane is not limited to four lanes.

Each of the lanes D11 to D14 may have the same reference speed indicating a reference speed for flight, or at least one of the lanes may have a reference speed different from that of the other lanes. The reference speed is the speed required for the flying object flying in a lane, and the flying object must fly so that the absolute value of the difference between the speed of its own vehicle and the reference speed falls within a predetermined range. For example, the reference speeds of the lanes D11, D12, D13, and D14 may be set to 30 km/h, 60 km/h, 90 km/h, and 120 km/h, respectively. In this case, when it becomes necessary for the flying object to move at a higher speed while moving in the lane D12, the flying object moves from the lane D12 to the lane D13 or D14 in the plane P1. Thus, the flying object can move at a higher speed. When the flying object moves at a lower speed, the opposite movement is performed. The planes P2 to P4 and the lanes in each plane in FIG. 14 also have a configuration similar to that shown in FIG. 15.

In this way, the traffic management unit 57 permits movement of the flying objects in a predetermined direction in one space, and does not permit movement in other directions. Therefore, the safe movement of the flying objects in the plane becomes possible. By assigning different reference speeds to different lanes, traffic congestion can be mitigated. In addition, if the flying object is a flying vehicle with a person on board, passenger frustration due to congestion can be alleviated.

The space between the planes is used for moving from one plane to another. Also, when the flying object moving in the plane cannot move because the next moving space cell C is reserved, the flying object may request reservation of the space cell C above or below the plane. Alternatively, the flight management apparatus may reserve the space cell C above or below the plane as a space cell for evacuation, and transmit information of the space cell for evacuation to the flying object. The details of these processes are as described in the third example embodiment.

When the flight route of the flying object described in the second example embodiment is changed (In other words, when there is no in-plane movement that was assumed in the initial flight route) while the flying object is flying in the plane, the flying object can move to the space cell C above or below the plane in flight.

Figure 16:
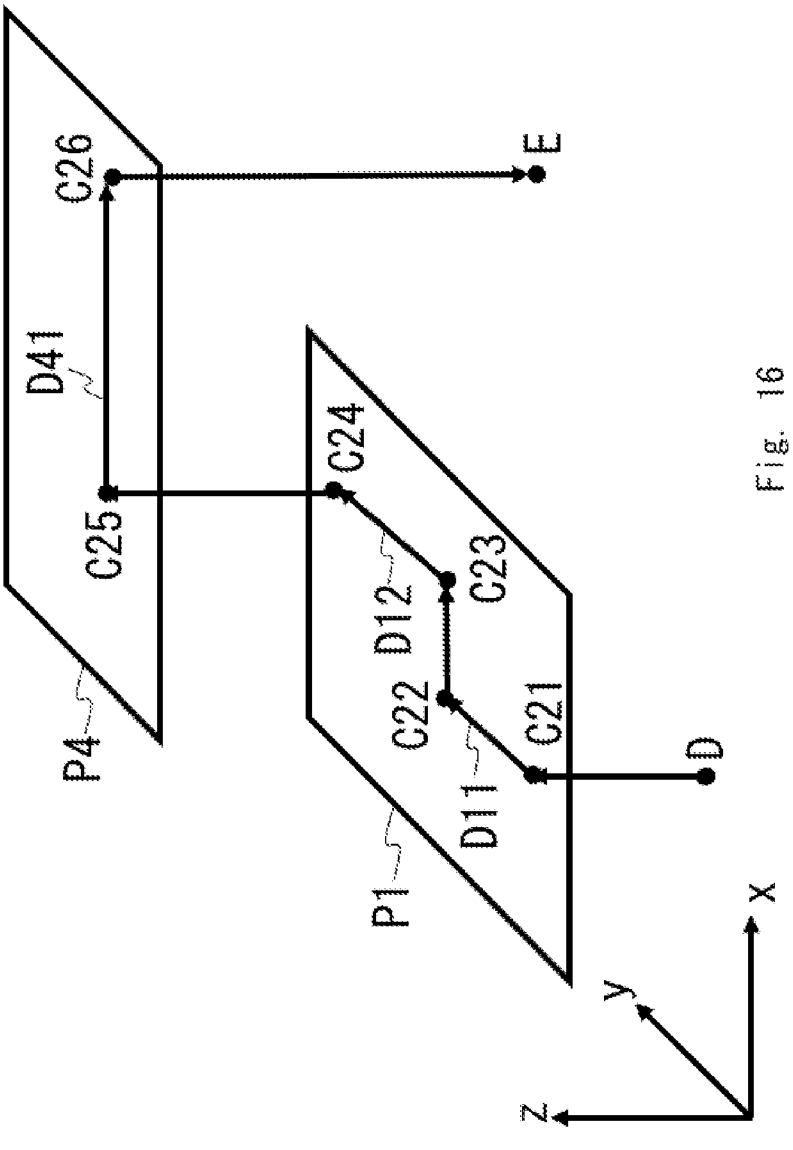
FIG. 16 is a schematic diagram showing an example of a route when a flying object flies from a departure point D on the ground to a destination E of the fifth example embodiment.

FIG. 16 is a diagram showing an example of a route in the case where the flying object flies from the departure point D on the ground to the destination E in the spatial configuration shown in FIG. 14. First, the flying object ascends from the departure point D and reaches the space cell C21 of the plane P1. The flying object then moves using the lane D11 to the space cell C22. At this time, in order to move faster in the y axis direction, the flying object moves to the space cell C23 in the plane P1 and reaches the lane D12. The flying object then moves in lane D12 to space cell C24.

The flying object ascends from the space cell C24 to reach the space cell C25 of the plane P4 in order to move in the x direction. The flying object then moves using the lane D41 to the space cell C26. The flying object descends from the space cell C26 for landing and arrives at the destination E.

In this way, the flying object moves in the same direction on the same plane except for the case of lane change due to speed change. Therefore, since many flying objects can move in an orderly manner on the same plane, many flying objects can fly safely.

Figure 17:
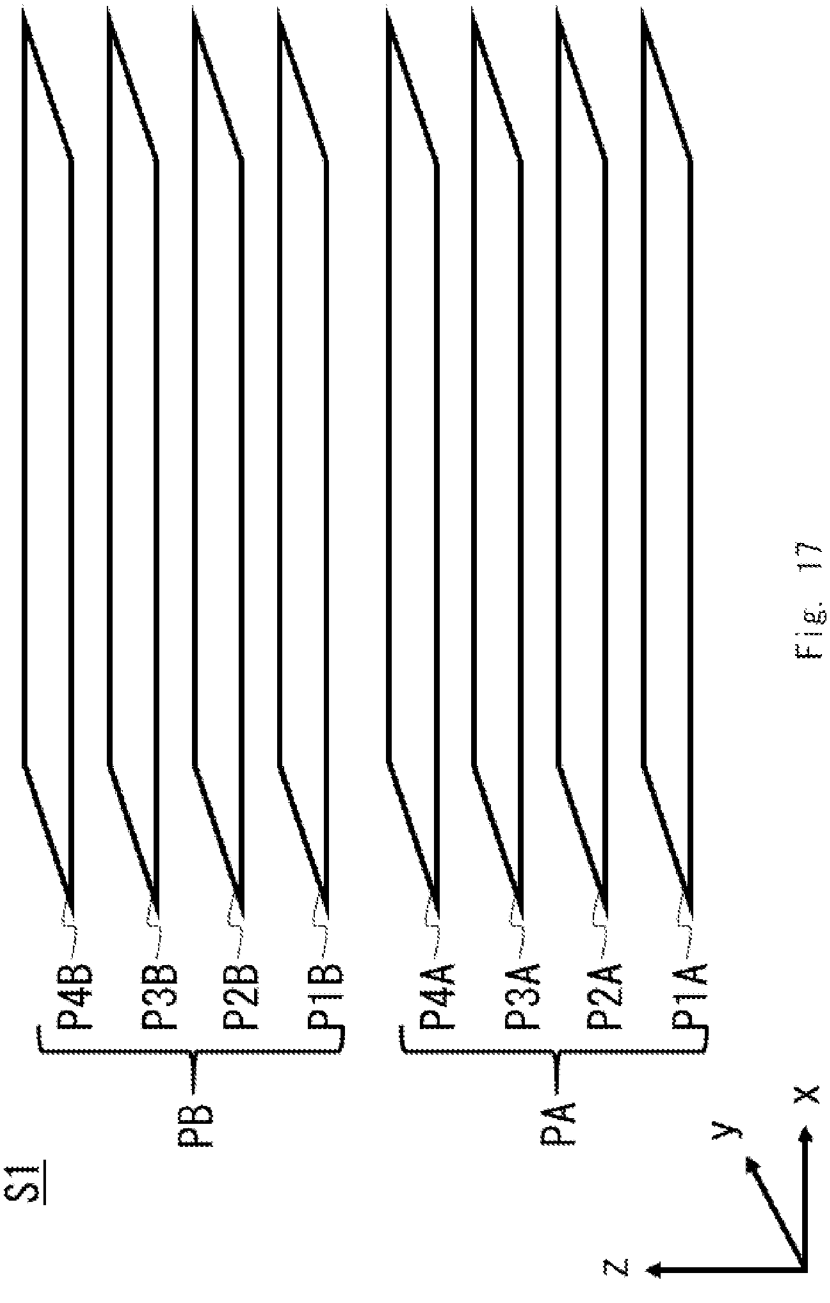
FIG. 17 is a schematic view showing a set of planes of the fifth example embodiment.

A plurality of planes P1 to P4 may be provided. FIG. 17 is a drawing showing that PA, which is a set of planes P1A to P4A, and PB, which is a set of planes P1B to P4B, have been set. The planes P1A to P4A and P1B to P4B are planes having the same moving direction as the planes P1 to P4 in FIG. 14. As described above, by setting a plurality of planes in which the moving directions of the flying objects are aligned, it is possible to move more flying objects.

Figure 18:
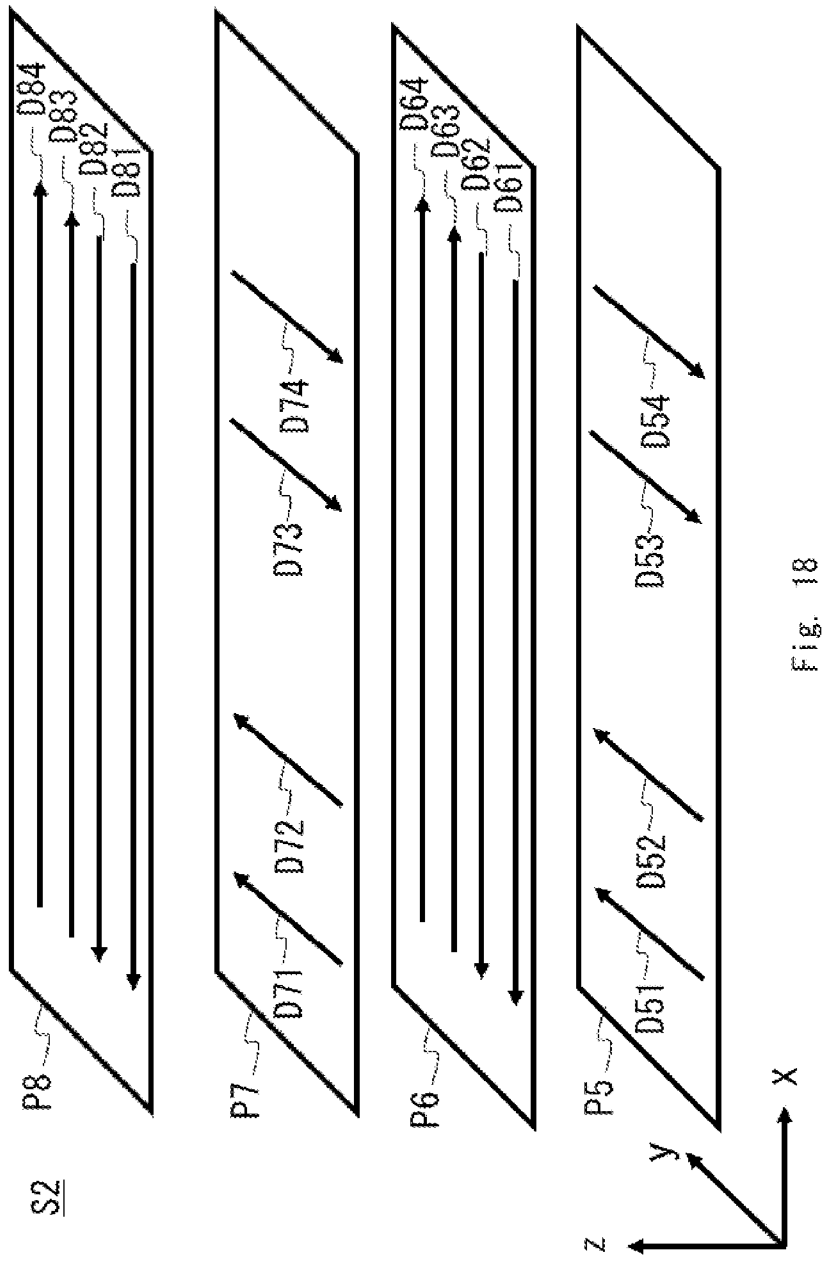
FIG. 18 is a second schematic diagram showing a traffic management method of the fifth example embodiment.

FIG. 18 is a second example showing a traffic management method. In FIG. 18, in the space S2, four planes P5 to P8 having different heights are set. The planes P5 to P8 are set at intervals equal to one or more than one space cell in the height direction, and four lanes are set in the planes P5 to P8 by a flight management apparatus. The plane P5 has lanes D51 to D54 moving in the y axis direction, i.e., the y direction or the −y direction (lateral direction), the plane P6 has lanes D61 to D64 moving in the x axis direction, i.e., the x direction or the −x direction (linear direction), the plane P7 has lanes D71 to D74 moving in the y direction or the −y direction, and the plane P8 has lanes D81 to D84 moving in the x direction or the −x direction.

The plane P5 is a plane for making the y direction or the −y direction a moving direction, and the moving directions of the lanes D51 and D52 are the y direction, and the moving directions of the lanes D53 and D54 are the −y direction. The respective reference speeds of the lanes D51 and D52 may be the same or different. If the respective reference speeds of lanes D51 and D52 are different, it is allowed to move from one lane to the other lane for changing the speed as described above. Lanes D53 and D54 have the same configuration.

The plane P6 is a plane for making the x direction or the −x direction a moving direction, and the moving directions of the lanes D61 and D62 are the −x direction, and the moving directions of the lanes D63 and D64 are the x direction. The plane P7 is a plane for making the y direction or the −y direction a moving direction, and the moving directions of the lanes D71 and D72 are the y direction, and the moving directions of the lanes D73 and D74 are the −y direction. The plane P8 is a plane for making the x direction or the −x direction a moving direction, and the moving directions of the lanes D81 and D82 are the −x direction, and the moving directions of the lanes D83 and D84 are the x direction. Further, the reference speeds of the plurality of lanes having the same moving direction in the respective planes P6 to P8 may be the same or different. This is as described for lanes D51, D52. The space between the planes is used for moving from one plane to another. Note that only one of the planes P5 and P7 may be provided. Furthermore, in addition to the planes P5 and P7, plane(s) in which the same moving direction(s) as the plane P5 or P7 is set may be further provided. Similar variations are possible for the planes P6 and P8.

In the first and second examples described here under the Fifth example embodiment, if the flying object is a flying vehicle on which a person is boarding, the passenger does not see other flying objects coming toward him/her from the front. Therefore, it is possible to suppress the anxiety or fear of the passengers during the flight. In these examples, the flying object flies in a plane by a mechanism similar to that of a vehicle traveling on a two-dimensional road. As a result, the driver can fly in the same way as driving on the road, which has the advantage of making it easier to control the flying object.

In FIG. 17, in a predetermined lane in the plane P1A and a lane in the plane P1B corresponding to the predetermined lane, the latter reference speed may be made higher than the former reference speed. Alternatively, the average of the reference speeds of the lanes in plane P1A and the average of the reference speeds of the lanes in plane P1B may make the latter reference speed higher than the former reference speed. This enables a safer landing of the flying object by reducing the speed at which the flying object approaches the ground when the flying object leaves the plane and lands in an emergency. In FIG. 18, the same setting is possible.

Further, in the case where a plurality of lanes are set in the plane, when a non-flyable area (For example, a building) exists near a predetermined lane, the reference speed of the lane near the non-flyable area may be set to a low speed, and the reference speed of the lane far from the non-flyable area may be set to a high speed. This is to prevent the flying object from entering the non-flyable area if it should deviate from the lane.

The above settings are stored in the memory inside the flight management apparatus 50, and the traffic management unit 57 manages the traffic in the plane by using the settings. The definition of one-way traffic in each lane is realized, for example, by setting the vector of the moving direction in the space cell C belonging to the lane. The validity or invalidity of each vector can optionally be configured to limit movement of the flying object within and/or outside the cell. Such a configuration may be implemented algorithmically and/or manually by an operator of a flight management system based on various factors. At this time, it is preferable not to make the vector causing the congestion excessively invalid.

The traffic management unit 57 can generate the flight route of the flying object moving in the plane along the vector on the basis of the set vector. Alternatively, in response to a request for a specific space cell from the flying object, the flight management apparatus may determine whether or not the specific space cell is on the direction of a vector set from the space cell where the flying object is currently located. The flight management apparatus permits the request if the specific space cell is on the direction of the vector, and can determine the rejection if the specific space cell is not on the direction of the vector. The one-way traffic in each lane described above corresponds to a current highway lane system with a single direction of travel.

In the example shown in FIGS. 14, 15, and 18, a plurality of lanes provided on the same plane may be adjacent to each other, but for safe flight of the flying object, one or more space cell(s) may be provided between the lanes. The same applies to the examples shown in FIGS. 19 and 21-23 to be described later.

The traffic management unit 57 controls the validity/invalidity of the vector in the moving direction for each lane, thereby providing the vector with a function as a "signal"

(stoplights) for instructing the advance or stop of the flying object. By providing the vector with such a function, the flight management apparatus can move a plurality of flying objects moving in different directions in one space.

Figure 19:
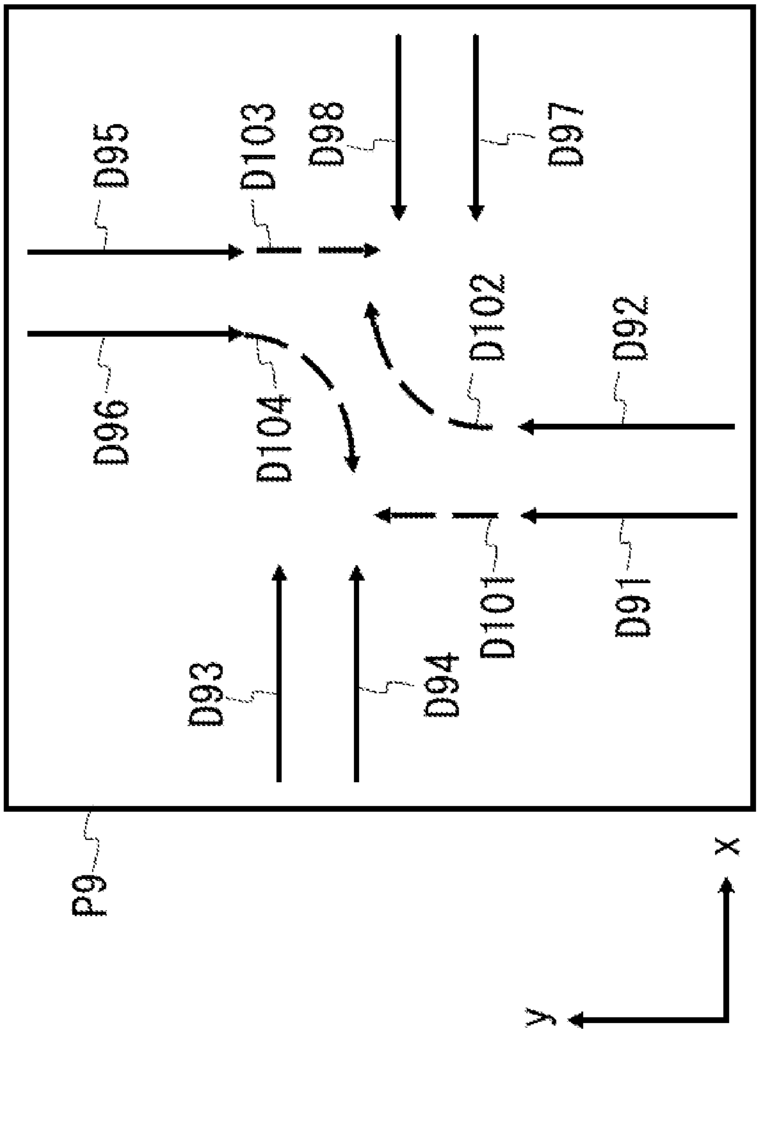
FIG. 19 is a third schematic diagram showing a traffic management method of the fifth example embodiment.

FIG. 19 is a third example showing a traffic management method in which a plurality of flying objects can move in different directions in one plane. In FIG. 19, lanes D91 and D92 in the y direction, lanes D93 and D94 in the x direction, lanes D95 and 96 in the −y direction, and lanes D97 and D98 in the −x direction are set in a plane P9. The plane P9 corresponds to the intersection of crossroads in a typical road.

The flight management apparatus for managing the plane P9 performs the following control so that the flying objects moving along the lanes D91-D98 can fly without being abnormally close to each other. In FIG. 19, in each space cell C of the lane D91 and the lane D91 on the extension of the lane D101, by making the vector in the y direction valid, the flying object in the lane D91 is moved in the y direction along the lane D101. Similarly, in each space cell C of the lane D95 and the lane D103 on the extension of the lane D95, the flight management apparatus makes the vector in the −y direction effective to move the flying object in the lane D95 in the −y direction along the lane D103.

On the other hand, the flight management apparatus sets vectors in the space cells C of the lane D92 in the plane P9 so that the flying object in the space cell C at the end (end point) in the y direction of the lane D102 bends in the plane P9 and moves to the lane adjacent to the lane D98 and on the extension line of the lane D94 in the x direction.

Figure 20A:
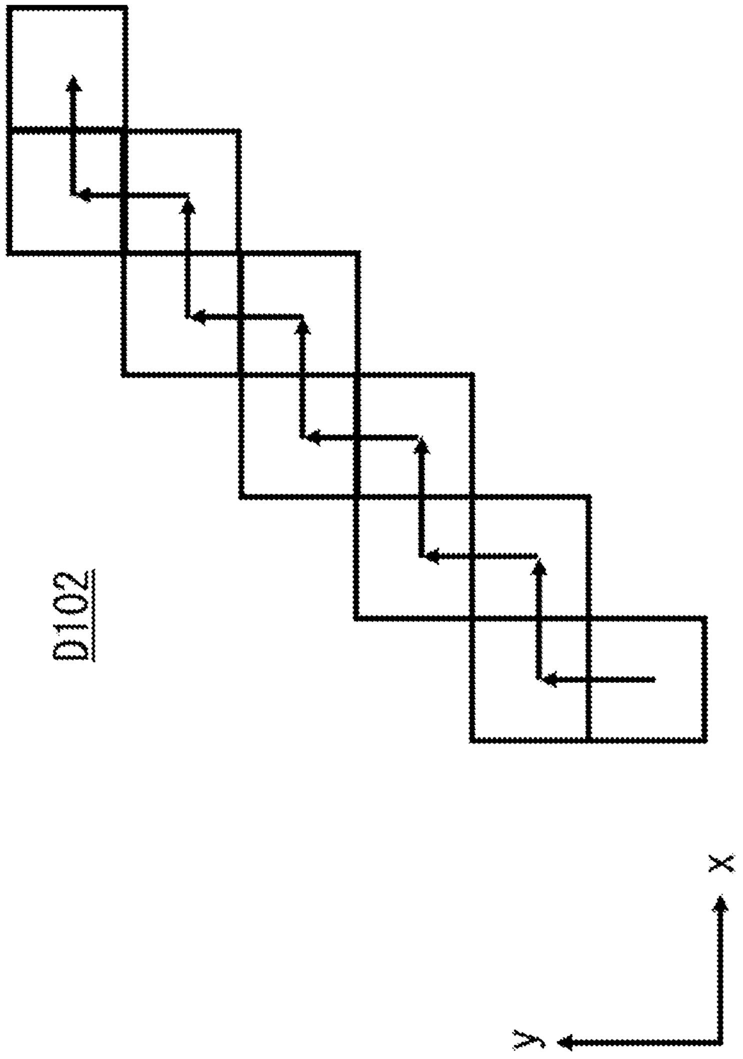
FIG. 20A is one example of schematic views showing a lane D102 of the fifth example embodiment.

FIG. 20A shows an example of the lane D102. In the lane D102, the vectors of the space cells C of the lane D102 are constituted so that the flying object turns the "intersection" by alternately moving the space cell of one mass in the x direction and the y direction.

Figure 20B:
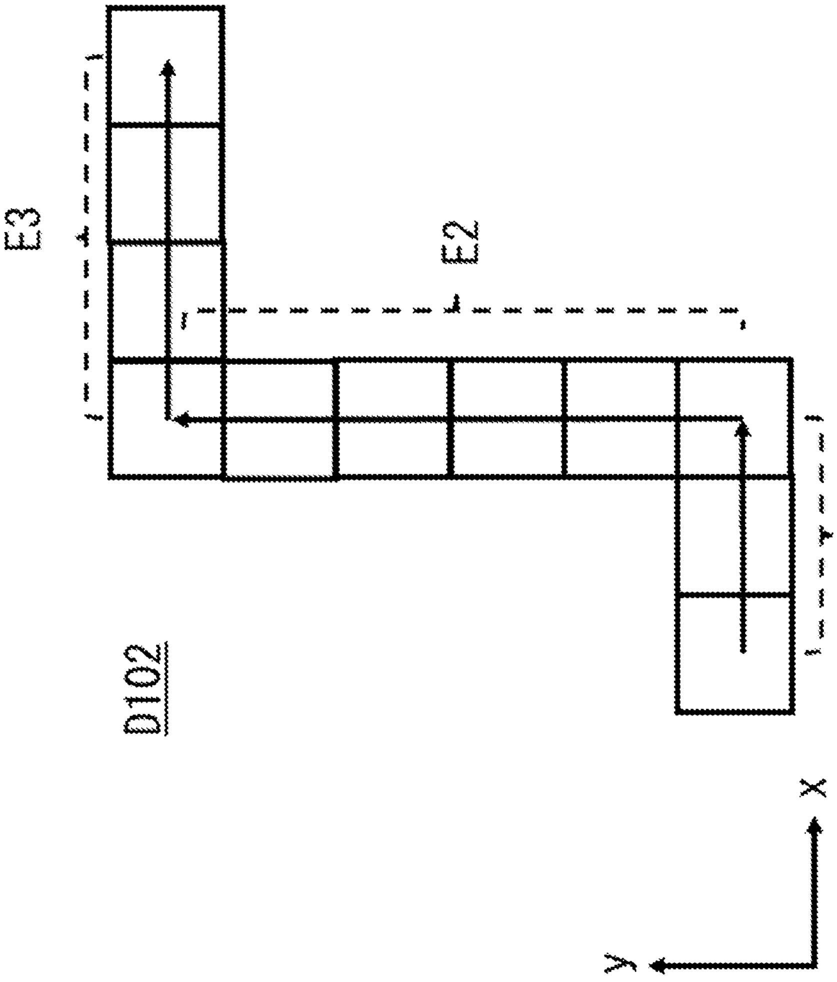
FIG. 20B is another example of schematic views showing the lane D102 of the fifth example embodiment.

FIG. 20B shows another example of the lane D102. In FIG. 20B, the flying object passes along the lane D102 through the region E1 extending in the x direction (In the example of FIG. 20B, 2 space cells), passes through the region E2 extending in the y direction (5 space cells in the example of FIG. 20B), and then passes through the region E3 extending in the x direction (In the example of FIG. 20B, 3 space cells).

The configuration of the lane D102 is not limited to the examples of FIGS. 20A and 20B. It is expected that the smaller the inflection point count of the lane D102 (i.e., the number of turns of the flying object on the lane D102), the smaller the battery consumption of the flying object when moving along the lane D102. However, in the case where the lane D102 has 1 inflection point, the flying object first moves straight in the y-axis direction on the lane D102, and then moves straight in the x-axis direction. Therefore, at the stage where the flying object first travels straight in the y-axis direction on the lane D102, it becomes easy to approach the flying object existing on the lane D104 to be described later. However, as shown in FIG. 20B, when the lane D102 has 2 inflection points, the flying object initially moves on lane D102 in the x-axis direction along the region E1, so that the area where the lane D102 intersects the lane D104 can be reduced. Therefore, the flying object on the lane D102 can move in the "intersection" more safely.

In FIG. 20B, when the distance between the lanes D95 and D96 is 1 or more space cell(s), it is preferable for the safe flight of the flying object on the lane D102 that the region E2 where the lane D102 extends in the y-axis direction is provided between the extension line of the lane D95 and the extension line of the lane D96 in the x-axis direction.

In the lane D102, a space cell intersects the lane D103 in the middle. Therefore, the flight management apparatus performs control so that the flying object existing in the lane D102 does not come into close proximity with another flying object passing through the lane D103.

For example, the flight management apparatus enables the vectors of all the space cells in the lane D103. On the other hand, so that the flying object on the lane D102 is not present in the same space cell as the flying object on the lane D103, the flight management apparatus switches the vector of the space cell on the lane D102 from valid to invalid according to the position of the flying object on the lane D103. At the timing when the flying object on the lane D103 does not come to the intersecting space cell, the flight management apparatus switches the vector of the space cell in the region where the lane D102 crosses the lane D103 and its periphery on the lane D102 from invalid to valid.

Similarly, the flight management apparatus sets vectors in the space cells C of the lane D104 in the plane P9 so that the flying object in the space cell C at the end of the lane D96 in the −y direction (end point) bends in the plane P9 and moves to the lane adjacent to the lane D94 and on the extension of the lane D98 in the −x direction.

Further, the flight management apparatus invalidates the vectors of the space cells in the lanes D93, D94, D97, and D98, thereby controlling the flying object on those lanes so as not to move and not to make an abnormal proximity to another flying object moving along the lanes D101~D104.

Figure 21:
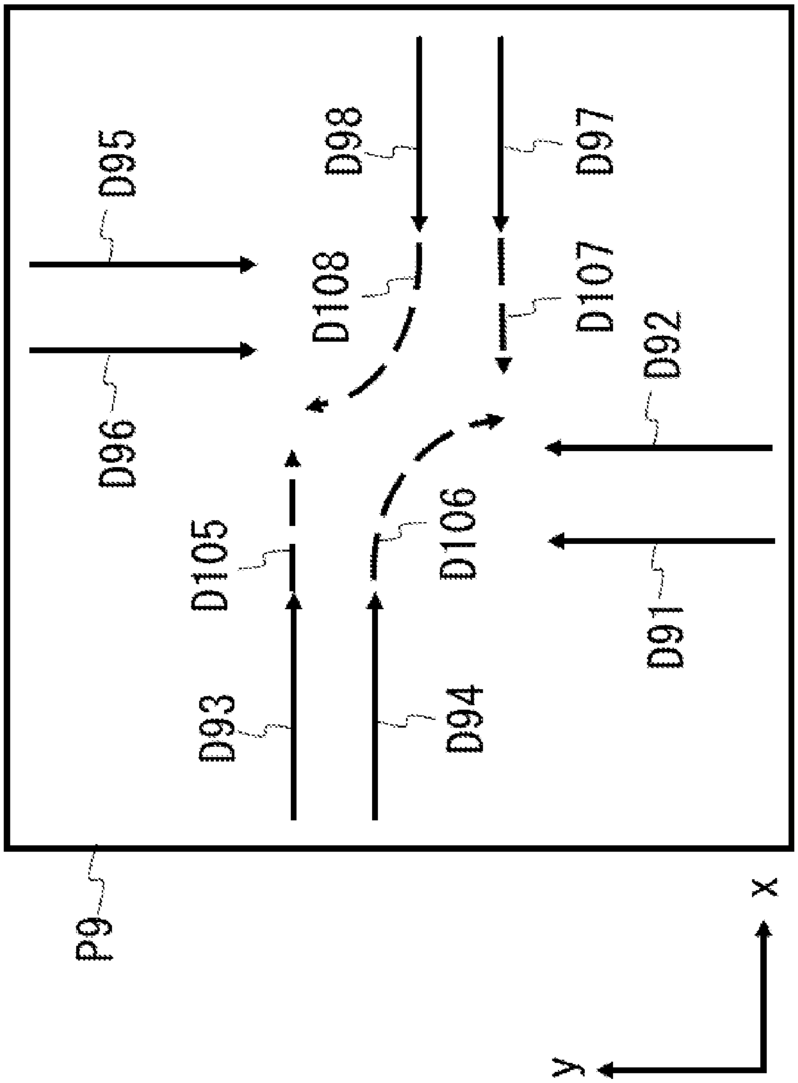
FIG. 21 is a schematic view showing a traffic state in a plane P9 when time elapses from FIG. 19 of the fifth example embodiment.

FIG. 21 shows the traffic state in the plane P9 when the time elapses from FIG. 19. In FIG. 21, the vectors of the space cells in lanes D91, D92, D95, and D96 are disabled, so that the flying objects on those lanes do not move. On the other hand, since the vectors of the space cells in the lanes D93, D97, D105, and D107 are valid, the flying objects on these lanes can go straight. The flight management apparatus controls the validity/invalidity of the vector of the space cells C in the lanes D94 and D106 and the lanes D98 and D108 in the same manner as the validity/invalidity of the vector of the space cells C in the lanes D92 and D102 and the lanes D96 and D104 shown in FIG. 19. Thus, the flying object on the lanes D94, D98 can turn in the plane.

As described above, by algorithmically stopping traffic in one direction, the flight management apparatus can pass traffic in another direction.

In addition, the flight management apparatus can set permission or rejection of take-off and landing and space movement of the flying object by setting the validity or invalidity of the vector in the height direction.

Figure 22:
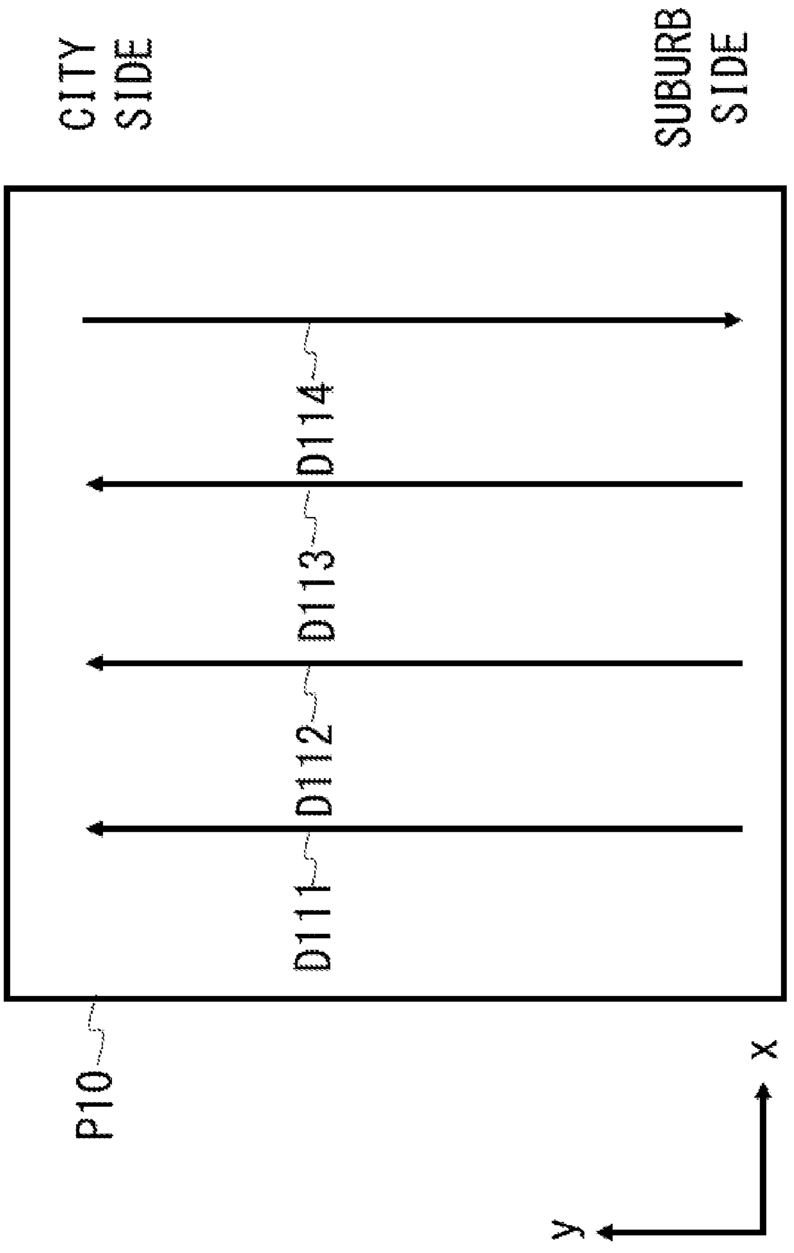
FIG. 22 is a fourth schematic diagram showing a traffic management method of the fifth example embodiment.
Figure 23:
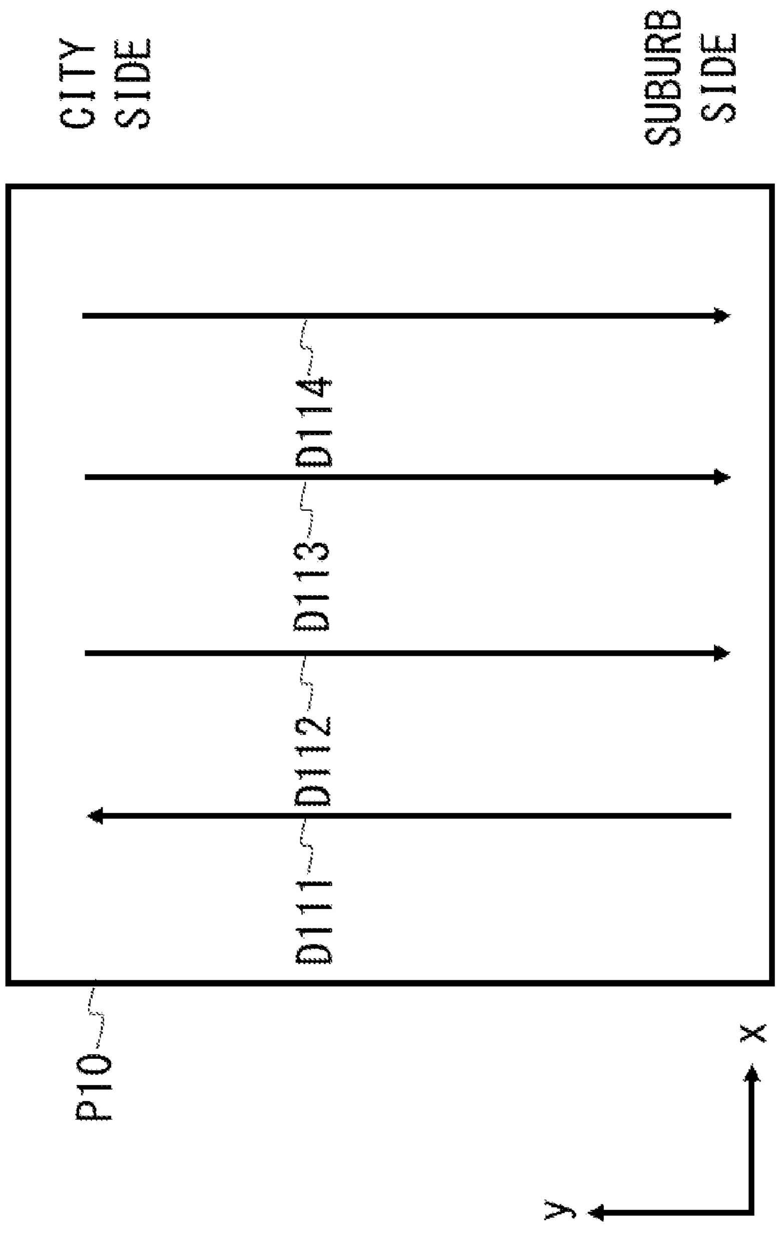
FIG. 23 is a fifth schematic diagram showing a traffic management method of the fifth example embodiment.

FIGS. 22 and 23 show a fourth example of a traffic management method in which the moving direction of a lane is changed according to time. In FIG. 22, there is a city in the y direction and a suburb in the −y direction of plane P10. FIG. 22 shows the flow of traffic in the plane P10 in a predetermined time zone (especially during rush hour) in the morning, and shows how people go to work in the city by using flying objects (flying cars). Vectors of space cells in each lane are set so that the lane D111~D113 is a lane going in the y direction and the lane D114 is a lane going in the −y direction.

In FIG. 22, there are 3 lanes toward the city and 1 lane toward the suburbs. Thus, by setting more lanes toward the city than those toward the suburbs during rush hour, congestion in the plane P10 can be alleviated.

FIG. 23 shows the traffic flow in plane P10 at predetermined times in the evening and night, and shows how people use the flying cars to return to their suburban homes. Vectors of space cells in each lane are set so that a lane D111 is a lane going to a city and a lane D112~D114 is a lane going to a suburb. Here, the flight management apparatus mitigates congestion in the plane P10 by setting more lanes toward the suburb than the lanes toward the city.

In the above example, the vectors of the space cells in each lane may be set so as to be always valid for the flying object having the priority "high". For example, in the example shown in FIG. 19, when a high-priority flying object exists on the lane D93, the flight management apparatus makes the vectors of the space cells in the lane D93 valid, not invalid. By this setting, the flight route of this flying object is set and the space cells on the flight route are reserved, and it becomes possible to move in the x direction. At this time, the vectors of the space cells in the lanes D95, D96, D103, and D104 are temporarily invalidated, so that the high priority flying object traveling across the lanes D103 and D104 can safely move. It should be noted that the flight management apparatus can acquire priority information from the flying object by means of a communication protocol or the like.

Further, the flight management apparatus may change the validity or invalidity of the vectors of the space cells in the lane based on weather information. For example, in FIG. 22, the flight management apparatus obtains from the network that the wind velocity in the plane P10 is equal to or greater than a predetermined value. At this time, among the lanes D111 to D113, the flight management apparatus invalidates the vectors of the space cells of the lane D112 to set only the lanes D111 and D113 to operate. Thus, the safety of the flight can be improved by providing a space between the lanes.

The flight management apparatus may set the vectors of the space cells in each lane in consideration of at least one of time information and date information. For example, during the rush hour on weekday mornings, in the plane P10, the lanes D111~D113 may be set to be a lane toward the city, the lane D114 may be set to be a lane toward the suburbs, and on weekend mornings, the lanes D111 and D112 may be set to be lanes toward the city, and the lanes D113 and D114 may be set to be lanes toward the suburbs.

Sixth Example Embodiment

The flight management apparatus may set one or more predetermined space cells to be managed, or one or more planes to be managed so as to permit the entry of a flying object having priority "high" while not permitting or rejecting the entry of a flying object having priority "low" thereof. In addition, the flight management apparatus may not permit the evacuation of a flying object with the priority "low" with respect to one or more predetermined space cells to be managed, or one or more planes to be managed, in the direction in which a flying object with the priority "high" can evacuate.

For example, in the example shown in FIG. 14, in the space cells other than the end portions of the lane D11, the vectors of the space cells may be set such that at least either the movement in the x direction or the movement in the z direction (ascent or descent) is rejected for the flying object having the priority "low". As a result, the movements of the flying objects other than the flying objects having the priority "high" (the emergency vehicles or the vehicles with low battery level) around the lane D11 are suppressed, thereby ensuring the safety of the flight around the space P1. Similarly, in the example shown in FIG. 14, in the space cells other than the end portions of the lane D31, the vectors of the space cells may be set such that at least either the movement in the y direction or the movement in the z direction (ascent or descent) is rejected for the flying object having the priority "low".

It should be noted that the flight management apparatus may always perform the above setting for the low-priority flying object, or may perform the setting in at least one of a predetermined time zone and a date.

Seventh Example Embodiment

It is also possible to manage the movement of the flying object over a wide area space by connecting a plurality of flight management apparatuses and continuing the spaces managed by these flight management apparatuses.

Figure 24:
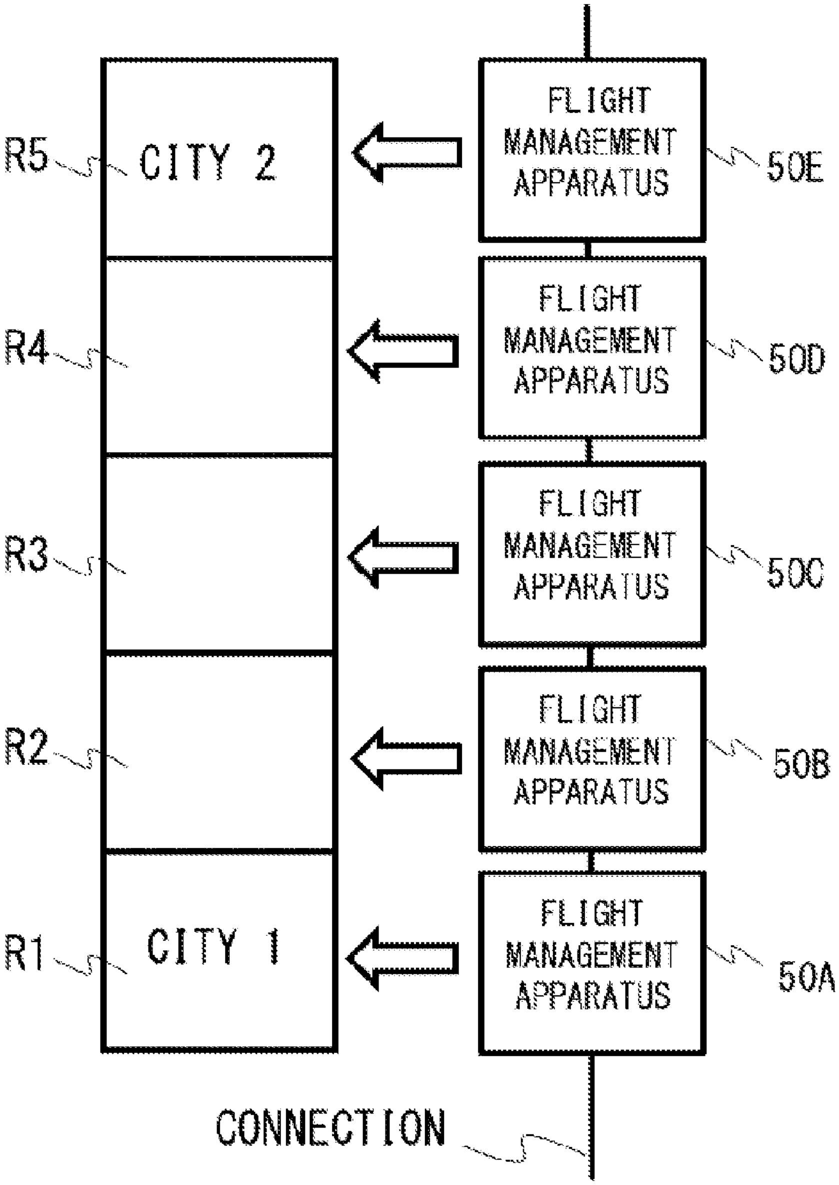
FIG. 24 is a schematic diagram of a system configured by connecting a plurality of flight management apparatus of a seventh example embodiment.

FIG. 24 is an image diagram of a system configured by connecting a plurality of flight management apparatuses. The flight management apparatuses 50A to 50E have a configuration similar to that of the flight management apparatus 50 of the above-described third example embodiment, and manage the spatial regions R1 to R5, respectively.

In FIG. 24, the spatial region R1 includes a city 1, and the spatial region R5 includes a city 2. The spatial regions R2 to R4 are regions connecting the city 1 and the city 2, and the flying object 60 moves from one of the spatial regions R1 or R5 to the other via the spatial regions R2 to R4.

Hereinafter, in addition to the process executed by the flight management apparatus 50 described in the third example embodiment, the process executed by the flight management apparatus 50A will be described. While the flying object 60 moving from the city 1 to the city 2 is flying in the area R1, the flying object 60 transmits a request concerning a space cell to be moved next to the flight management apparatus 50A. The flight management apparatus 50A permits or rejects the request as described above.

When the flying object 60 enters a space cell on the boundary with the area R2 or in the vicinity of the boundary in the area R1, the flying object 60 transmits a request regarding a space cell on the boundary with the area R1 in the area R2 to the flight management apparatus 50B. The flight management apparatus 50A recognizes that the flying object 60 is at the end of the area R1 based on the request or GPS information acquired from the flying object 60 by the data acquisition unit 52, and transmits information indicating that the flying object 60 is approaching the area R2 to the flight management apparatus 50B. The transmitted information may include identification information of the approaching flying object 60.

The flight management apparatus 50B recognizes the flying object 60 flying toward the area R2 based on the information acquired from the flight management apparatus 50A. In response to the request received from the flying object 60, the flight management apparatus 50B permits or rejects the request.

When the flight management apparatus 50B permits the request, the flying object 60 can move from the region R1 to R2. During the flight in the area R2, the flying object 60 transmits a request regarding the next moving target space cell to the flight management apparatus 50B. The flying object 60 can reach the area R5 and arrive at the city 2 by performing the same processing even at or near the boundary of each area.

When the flight management apparatus 50B rejects the request, the flying object 60 can move (evacuation) to a space cell different from the requested space cell. The flying object 60 transmits a request concerning a space cell to be evacuated to a flight management apparatus for managing the space cell of an area R1 to be evacuated. For example, if the flying object is in a space cell at a boundary with the region R2 in the region R1, the flying object 60 may send a request for movement to a space cell located above or below the currently located space cell. The details are as described in the third example embodiment (especially FIG. 9). The same processing can be realized by the flight management apparatuses other than the flight management apparatuses 50A and 50B.

As described above, by connecting the plurality of flight management apparatuses 50, it is possible to continuously manage the flight of the flying object 60 over a wide area. Since the whole system for managing a wide area can be configured by connecting a plurality of flight management apparatuses, the movement of a flying object in a local government unit such as a city, a prefecture or a state unit, or in a wide area including a plurality of them or a national unit can be managed. In other words, the entire system for managing a wide area can be distributed or divided into different areas, each managed by a plurality of flight management apparatuses. Therefore, the scalability and expandability of the system can be improved. The area to be managed by the flight management apparatus is determined by, for example, geographical location or zoning set by the administration.

In the example shown in FIG. 24, the flying object 60 can use the same communication protocol in communication with flight management apparatuses 50A-50E.

Eighth Example Embodiment

Figure 25A:
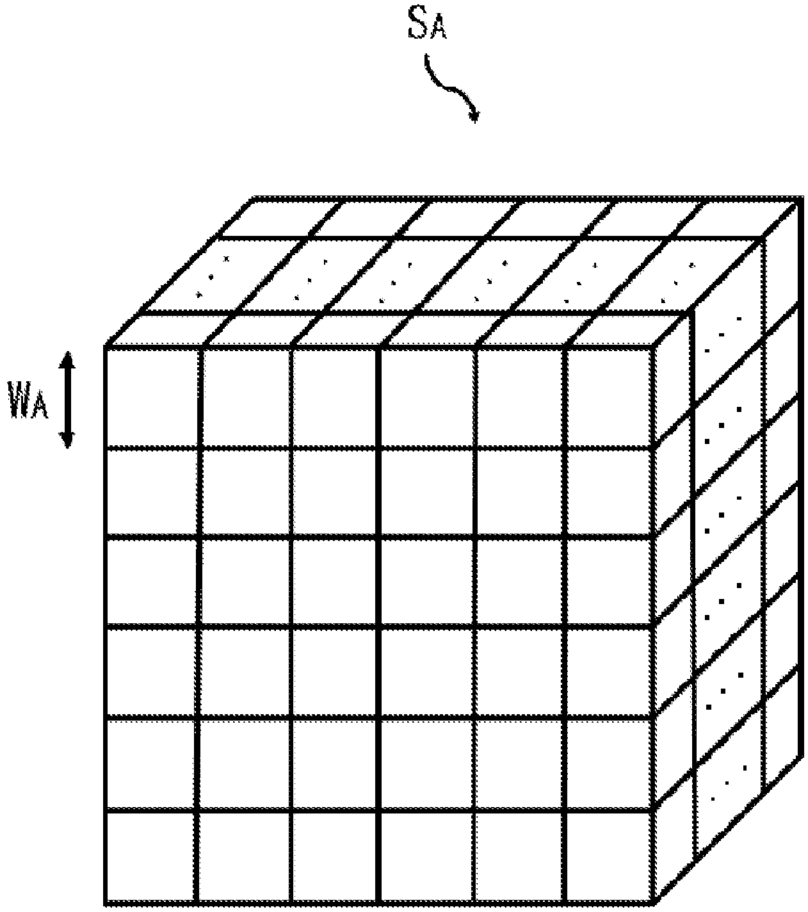
FIG. 25A is a first schematic diagram showing a method of dividing a space of an eighth example embodiment.
Figure 25B:
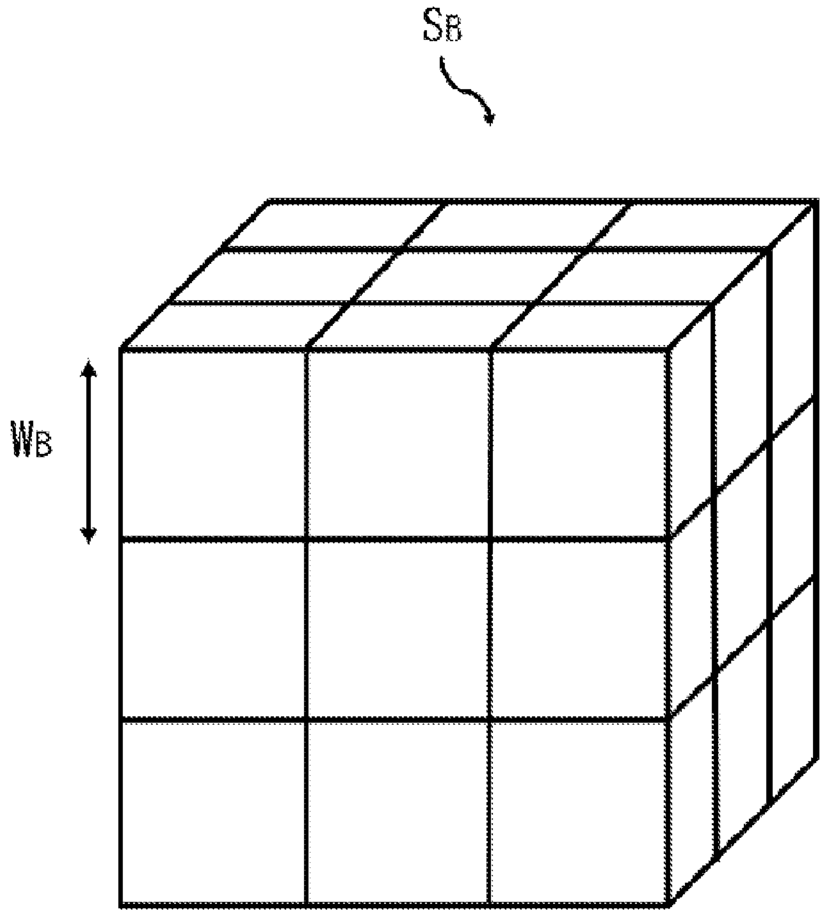
FIG. 25B is a second schematic diagram showing a method of dividing a space of the eighth example embodiment.

The eighth example embodiment of the present disclosure will be described below with reference to the drawings. The flight management apparatus can change the size (especially the length of one side) of the space cell. FIGS. 25A and 25B show an example in which the size of a space cell dividing the same spatial region is changed. In FIG. 25A, the space $S_A$ is divided into $6^3$=216 space cells by a cube with one side $W_A$. On the other hand, in FIG. 25B, the space $S_B$ having the same volume as the space $S_A$ is divided into $3^3$=27 space cells by a cube of one side $W_B$. The length of one side of $W_B$ is twice that of $W_A$.

When the space cell is small, the number of flying objects that can exist in the same volume can be increased, but the number of request transmissions that the flying object performs during the flight in one space S increases. For example, from the time when the flying object enters the space $S_A$ in FIG. 25A to the time when the flying object leaves the space $S_A$, it is necessary to process the request with the flight management apparatus at least 6 times. Therefore, the processing load of the entire flight management system is increased. Further, as described in the third embodiment, when the request destination space cell is reserved by another flying object, the flying object must be evacuated to another space cell. Thus, when the number of flying objects in the space increases, the evacuating action of the flying object when the request is rejected tends to increase. Therefore, the time required for the flying object to fly in one space S can be increased.

When the space cell is large, the number of flying objects that can exist in the same volume decreases, but the number of request transmissions performed by the flying object during the flight in one space S decreases. For example, from the time when the flying object enters the space $S_B$ in FIG. 25B to the time when the flying object leaves the space $S_B$, the minimum required request processing with the flight management apparatus is 3 times. As a result, the smaller the number of flying objects in the space, the less the flying object tends to retreat when the request is rejected, so that the required time for the flying object to fly in one space S can be shortened.

From the above characteristics, the flight management apparatus can change size of the space cells of the space managed by itself according to the time zone. For example, the flight management apparatus for managing the space shown in FIGS. 22 and 23 is set so that a large number of flying objects can move between the city and the suburbs by reducing the size of the space cells in a predetermined time zone (especially during rush hours) in the morning and evening. On the other hand, in the other time zone (Especially late at night), since it is assumed that the number of flying objects moving between the city and the suburbs is small, the size of the space cells is set large so that the flying objects can move quickly.

The size of the space cells may be set according to the characteristics of the area managed by the flight management apparatus. For example, the flight management apparatus may reduce the size of the space cells when managing a space in an area where many flying objects are assumed to be congested, and may increase the size of the space cells when managing a space in an area where few flying objects are assumed to be present. The former is assumed to be an urban area or an area related to a junction where flying objects moved from a plurality of directions merge. The latter are assumed to be rural areas, mountainous areas, and areas with small populations connecting cities.

For example, in FIG. 24, the flight management apparatuses 50A and 50E can set the space cells small, while the flight management apparatuses 50B to 50D can set the space cells large. Thus, since the speed at which the flying object 60 flies in the regions R2 to R4 can be increased, the regions R2 to R4 can be set as highways connecting urban areas. As described above, the flight management apparatus can control the flow of traffic.

The following variations are also possible. When the size of the space cells is large, for the flying object, there is more time to reach the next flying space cell than when it is small. Therefore, when the size of the space cells is large, the time required for the flying object to transmit the request of the next flying space cell to the flight management apparatus after entering a certain space cell may be increased as compared with the case where the size of the space cell is small. For example, in the space S A of FIG. 25A, the flying object transmits the request for the next space cell on the flight route immediately after the flying object enters the space cell. On the other hand, in the space S B shown in FIG. 25B, after the flying object enters a certain space cell, the flying object transmits the request for the next space cell on the flight route after the flying object has traveled a course of about half the length of one side of the space cell.

In another example, when the size of the space cells is small, the flying object transmits a first request, and when the request is rejected, the flying object transmits a second request regarding the space cell to be evacuated. On the other hand, when the size of the space cells is large, the flying object may transmit a plurality of requests for the same space cell. Specifically, when the flying object transmits the first request and the request is rejected, the flying object transmits the second request for the same space cell as the first request at a predetermined interval. If the second request is also rejected, the flying object may transmit the third request regarding the space cell to be evacuated, which is different from the requested space cell, or the flying object may transmit the third and subsequent requests for the same space cell at a predetermined interval.

Even when the size of the space cells is small, the flying object may transmit a plurality of requests for the same space cell. However, when the size of the space cells is large, the number of times the flying object can transmit a request for the same space cell may be increased as compared with when the size of the space cells is small. Thus, when the space cells are large, the flying object can fly so as not to deviate from the initial flight route as much as possible, so that the flight time of the flying object can be shortened.

Ninth Example Embodiment

In this example embodiment, the risk avoidance processing performed by the flying object and the flight management apparatus in an emergency will be described. An emergency means a case where two or more flying objects are present in the same cell, or a trouble occurs in the flying object, and further flight is impossible and an emergency landing is necessary for safety, but this is not limited to this case.

(9-1)

Figure 26:
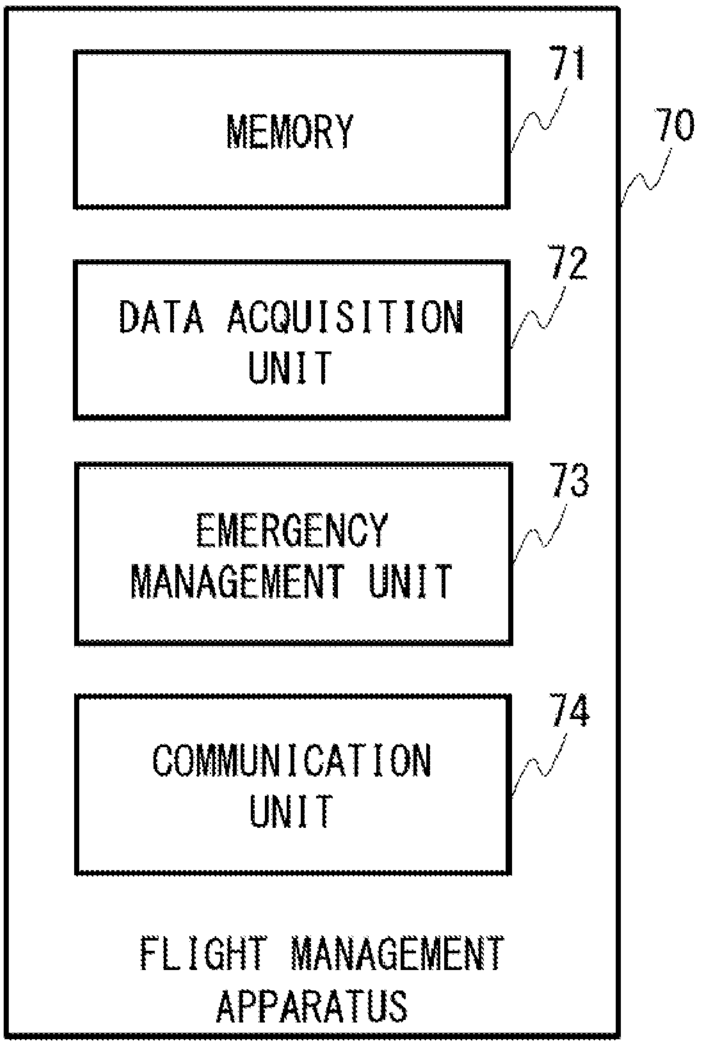
FIG. 26 is a block diagram of a flight management apparatus 70 of a ninth example embodiment.

FIG. 26 is a block diagram showing the configuration of a flight management apparatus 70. The flight management apparatus 70 includes a memory 71, a data acquisition unit 72, an emergency management unit 73, and a communication unit 74. The memory 71 stores a plurality of space cells and their reservation states. In addition, the memory 71 may store at least any information such as information on the non-flyable area, a flight route of each flying object, and vector setting information in the space cells. The data acquisition unit 72 acquires various types of data used for determining the flight route of the flying object, similarly to the data acquisition unit 32.

As described later, the emergency management unit 73 executes a process corresponding to an emergency request received from the flying object 80. The communication unit 74 is an interface through which the flight management apparatus 70 communicates with the flying object 80.

Figure 27:
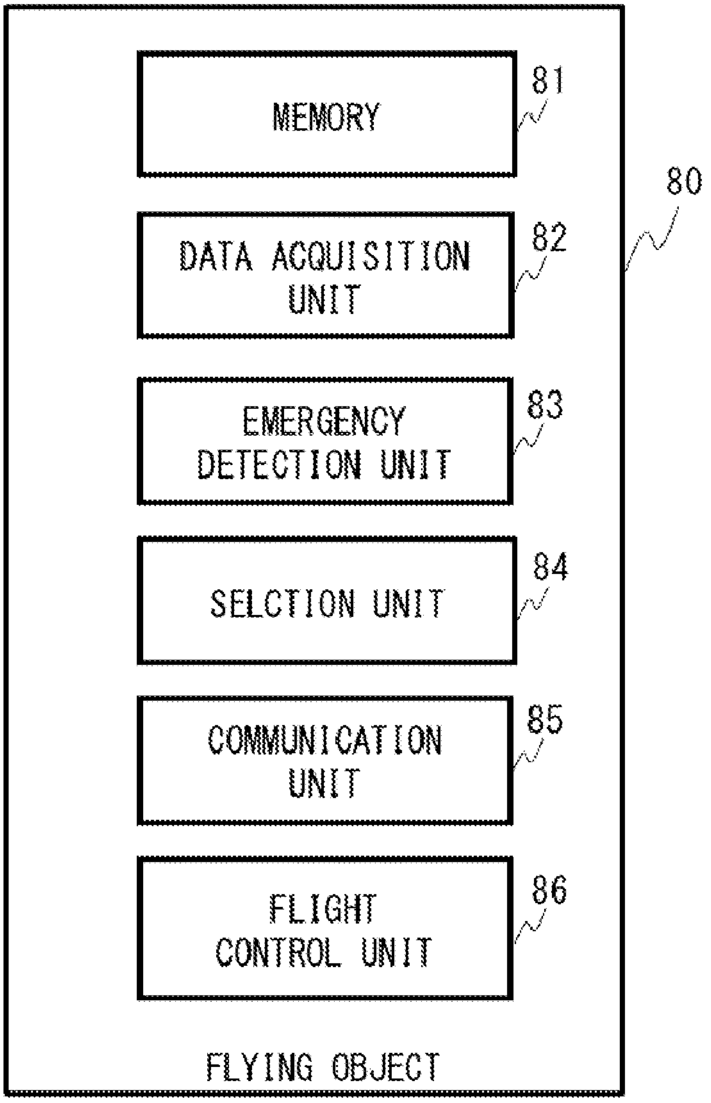
FIG. 27 is a block diagram of a flying object 80 of a ninth example embodiment.

FIG. 27 is a block diagram showing the configuration of a flying object 80. The flying object 80 includes a memory 81, a data acquisition unit 82, an emergency detection unit 83, a selection unit 84, a communication unit 85, and a flight control unit 86. The memory 81, like the memory 61, stores the information of the space cells C, the present position of the flying object 60, the flight route of the flying object 60, and the information of the space cells C reserved by the flying object 60 on the flight route. The data acquisition unit 82 is composed of detection units such as sensors, radars, and cameras mounted on the flying object 80, and detects that another flying object is within a predetermined distance (For example, less than 100 m). Similarly to the request generation unit 63, the selection unit 84 selects a space cell adjacent to the space cell at the present position to be reserved by the flying object 60, and also selects a space cell adjacent to the space cell at the present position other than the rejected space cell when the rejection information related to the request is transmitted from the flight management apparatus 70. Further, as described later, the selection unit 84 selects a space cell as a retreat destination in an emergency situation requiring an urgent retreat from the current space cell. The communication unit 85 is an interface through which the flying object 80 communicates with the flight management apparatus 70. The flight control unit 86 controls the movement of the airframe of the flying object 80.

Hereinafter, specific examples of the processing will be described. After a flying object 80 reserves a prescribed space cell, while flying the space cell, a data acquisition unit 82 detects that another flying object is flying in the same space cell. An emergency detection unit 83 determines that it is an emergency situation in which another flying object is close based on the result detected by the data acquisition unit 82. Based on the judgment of the emergency detection unit 83, the flying object 80 judges that it is necessary to retreat from the current space cell and reserve another space cell, and the selection unit 84 selects one or more space cells (escape cell) as the saving destination.

For example, when the flying object 80 is flying in a predetermined plane, the selection unit 84 may select a space cell located above or below the plane, or both of the space cells. When the data acquisition unit 82 is capable of detecting the traveling direction and speed of another flying object in the same space cell, the selection unit 84 may select one or more retreat cells such that the traveling direction vector of the flying object 80 does not overlap the traveling direction vector of the other flying object. For example, when another flying object is located in front of the flying object 80 and is moving upward, the selection unit 84 may select a space cell located below the current space cell.

The flying object 80 uses the communication unit 85 to transmit an emergency request related to the movement of the space cell selected by the selection unit 84. At this time, the communication unit 85 may also transmit to the flight management apparatus 70 information on the space cell where the current flying object 80 is located and detailed information on another flying object detected by the data acquisition unit 82 (e.g. direction and speed information).

The communication unit 74 of the flight management apparatus 70 receives the emergency request from a flying object 80. In response to the request, the emergency management unit 73 determines whether there is a space cell that is not reserved in advance and is not located in the non-flyable area among the one or more space cells related to the request. When the space cell corresponding to such a condition exists, the emergency management unit 73 executes reservation processing of the space cell corresponding to the condition and transmits information of the space cell to which the reservation processing is executed by using the communication unit 74.

When there is no space cell corresponding to the condition in the space cell(s) related to the request, the emergency management unit 73 may further specify a space cell adjacent to the space cell where the flying object 80 is currently located, which is not in the non-flyable area and is not reserved, based on the reservation state. Here, the emergency management unit 73 may specify one space cell based on the real-time data as in the case of the request generation unit 63. An emergency management unit 73 executes reservation processing of the specified space cell and transmits information of the space cell where the reservation processing is executed by using a communication unit 74.

The flying object 80 retreats to the reserved space cell as soon as possible based on the received information. Thus, the flying object 80 can avoid colliding with another flying object, and can fly safely.

The flight management apparatus 70 may further include the route generation unit 33 shown in the second example embodiment. After the emergency management unit 73 specifies the space cell in which the flying object 80 retreats, the route generation unit 33 generates a new flight route for the flying object 80 based on the original flight route of the flying object 80 stored in the memory 71, the reservation states of the space cells, the position information of the specified space cell, and the data of the non-flyable area. For example, the route generation unit 33 may generate a new flight route such that the flying object 80 returns to the original flight route after flying a predetermined number of evacuation space cells (For example, after flying a space cell vertically away from a plane where a plurality of flying objects are flying). At this time, the flight management apparatus 70 may execute the reservation processing of all or part of the space cells in the newly generated flight route. The flight management apparatus 70 transmits the information of the newly generated flight route or the information of the newly reserved space cell to the flying object 80. The flying object 80 stores the information in a memory 81.

Alternatively, the flying object 80 may further include the route generation unit 43 shown in the second example embodiment. After receiving the information of the space cell for which the reservation processing has been executed from the flight management apparatus 70, the route generation unit 43 uses the information of the original flight route stored in the memory 41, the data acquired by the data acquisition unit 82, and the data of the non-flyable area to determine a new flight route of the flying object 80. The method of determining the flight route is as described above. The flying object 80 transmits a request concerning the movement of all or part of the space cells related to the newly determined flight route by using the communication unit 85. The flight management apparatus 70 executes the processing described in the third example embodiment (especially FIG. 9) to perform the reservation processing of the space cell.

As described above, the flight management apparatus 70 or the flying object 80 can newly generate a flight route after the evacuation and provide guidance for the flying object 80.

(9-2)

Next, an example of performing an emergency landing when the remaining battery capacity of the flying object is less than a predetermined threshold will be described. The configuration of the flight management apparatus 70 and the flying object 80 is as shown in FIGS. 26 and 27.

First, the data acquisition unit 82 detects that a trouble has occurred in the flying object 80. The trouble is that the remaining amount of the battery is less than a predetermined threshold value, an engine abnormality of the flying object 80, or a sudden change in the weather. The sudden change in weather means, for example, the occurrence of at least one of precipitation per hour of a predetermined value or more, a strong wind with a wind velocity of a predetermined value or more, and a pressure drop of a predetermined value or more, thereby causing weather unsuitable for flight. This information can be obtained by a sensor attached to the battery or engine, or a sensor that detects weather information.

The emergency detection unit 83 determines that an emergency landing is necessary based on the detection result of the data acquisition unit 82. Then, the selection unit 84 selects one or a plurality of space cells (escape cell) as evacuation destinations. The selection unit 84 may select a space cell located below the space cell where the current flying object 80 is located for quick emergency landing. However, the selection unit 84 may select a space cell in front of or on the side of the space cell in which the flying object 80 is currently located and which consumes less battery in relation to movement, instead of or together with the space cell located below, based on the above described real-time data.

The flying object 80 uses the communication unit 85 to transmit an emergency request related to the movement of the space cell(s) selected by the selection unit 84. At this time, the communication unit 85 may also transmit the information of the space cell where the flying object 80 is currently located to the flight management apparatus 70.

The communication unit 74 of the flight management apparatus 70 receives the emergency request concerning the emergency landing from the flying object 80. In response to the request, the emergency management unit 73 performs the same determination and reservation processing as in the case of the (9-1) and transmits information regarding the reserved space cell to the flying object 80. The flying object 80 moves to the reserved space cell on the basis of the received information.

The flight management apparatus 70 may further include the route generation unit 33 shown in the second example embodiment. After the emergency management unit 73 specifies a space cell in which the flying object 80 is to evacuate, the route generation unit 33 generates a new flight route for the flying object 80 for emergency landing based on the position data of the space cell related to the emergency landable place stored in the memory 71, the reservation states of the space cells, the position information of the specified space cell, and the data of the non-flyable area. The route generation unit 33 may generate a flight route that minimizes the time or the battery consumption to the emergency landable place. The flight management apparatus 70 may also execute the reservation processing of all or part of the space cells in the newly generated flight route. The flight management apparatus 70 transmits the information of the newly generated flight route or the information of the newly reserved space cells to the flying object 80. The flying object 80 stores the information in the memory 81.

Alternatively, the flying object 80 may further include the route generation unit 43 shown in the second example embodiment. After receiving the information of the space cell on which the reservation processing is executed from the flight management apparatus 70, the route generation unit 43 generates a new flight route of the flying object 80 for emergency landing by using the position data of the space cell(s) related to the emergency landable place stored in the memory 81, the data acquired by the data acquisition unit 82, and the data of the non-flyable area. The flying object 80 transmits a request of all or a part of the space cells in the newly determined flight route by using the communication unit 85. The flight management apparatus executes the processing described in the third example embodiment (especially FIG. 9) to perform the reservation processing of the space cells.

In (9-1) and (9-2), when the flight management apparatus 70 or the flying object 80 detects or receives that two or more flying objects are flying in the same cell, or that the remaining battery of the flying object is less than the predetermined value and needs an emergency landing, it may report the danger to the local authority having jurisdiction over the area.

In (9-1) and (9-2), when the emergency detection unit 83 detects an emergency situation, the flying object 80 may not transmit the request concerning a specific space cell to the flight management apparatus 70. The flying object 80 notifies the flight management apparatus of emergency information including emergency situation information detected by the emergency detection unit 83 (situations where another flying object is close to the flying object 80 or the remaining battery level is less than the specified value) and position information of a space cell where the flying object 80 is flying. The emergency management unit 73 of the flight management apparatus 70 selects a space cell for evacuation of the flying object 80 based on emergency information.

Here, the emergency management unit 73 may select a non-reserved space cell that is not in the non-flyable area when the flying object 80 and another flying object are close to each other. The above-mentioned real-time data may be used for this selection. Further, the flight management apparatus 70 may generate a new flight route for the flying object 80 and reserve all or part of the space cells of the flight route.

Further, when the remaining battery capacity of the flying object 80 is less than a predetermined value, the emergency management unit 73 may select a space cell which is not in the non-flyable area and is not a reserved space cell, and (i) is located below the space cell where the flying object 80 is present or (ii) where the battery consumption for the movement from the current space cell is the minimum. Further, the flight management apparatus 70 may generate a flight route for emergency landing of the flying object 80 and reserve all or part of the space cells of the flight route.

Further, in (9-2), the flight management apparatus 70 may set the priority of the flying object 80 that has transmitted the emergency landing request to "high". The emergency management unit 73 of the flight management apparatus 70 specifies the shortest path or the path with the minimum battery consumption from the space cell where the current flying object 80 is located or the requested space cell to the space cell related to the emergency landable place, regardless of the reservation states of the space cells. Then, the emergency management unit 73 reserves all or part of the space cells related to the specified route.

The emergency management unit 73 cancels the reservation(s) in the memory 71 to another flying object (i.e., another flying object currently flying or flying in the future on the route) that has reserved the space cell(s) pertaining to the specified route, and notifies another flying object that the reservation(s) has been cancelled. The notified flying object quickly moves the space cell at the present position or processes the request of the next moving space cell.

Further, the emergency management unit 73 may cancel the reservation(s) in the memory 71 to another flying object that has reserved the space cell related to the emergency landable place and/or the space cells adjacent thereto, and may notify another flying object that the reservation has been cancelled. "adjacent space cells" refer to, for example, space cells including an area within a predetermined distance from the space cell pertaining to the emergency landable place. In response to the received notification, another flying object may re-determine the flying space cell and transmit a request regarding the flight permission of the space cell(s).

As described above, the flight management apparatus 70 can improve the safety of a flying object in an emergency situation and other flying objects.

Tenth Example Embodiment

In this embodiment, it is further described that the flight management apparatus restricts or prohibits the movement of a flying object to a specific space cell.

(10-1)

According to the first example embodiment, when a building or the like exists in the space S and a non-flyable area is generated, the flight management apparatus 10 may store the area as a non-flyable area in the memory 11. However, the flight management apparatus may set space cell(s) satisfying other conditions as a non-flight area. The other condition may be, for example, a case in which the target space cell(s) are space cell(s) in which a residential area, an airport, a military facility, a government facility, or the like is entirely or partially occupied and space cell(s) (adjoin, for example) in the vicinity of the cell(s). The setting of the non-flyable area as described above may be made permanently or temporarily, or the setting of the non-flyable area of all or some of the space cells may be turned on or off automatically or manually (operation of the operator's flight management apparatus). A space cell whose setting of the non-flyable area is valid becomes an area where the flying object cannot fly, and a space cell whose setting of the non-flyable area is invalid becomes an area where the flying object can fly.

In addition, the flight management apparatus may acquire weather information indicating that weather unsuitable for flight occurs in a predetermined area in a space managed by the flight management apparatus via a weather sensor or an external network. Weather unsuitable for flight includes, for example, heavy rain, strong wind, thunder, tornado, etc. The flight management apparatus may determine that weather unsuitable for flight occurs by determining from the weather information that precipitation per hour of a predetermined value or more, strong wind of a predetermined value or more, and pressure drop of a predetermined value or more occurs.

When the weather unsuitable for flight occurs in a prescribed area, a flight management apparatus sets the space cells constituting the prescribed area as a non-flight area. It should be noted that this setting may be set during a period in which such weather occurs, and may be canceled (disabled) after the period ends. The cancellation of the setting may be performed automatically or manually. For example, the flight management apparatus may acquire weather information from an external network and determine a period during which unsuitable weather occurs for flight based on the information.

In addition, the flight management apparatus may set a predetermined space cell, a plane in which a flying object flies, or a space managed by the flight management apparatus as a non-flyable area based on the number of flying objects. For example, if the density of the flying objects in the surrounding space cells of a predetermined space cell (for example, space cells within a predetermined distance from the predetermined space cell) is equal to or higher than a threshold value, the flight management apparatus may set the predetermined space cell to a non-flight area. If the density of the flying objects in the predetermined plane or the space managed by the flight management apparatus itself is equal to or higher than the threshold value, the flight management apparatus may set the entire plane or the space as the non-flyable area. This setting may be disabled when the detected density becomes less than the threshold value. The density threshold can be arbitrarily set and may optionally include a hysteresis.

Further, when the density of the flying objects on the plane on which the flying object flies or in the space managed by the flight management apparatus exceeds the threshold value, the flight management apparatus according to the eighth example embodiment may change the size of the space cells for dividing the plane or the space from large to small. For example, when the flight management apparatus sets the size of the space cells as shown in FIG. 25B, the density of the flying objects in the entire space exceeds 20 per 100 space cells. At this time, the flight management apparatus sets the size of the space cells to be small as shown in FIG. 25A. Thus, the flight management apparatus can manage the flights of many flying objects.

(10-2)

Further, the flight management apparatus may stop the take-off by restricting the movement of the flying object to a space cell above the place where the flying object is located when the flying object to be taken off satisfies a predetermined condition.

For example, in the second example embodiment, the data acquisition unit 32 of the flight management apparatus 30 may acquire real-time data of a flying object using a communication protocol from the flying object before taking off from a departure point. The real-time data is information about the state(s) of the flying object, including, for example, at least one of the battery level, the engine state, and the maintenance state of the flying object (for example, the presence or absence of an automobile inspection within a predetermined period). If the flying object is a flying vehicle, the status of the driver's license (for example, whether a license has been suspended or not) may be included in the real-time data. The driver's license information, like other real-time data, is stored in the flying object's memory. The data acquisition unit 32 acquires data of the present position of the flying object. The data of the present position is, for example, data of the present space cell, GPS data of the present position, etc.

The flight management apparatus 30 sets a space cell located above the present position of the flying object so as to reject reservation processing of the flying object when the real-time data acquired from the data acquisition unit 32 satisfies a predetermined condition. The predetermined conditions include, for example, at least one of the following: the battery remaining amount is less than the predetermined value; the engine condition is bad; the flying object has not been inspected within the prescribed period; and the driver's license has been suspended or expired. Note that the flight management apparatus 30 can cancel the restriction of movement when the flying object no longer satisfies the predetermined conditions. In this manner, the flight management apparatus can previously limit the flight of a flying object assumed to be unsafe by switching propriety of movement to a space cell according to a predetermined condition.

The setting change of the space cell(s) shown in the tenth example embodiment is transmitted from the flight management apparatus to the flying object and stored in the memory of the flying object, so that the setting change is also shared by the flying object. The above described flight restriction to the space cell(s) or the like may be set by the vector setting method described in the fifth example embodiment.

Eleventh Example Embodiment

In this embodiment, a flight method of a flying object which is comfortable for a passenger on board the flying object will be explained in detail. In the previous embodiments, when changing the direction during flight, there is a case that the flying object is flying at a right angle or a movement close to a right angle in an attempt to move along the arrangement of the space cells. However, such a flight method may not be comfortable for a passenger.

In this embodiment, in order to suppress such a situation, the following processing is executed. That is, the route generation unit of the flying object determines the flight route from the present position to the destination independently of the physical properties of the space cell (size and shape). The flight route may be determined by the following factors as relevant information: For example, the flight route may be determined in consideration of at least one of a flyable area other than the non-flyable area of the space S or weather information (e.g., whether there is rain, wind speed and direction information) between the departure point and the destination. In addition, the route generation unit may consider the distance, the battery consumption, and the required time (traveling time) as related information when setting the flight route. For example, the route generation unit can calculate either a flight route having the shortest distance, a flight route having the lowest battery consumption, or a flight route having the shortest required time.

In addition, the flying object may obtain from the flight management apparatus current and future reservation status of other flying object in the flight route and the surrounding space cell(s) (For example, a space cell within a predetermined distance from a space cell on a flight route). Based on the relevant information, the route generation unit of the flying object may select a space cell, in which the density of the flying object in the surrounding space cells (For example, space cells within a predetermined distance from a predetermined space cell) is less than the threshold value during a time period when the flight is scheduled, as target for flight route. In other words, the flying object can fly in an uncongested area. An example in which the flying object generates its own flight route without depending on the flight management apparatus is as described in (2-2) and the like.

The flying object then requests the flight management apparatus to reserve one or more space cells that include the determined flight route therein. After the request is approved by the flight management apparatus, the flying object controls its flight so as to fly the reserved space cell along the determined flight route. That is, the flying object determines the flight route and the space cell separately.

A specific and simple example of the method is described below in (11-1), and an extended general example is described in (11-2). Since the configuration of the flying object shown below is the same as that of the flying object 40 shown in (2-2), the description thereof will be omitted.

(11-1)

Figure 28A:
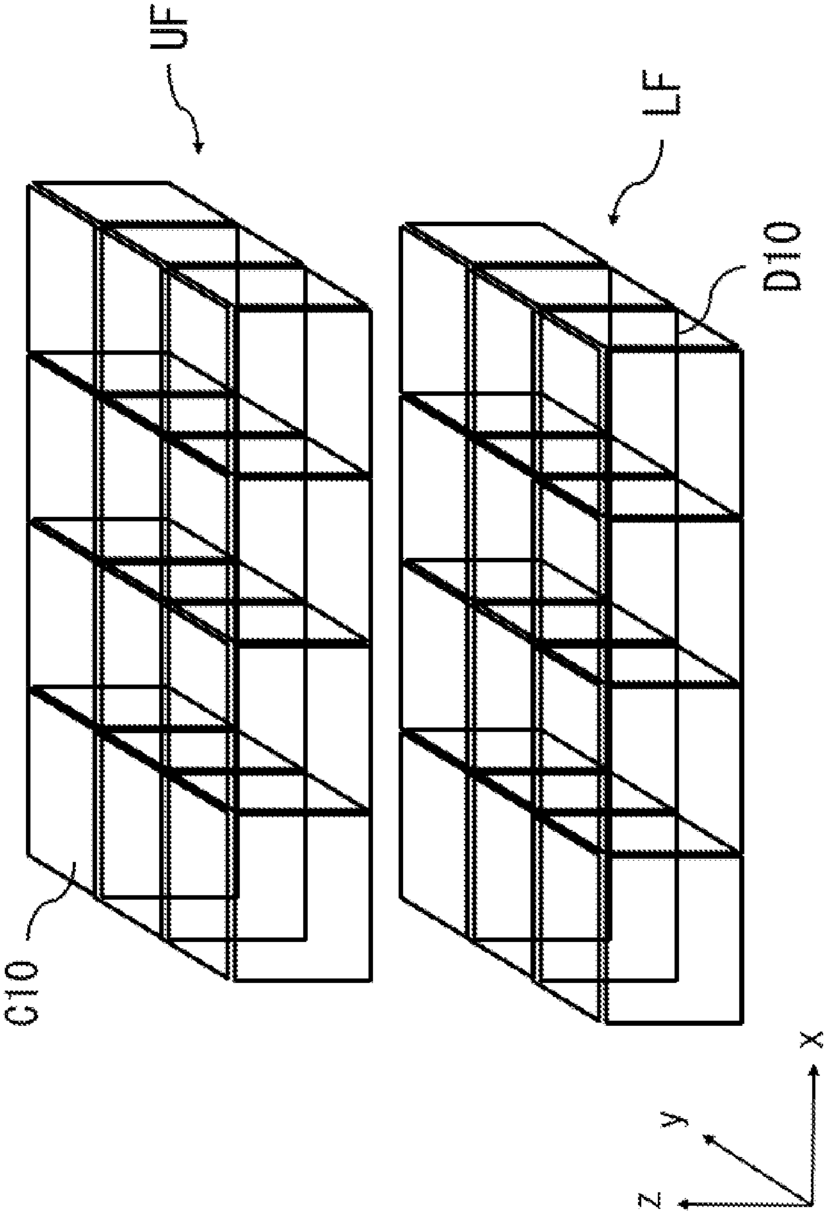
FIG. 28A shows an example of a space in which the flying object 40 is located according to an eleventh example embodiment.

FIG. 28A shows an example of a space in which the flying object is located. Each cube in this figure shows each space cell, and the cell of the present position (departure place) of the flying object 40 is C10, and the cell of the destination is D10. D10 is located at a position shifted from C10 by 3 in the x direction, −2 in the y direction, and −1 in the z direction. Here, a plane composed of the space cells at the same position in the z direction (same height) as C10 is called UF, and a plane composed of the space cells at the same position in the z direction as D10 is called LF. Also, for the sake of simplicity, it is assumed that all of the space cells shown in FIG. 28A are in a state in which the flying object 40 can pass.

In this state, the route generation unit 43 of the flying object 40 generates a flight route from C10 to D10. At this time, the route generation unit 43 defines a straight line passing through C10 to D10 as the shortest route from C10 to D10.

Figure 28B:
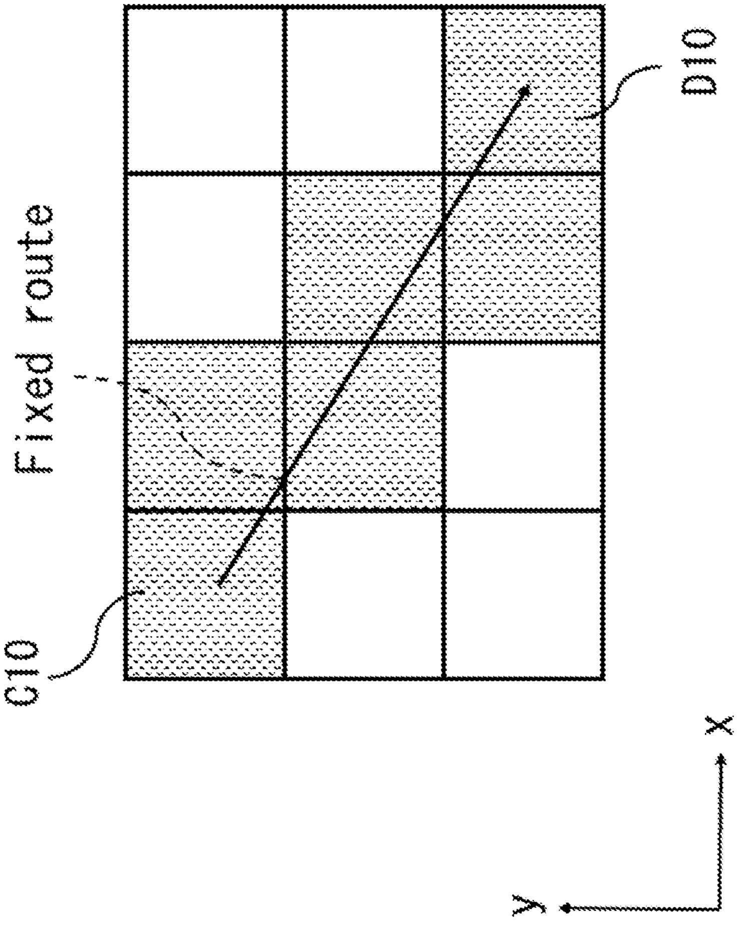
FIG. 28B is a top view of the determined route according to the eleventh example embodiment.
Figure 28C:
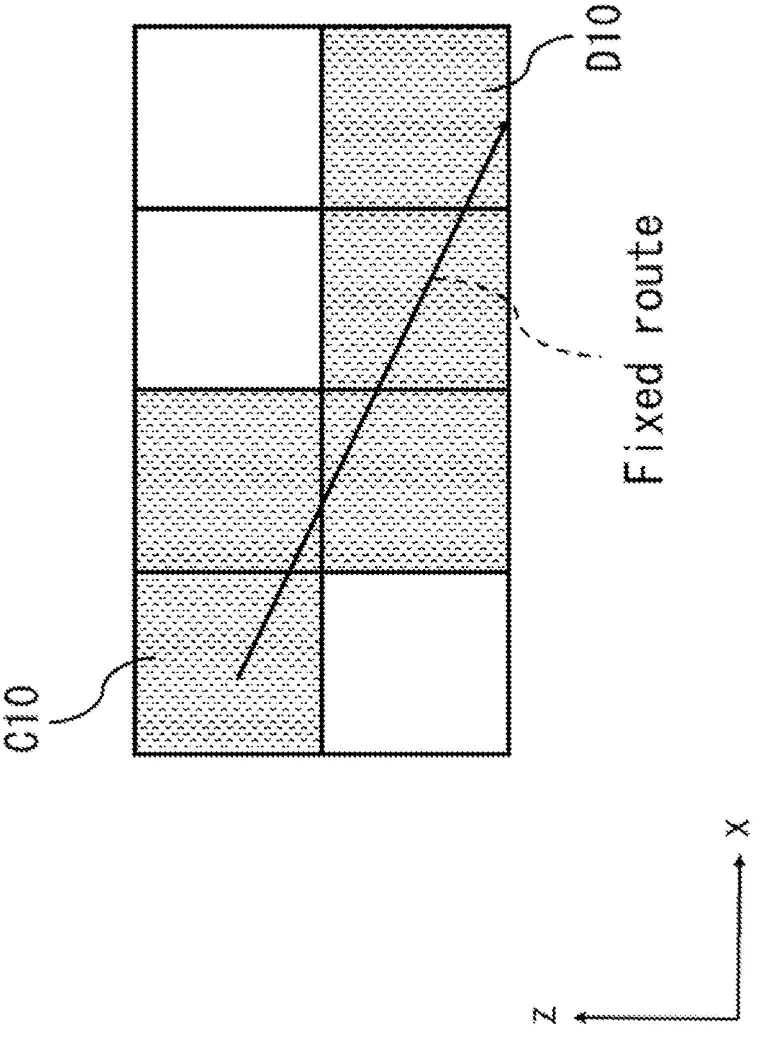
FIG. 28C is a side view of the determined route according to the eleventh example embodiment.

FIG. 28B is a view of the determined route as seen from a top view of FIG. 28A, and FIG. 28C is a view of the route as seen from a side view of FIG. 28A. The hatched space cells in FIGS. 28B and 28C are space cells that contain the determined route therein and are reserved for the flight of the flying object 40. Since the space cell of the present position needs to be reserved, it is hatched in these figures.

Figure 28D:
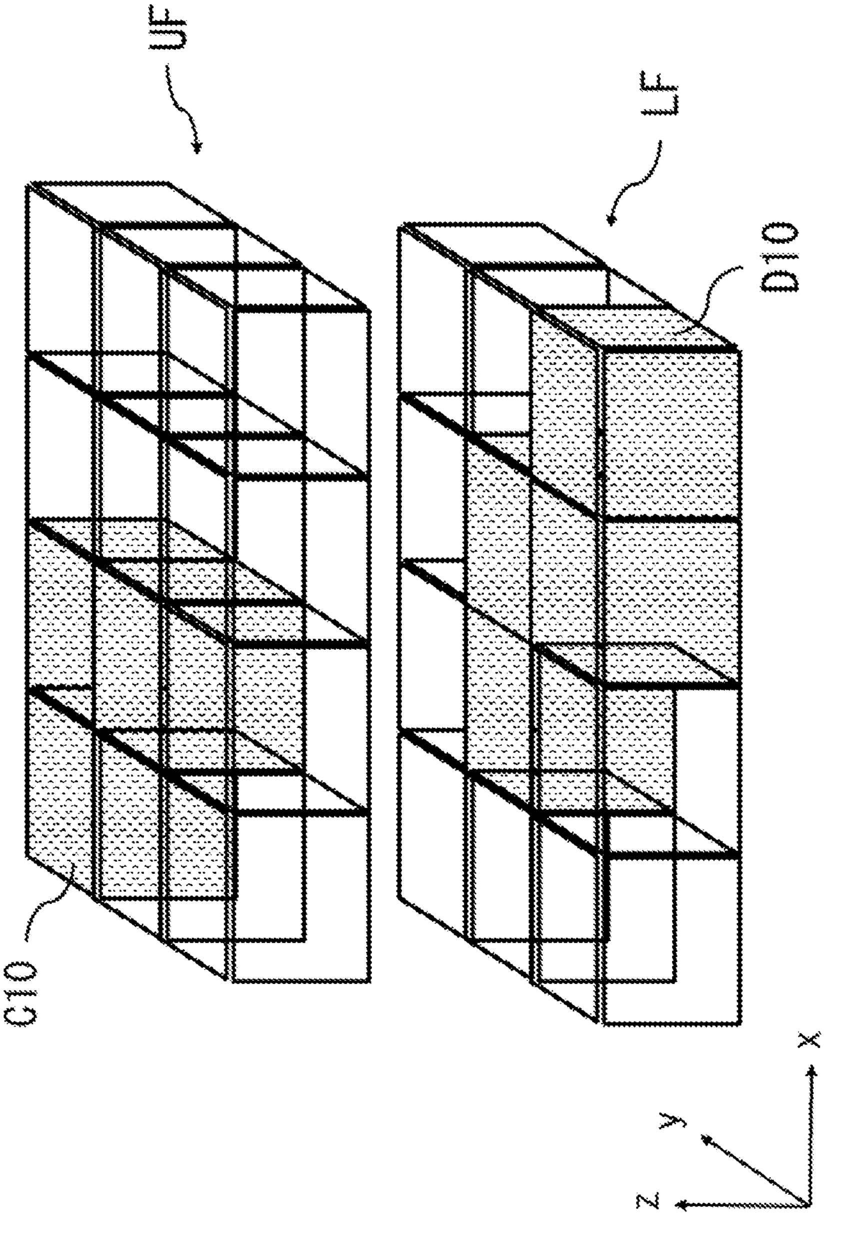
FIG. 28D shows space cells to be reserved according to the eleventh example embodiment.

FIG. 28D shows the space cells to be reserved shown above in FIG. 28A by hatching. As shown in FIG. 28D, when a route is determined, the flying object 40 requests the flight management apparatus through the transmitting unit 44 to reserve a total of 3 space cells in the plane UF and a total of 4 space cells in the plane DF. The details of this request are shown in (2-2). After the request is approved by the flight management apparatus, the flight control unit 45 controls the flight so as to fly the reserved space cell along the routes shown in FIGS. 28B and 28C.

With the above processing, the flying object 40 can travel along a linear flight route, and can provide a more comfortable flight for the passenger.

When the flying object 40 makes a request and another flying object has reserved at least one space cell to be requested in advance, as described in the other embodiments, the flight management apparatus can reject the request and transmit the rejection information to the flying object 40. In this case, the route generation unit 43 of the flying object 40 calculates a flight route that does not include the rejected space cell and sets it again. For example, the route generation unit 43 may determine a route that does not include a rejected space cell after considering at least one of a flyable area other than a non-flyable area of the space S, weather information between a departure point and a destination, or information in an uncongested area. In addition, the route generation unit 43 may choose a flight route that has the shortest distance, the lowest battery consumption, or the shortest required time among routes that do not include rejected space cells. The details of this calculation method are as described above. The flying object 40 requests the flight management apparatus again to reserve space cell(s) including the flight route therein. In this manner, the flying object generates a flight route and requests the reservation of a space cell pertaining to the flight route until the flight management apparatus approves it.

When requesting a reservation, the flying object 40 may request a reservation of space cell(s) near the C10, such as space cell(s) adjacent to the C10, which constitutes not all but part of the flight route. In this case, after the request is approved by the flight management apparatus and the flying object 40 moves to the reserved space cell closest to D10 on the flight route, the flying object generates a flight route from the cell to D10, and requests the flight management apparatus to reserve the space cell constituting all or part of the route. As a result of this processing, the flying object 40 has an effect that the request can be easily approved and moved as compared with the case where it is intended to reserve all space cells required by one request. As described in (2-2), the number of space cells that can be reserved in one request may be changed according to the priority of the flying object or the like.

(11-2)

Next, a generalized example will be described. As defined herein, the three-dimensional region R10 is defined as a space divided by the maximum dimensions of the length (l) in the x-axis direction, the width (w) in the y-axis direction, and the height (h) in the z-axis direction, respectively. The x, y and z directions are as shown in FIG. 28A. We also assume that C is the set of all space cells in a single dimension along a single axis. This set starts at the origin of the axis and ends at the maximum dimension of the axis. The space cells included in C have a predetermined size, structure, etc., and are shown here as cubes for convenience, but may have other structures as described later. At this time, C is shown as follows.

$$C=\{C_0,C_1, \ldots C_n|C_n \text{ is a space cell adjacent to } C_{n-1}, \text{ and } n \text{ is an index of 1 or more (natural number).}\} \quad (1)$$

Further, $C^3$ shown below is a set of all the three-dimensional cells included in the region R.

$$C^3=\{C_{0,0,0},C_{1,0,0}, \ldots C_{i,j,k}|C|C_{i,j,k} \text{ is a space cell adjacent to } C_{i-1,j,k}, C_{i,j-1,k} \text{ and } C_{i,j,k-1}, \text{ and } i,j,k \text{ are indexes of 1 or more (natural number).}\} \quad (2)$$

Then, a space-time ST is set to the state of all the cells $C^3$ in the region R at an arbitrary predetermined time point. At this time, ST is defined as follows.

$$ST=\{R_0,R_1, \ldots R_n|n \text{ is an index of a preset time interval (a natural number greater than or equal to 1).}\} \quad (3)$$

Figure 29A:
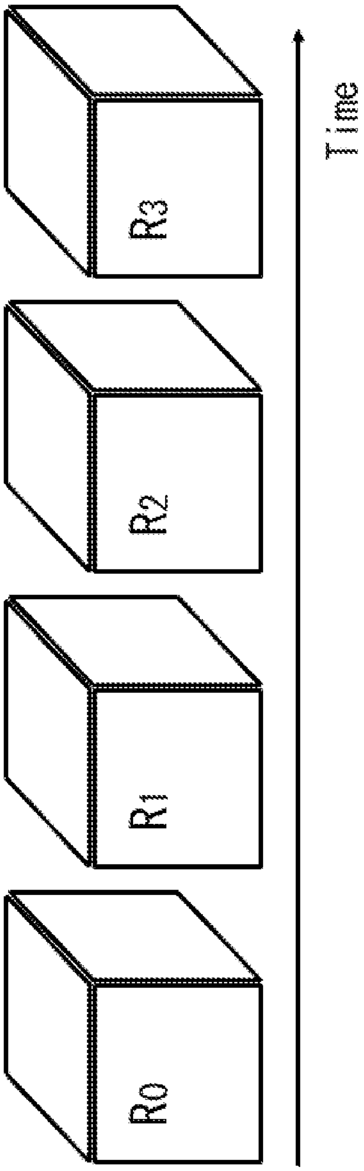
FIG. 29A is a schematic diagram of a space-time according to the eleventh example embodiment.

FIG. 29A is a schematic diagram of the space-time ST as defined in (3). The regions $R_0$, $R_1$, . . . are arranged continuously along the time axis. In addition, each space cell (Also described below as space-time cells) in the four-dimensional space and time considering the time element t is described as $C_{i,\ j,\ k,\ t}$.

Next, a set F of all the flying objects at a specific time in the region R, is defined as follows.

$$F=\{F_1,F_2, \ldots F_n|n \text{ is the number of flying objects in } R_t\} \quad (4)$$

In (4), $F_i$ is a single flying object that occupies a particular space cell $C_{i,\ j,\ k}$ introduced into the region $R_t$. $F_i$ moves along an appropriate flight route from a given starting point to a given ending point. The flying object may perform this movement arbitrarily or by considering relevant information programmatically. The relevant information refers to factors such as weather information, congestion, travel time, etc., as described in (11-1).

In the flight route of $F_i$, space cells must be allocated so that all space-time cells $C_{i,\ j,\ k,\ t}$ on the route are valid (flyable). However, if there are a plurality of routes satisfying such conditions, any one of the routes may be assigned as a flight route.

Figure 29B:
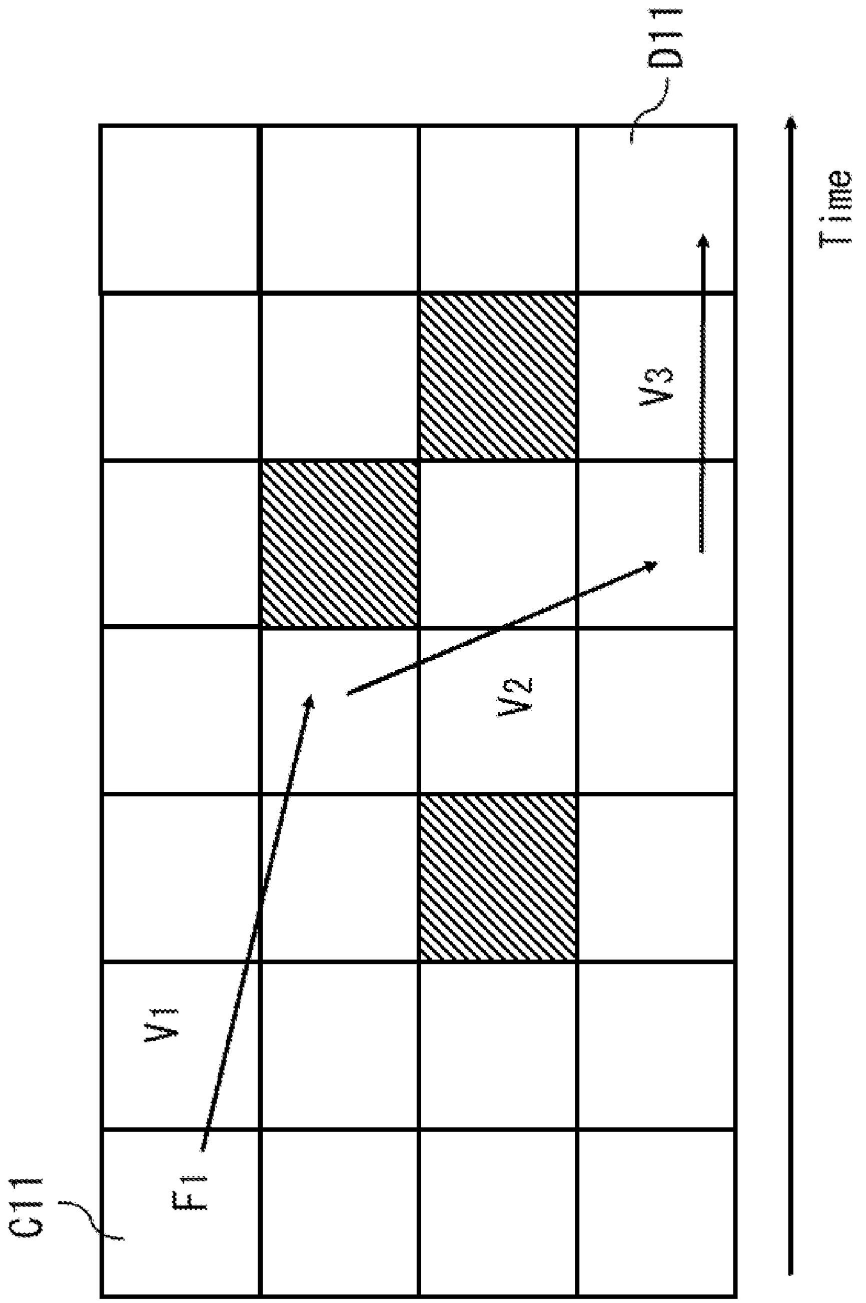
FIG. 29B is a first schematic diagram illustrating a flight route through which a flying object passes according to the eleventh example embodiment.
Figure 29C:
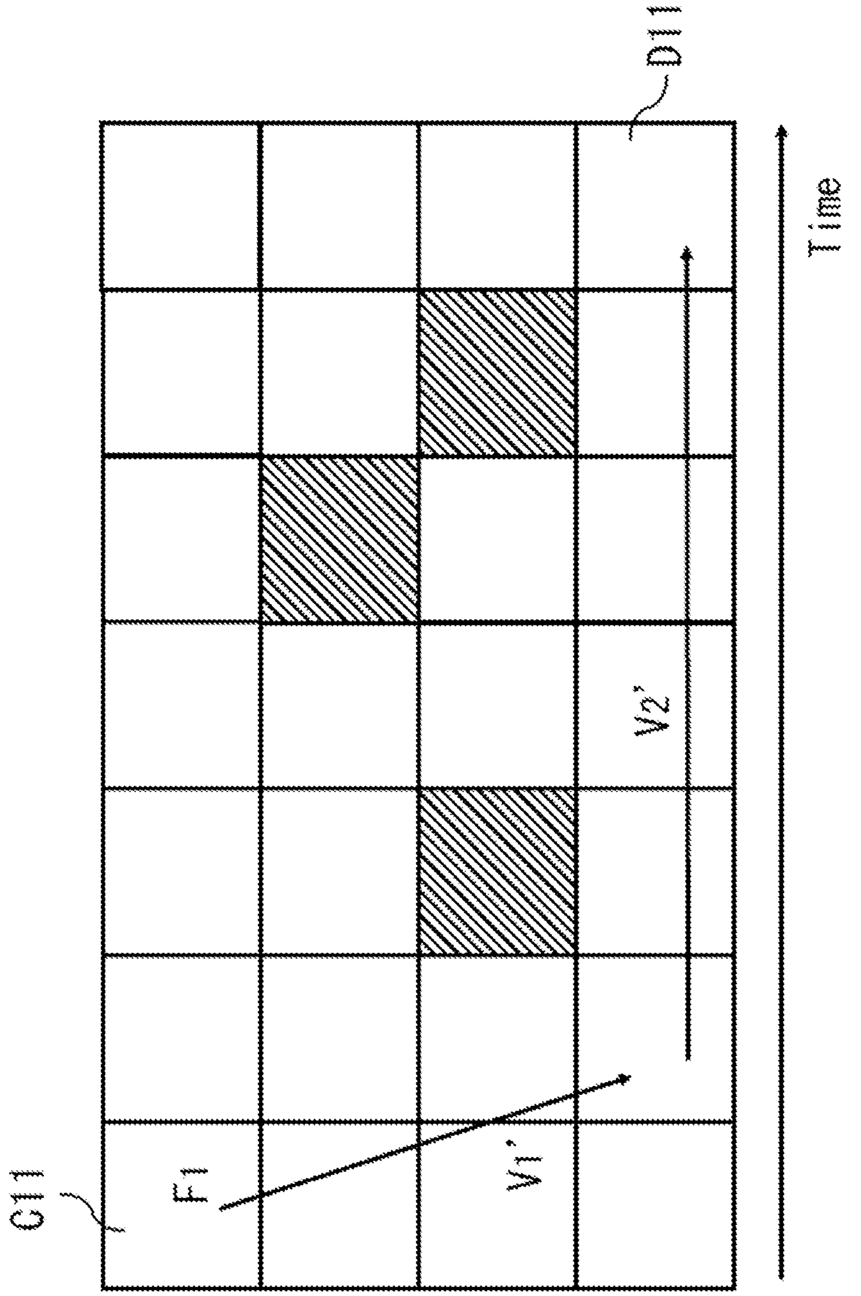
FIG. 29C is a second schematic diagram illustrating a flight route through which a flying object passes according to the eleventh example embodiment.
Figure 29D:
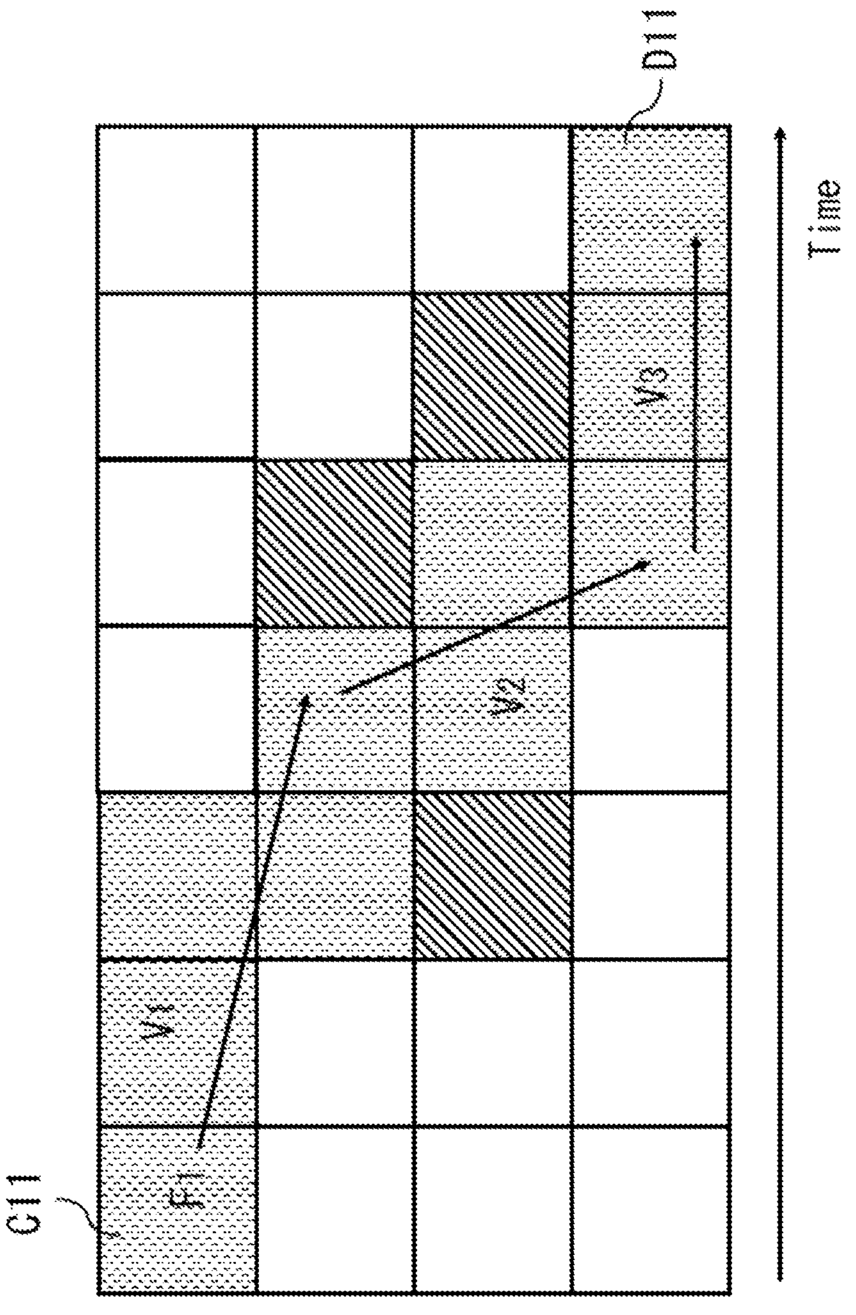
FIG. 29D is a schematic diagram illustrating space cells assigned as a flight route along each subroute according to the eleventh example embodiment.

FIGS. 29B and 29C are schematic diagrams showing a flight route through which $F_1$ flies in the space-time ST. The abscissa of FIGS. 29B and 29C shows the time axis, each space-time cell $C_{i,\ j,\ k,\ t}$ is represented by a two-dimensional square for simplicity, and space cells that cannot be allocated due to the passage of another flying object or the like are indicated by hatched lines. FIG. 29B shows that $F_1$ reaches the destination D11 from the starting point C11 by passing through the routes (sub-routes) V1, V2 and V3. FIG. 29C shows that $F_1$ reaches the destination D11 from the starting point C11 by passing through subroutes V1' and V2'. Any subroute is configured to avoid unassignable space cells. In FIG. 29D, cells allocated as flight routes along the subroutes V1-V3 in FIG. 29B are indicated by hatching with vertical dashed lines.

The flight route FR of each flying object is expressed as follows using the subroute V.

$$FR=\{V_1,V_2, \ldots V_n|V_n \text{ is a four-dimensional vector on } ST \text{ representing the subroute}\} \quad (5)$$

In particular, in (5), $V_1$, is a four-dimensional vector representing the first subroute from the starting point, and $V_n$ is a four-dimensional vector representing the last subroute ending at the destination.

$A_i$ is defined here as a set of cells allocated along the path of the flying object $F_i$ consisting of space-time cells $C_{i, j, k, t}$. Set $A_i$ is defined as follows:

$$A_i=\{C_{i,j,k,t},\text{identical or adjacent}(C_{i,j,k,t+1}),C_n|n \text{ is the four-dimensional index composed of the indices } i,j,k \text{ and } t \text{ in the sequence at the destination cell}\} \quad (6)$$

The set $A_i$ is composed of one or more space-time cells according to factors such as the priority of the flying object. Before the flying object $F_i$ passes through the subroute $V_n$, for example, it is necessary to allocate space cells constituting the subroute by executing the reservation processing described above to the flight management apparatus. If it is not possible to obtain the allocation to the cell(s) necessary for the subroute, the flying object $F_i$ can generate a new subroute. When the flying object $F_i$ exits the space cell in flight, for example, it is necessary to cancel the allocation of the space cell by performing the relinquishing process to the flight management apparatus as shown in the fourth embodiment.

Similarly, a set of cells allocated along the path of the flying object $F_j$ consisting of space-time cells $C_{l, m, p, t}$ is defined here as $B_i$.

$$B_i=\{C_{l,m,p,t},\text{identical or adjacent}(C_{l,m,p,t+1}),C_n|n \text{ is the four-dimensional index composed of the indices } l,m,p \text{ and } t \text{ in the sequence at the destination cell}\} \quad (7)$$

In order for the flying objects $F_i$ and $F_j$ to fly safely, the set $A_i$ needs to be configured to be mutually exclusive with the set $B_i$ ($A_i \cap B_i = 0$). This condition should be satisfied not only for the set $B_i$ but also for the set of space-time cells allocated to all other flying objects.

As an example, in the memory 41 of the flying object 40, a plurality of space-time cells for dividing the space and time in which the flying object flies are stored in a form which can be specified by an index or the like. The route generation unit 43 acquires information on space-time cells allocated to (reserved for) other flying objects from the flight management apparatus or other flying objects. Then, the route generation unit 43 sets a flight route constituted of space-time cells to be exclusive to a set of space-time cells allocated to all other flying objects based on the above technique, and allocates space cells constituting its subroute. Thus, the flying object can fly on the flight route. The flying object 40 can determine the flight route that satisfies conditions such as weather information and distance as shown in (11-1). The flight control unit controls the flight of the flying object 40 so as to move to the allocated space cells along the determined flight route.

As described above, by expanding the area for determining the flight route from three dimensions to four dimensions including time, it is possible to make a plurality of reservations for one 3D cell. Therefore, even if an uncertainty caused by the actual operation of the flying object, such as a change in the speed of the flying object, occurs, the flying object can easily adjust its own route accordingly. Further, in the matrix/vector operation on the standard space, the above-described method can be applied only by including the dimension of time in the components of the operation, so that the calculation process can be simplified.

Note that the flight route determination of the flying object described above may be performed by the flight management apparatus in regards to each example embodiment, not by the flying object. The flight management apparatus can allocate (reserve) flight routes of a plurality of flying objects to be managed by the method of the eleventh embodiment, or can derive a flight route to be a candidate to be proposed to the flying objects in the third embodiment using the method of the eleventh embodiment. In the latter case, the request generation unit 63 of the flying object 60 determines the flight route by agreeing with the proposed flight route. The flight control unit 64 controls the flight of the flying object 60 so as to move to the space cell, in which the movement is permitted by the permission information received from the flight management apparatus 50, along the determined flight route.

Twelfth Example Embodiment

In this embodiment, variations of the space cell are described. Each space cell for dividing a space set by the flight management apparatus or the flying object can have any structure as long as it can be adjacent to other space cells in all surfaces (That is, a structure capable of filling a three-dimensional space without gaps).

Figure 30A:
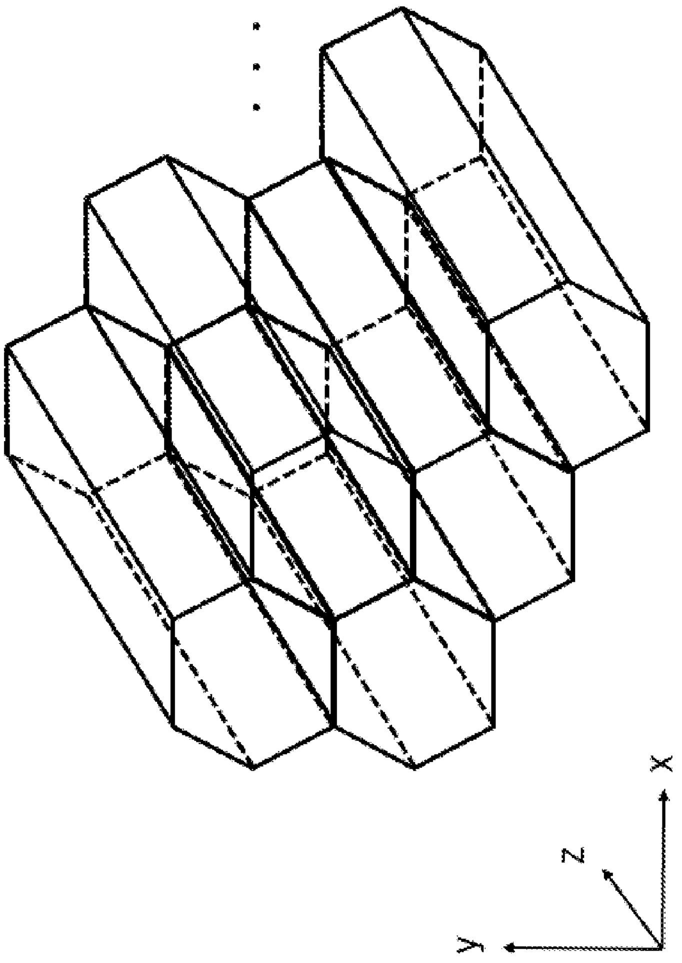
FIG. 30A is a schematic diagram showing a space filling structure when space cells are regular hexagonal columns according to a twelfth example embodiment.

FIG. 30A shows a space filling structure (honeycomb structure) when the space cells are regular hexagonal columns. In FIG. 30A, the bottom surface of each space cell is on the xy-plane, and the bus line of the cell (regular hexagonal column) is arranged along the z-axis (height direction). However, the bottom surface of each space cell may be on the xz plane or the yz plane.

Figure 30B:
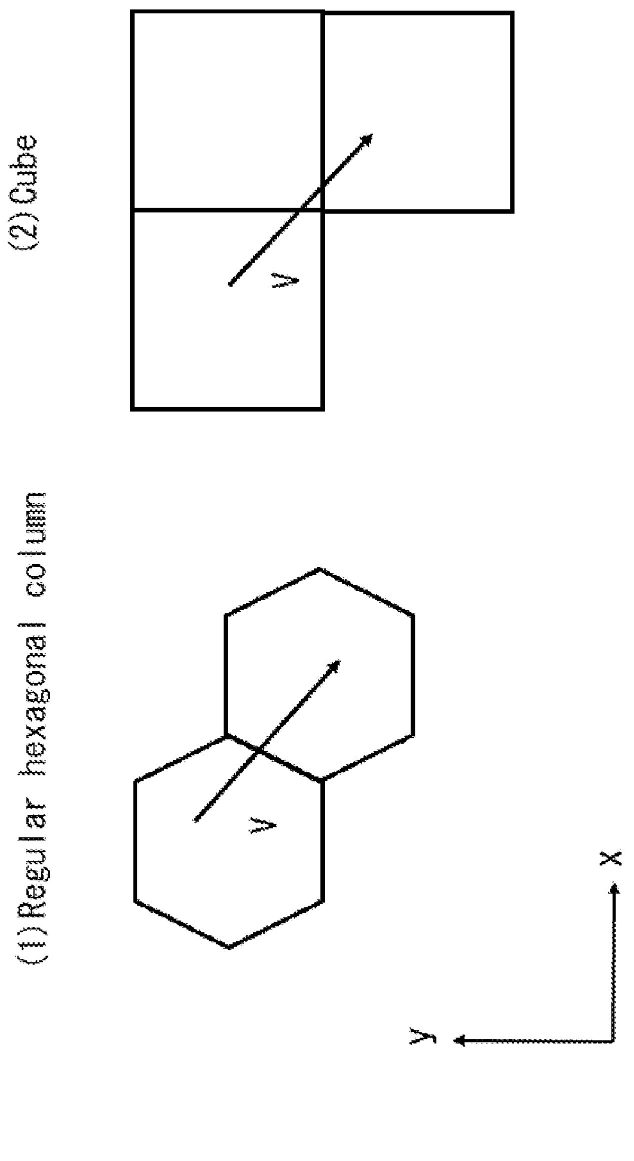
FIG. 30B is a schematic diagram illustrating the advantages of the space cells as regular hexagonal columns according to the twelfth example embodiment.

FIG. 30B is a schematic view showing an advantage when the space cells are regular hexagonal columns as shown in FIG. 30A. FIG. 30B shows a state in which a flying object passes through a plurality of space cells along the subroute V, where (1) is the space cells are regular hexagonal columns and (2) is the space cells are as cubes. Although the direction and distance in which the flying object flies are the same in (1) and (2), the number of cells that the flying object passes is three in (2), while two in (1). For this reason, the space cell reservation process described in the above embodiment can be simplified, which leads to a reduction in calculation resources.

Figure 30C:
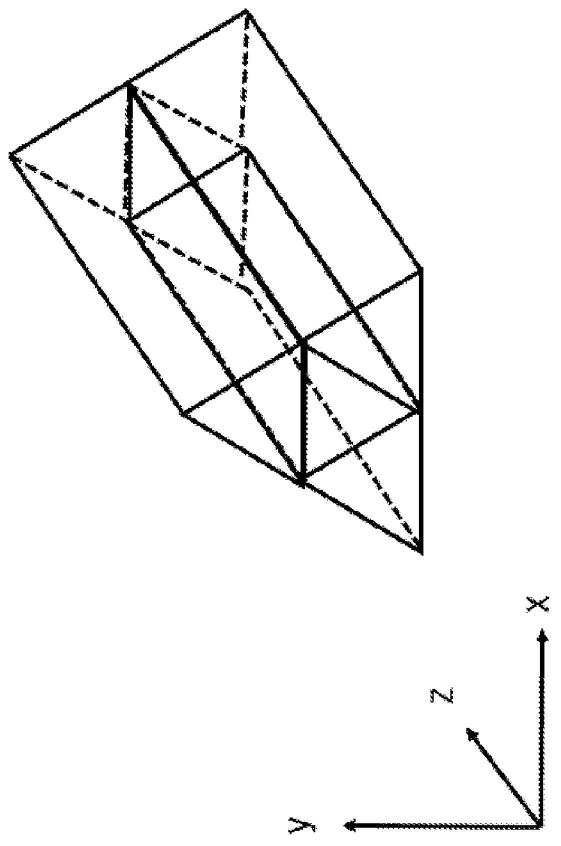
FIG. 30C is a schematic diagram showing a space filling structure when space cells are regular triangular prisms according to the twelfth example embodiment.

FIG. 30C shows a space filling structure when the space cells are regular triangular prisms. Also, in FIG. 30C, the bottom of each space cell is on the xy plane and the bus of the cell is arranged along the z axis, but the bottom of each space cell may be on the xz plane or the yz plane.

In addition to the example described above, a column having a shape capable of filling a plane on the bottom surface can also be used as a space cell. However, since one space cell can have more adjacent space cells by making the space cell a regular hexagonal column, the number of cells through which the flying object passes can be reduced even if the flying object flies the same distance and direction as described above.

Thirteenth Example Embodiment

In this embodiment, a technique of performing space cell assignment (reservation) of each flight route in a plurality of flying objects as a result of performing communication between the flying objects without requiring processing by the flight management apparatus will be described. Hereinafter, this technique is also referred to as a distributed space cell technique.

Figure 31:
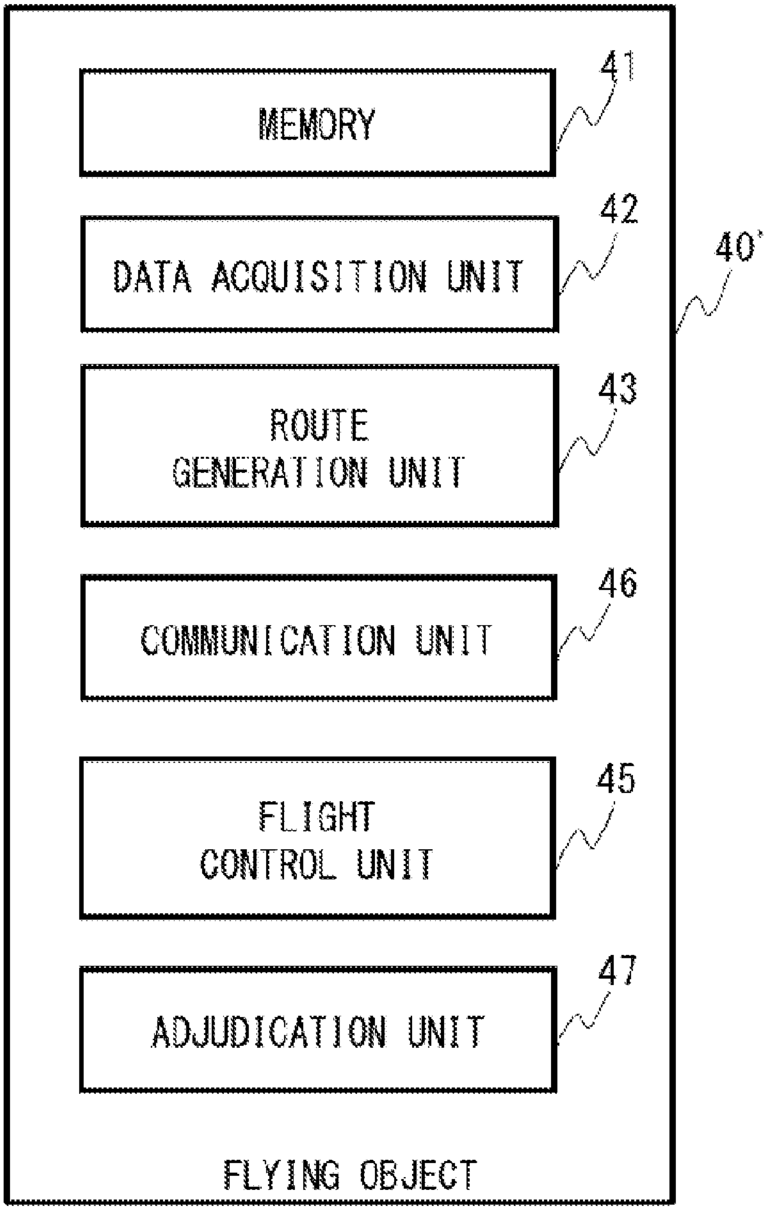
FIG. 31 is a block diagram of a flying object 40' according to the thirteenth example embodiment.

FIG. 31 shows a configuration of the flying object 40' according to the thirteenth example embodiment. The flying object 40' includes a communication unit 46 instead of the transmission unit 44, as compared with the configuration of the flying object 40 shown in (2-2). The communication unit 46 enables radio communication with other flying objects, a flight management apparatus, a server described later, and the like. The flying object 40' further includes an adjudication unit 47 for executing an adjudication process described in detail below. A simple example of the method is described below in (13-1), and further variations are described below in (13-2) and the following.

(13-1)

Figure 32A:
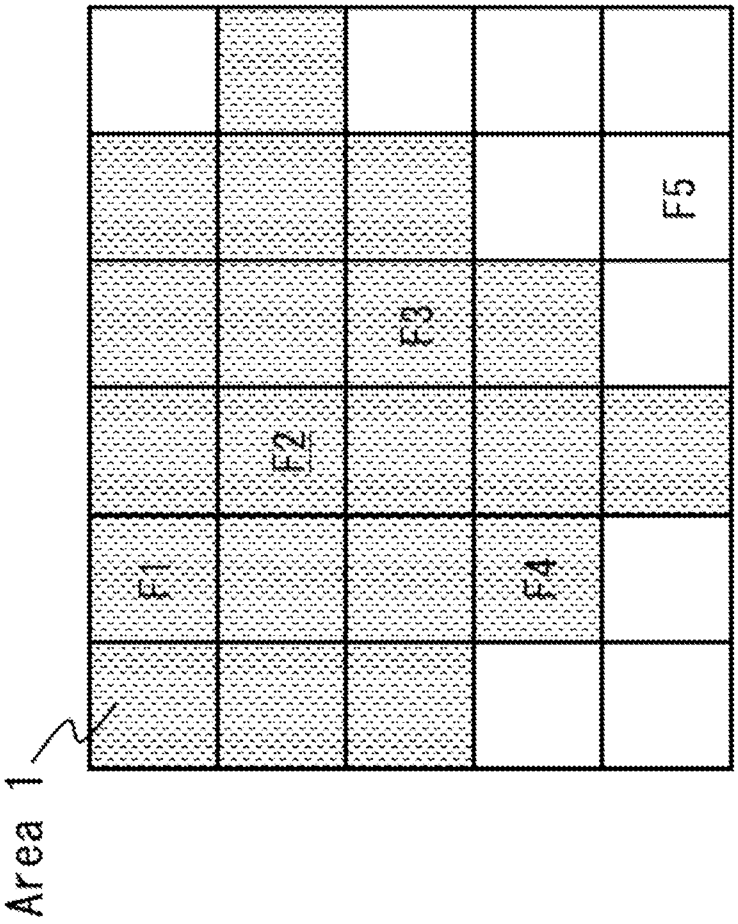
FIG. 32A is a first schematic diagram illustrating position of a plurality of flying objects in a space according to the thirteenth example embodiment.

FIG. 32A is a schematic diagram showing the position of the flying objects F1-F5 in the space. For simplicity, each space cell is represented by a two-dimensional square. In this example, the flying object F2 is focused. The flying object F2 constitutes a distributed system, with flying objects in its vicinity, for allocating each of the space cells. In FIG. 32A, a distributed system is constituted by the flying objects F1-F4 in the area 1 (indicated by hatching) within 3 cells from the position of the flying object F2, and the flying objects F1-F4 require an adjudication involving all to determine which space cell each will next move within the area 1. However, in FIG. 32A, the flying object F4 can also move out of the area 1.

Figure 32B:
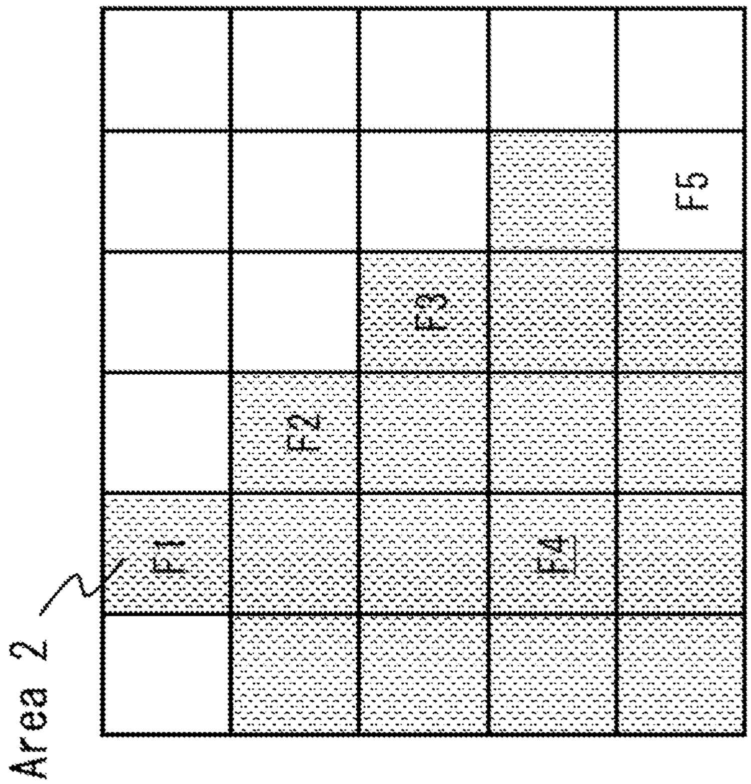
FIG. 32B is a second schematic diagram illustrating position of the plurality of flying objects in a space according to the thirteenth example embodiment.

FIG. 32B is a schematic diagram focusing on the flying object F4 in the position state of the flying object shown in FIG. 32A. In FIG. 32B, a distributed system is configured with the flying objects F1-F4 in the area 2 (indicated by hatching) within 3 cells from the position of the flying object F4, and the flying objects F1-F4 require an adjudication involving all to determine which space cell each will next move within the area 2. Hereinafter, participating flying object are also called "participants". However, in FIG. 32B, the flying object F1-F3 can also move out of the area 2. Note that the distributed system in the area 2 is a system separate from the distributed system in the area 1.

The adjudications made in each distributed system may be made by voting in which each flying object has equal rights, or may be made by voting in which different weights are given depending on predetermined conditions, as described below. For this processing, a flight management apparatus (external server; especially centralized server) for calculating the next destination of all the flying objects is not essential, and the allocation processing is completed and realized. To that end, flying objects in the surrounding vicinity forming the distributed system fulfill the role of the flight management system (especially flight management apparatus), i.e., adjudicating the allocation of space cells. An adjudication in each distributed system is performed using a blockchain or a variation thereof. Here, the distributed asset of the system means the allocation state of space cells in a region. Further, the result of the adjudication process means permission or non-permission response to a request for allocation of a space cell. The response is the same as the one from the above-mentioned flight management apparatus.

Each flying object constituting the distributed system can acquire mutual position information by broadcasting its own position by radio communication of the communication unit 46. The range of the distributed system is the range in which each flying object can establish and maintain peer-to-peer (P2P) communication with each other in order to execute the adjudication. In addition, since the flying object moves, the participants constituting each distributed system change with time. This P2P communication can be performed using the broadcast (multicast) network protocol in UDP (User Datagram Protocol), and it is widely used.

Each flying object has priority and status information in a memory as information to be a weight of votes in an adjudication. The status information includes real-time data such as battery life (run time) and the presence or absence of an emergency. The emergency corresponds to the detection of the trouble described in (9-2). It should be noted that the state in which the remaining battery amount is less than the predetermined threshold value may be reflected by increasing the priority of the flying object or may be reflected as the occurrence of an emergency. At least one of priority and status information is considered in an adjudication. Therefore, for example, in the case where the allocated cells requested by each of the plurality of flying objects are overlapped, an adjudication is made so that the request of a flying object having a high priority among a plurality of flying objects can be easily passed.

To give a concrete example, it is highly likely that a flying object located in the vicinity of a space cell (For example, a flying object located within a region of three cells from the space cell), which is an "airport" where flying objects take off and land, is in the middle of a takeoff or landing operation. Therefore, in order to give priority to the flight of the flying object, the flying object or other flying objects constituting the same distributed system as the flying object may set higher priority to the flying object than to other flying objects. In addition, in the case of flying object located in the vicinity of an "airport", the flying object or other flying object constituting the same distributed system as the flying object may give priority to the flying object at a lower altitude than to the flying object at a higher altitude. The priority setting described above makes it easier for a flying object to continue its operation during takeoff or landing, thereby facilitating safe flight.

The adjudication unit 47 may use any one of the following elements or any combination of multiple elements to determine the weight in the vote. However, the following elements are examples, and are not limited thereto.

(a) Each flight route: If a target cell (a space cell located in the vicinity of each flying object and to be allocated by voting) is not on the flight route of a particular flying object, the weight of the vote for the target cell of that flying object can be reduced compared to another flying object with the target cell on its own flight route.

(b) Each traveling direction: When one flying object moves away from the target cell, the weight of the vote for the target cell can be reduced compared with another flying object moving in the direction of approaching the target cell.

(c) Distance from the flying object to the target cell: The closer the distance between the flying object and the target cell is, the greater the weight of the voting of the flying object to the target cell can be.

(d) Status information of the flying objects: For example, the shorter the flying object's battery life, the greater the weight of the flying object's vote for the target cell for safety reasons.

(e) Priority (f) Occupancy status of each cell: The flying object already occupying an existing cell during the requested timeframe preferably carry great weight (e.g., the greatest weight in the distributed system) regarding the adjudication of the existing cell.

(g) Allocation status of each cell: The flying object already having allocation status for a requested cell, which was determined prior to the new request for allocation was received, also preferably carry great weight (e.g., the greatest weight in the distributed system) regarding the adjudication of the requested cell.

It should be noted that the distributed space cell technology is more preferably applied to areas where the number of participants in a distributed system is relatively small (e.g., about 10-20), that is, areas where the density of flying objects in a space is generally considered to be small (e.g., rural areas). This is because it is considered possible to reduce the time required for the adjudication process compared to areas with a larger number of participants (e.g., 50 or more) in a distributed system.

It is also preferred that the voting process for the target cell considers only votes received by the participant within a specified period (the requested timeframe, e.g., in seconds) to be valid.

In addition, one participating flying object calculates an adjudication concerning each target cell and broadcasts the result to all the participants. This allows for a consensus adjudication by all participants. The use of blockchain technology by the adjudication unit 47 in this case has the effect of enhancing the resistance of data to tampering and reducing the possibility that the adjudication processing stops due to a failure or the like.

Figure 32C:
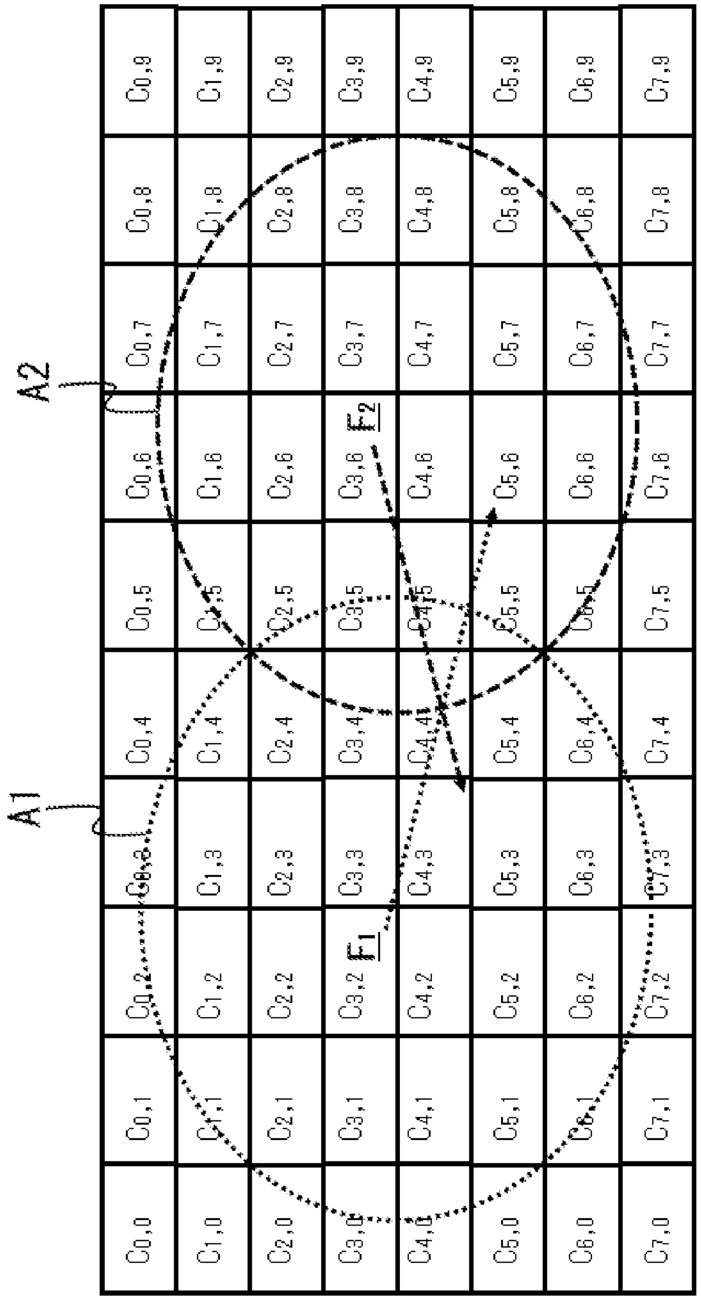
FIG. 32C is a schematic diagram illustrating an adjudication of two flying objects in a space according to the thirteenth example embodiment.

FIG. 32C is a schematic diagram showing the adjudication of the two flying objects F1 and F2 in the space, and a specific example of the adjudication processing will be described below with reference to the diagram. In FIG. 32C, the space is represented in two dimensions for simplicity, and the space is divided into 8*10 space cells. At the same time, the flying object F1 is located in the space cell $C_{3,2}$, and the flying object F2 is located in the space cell $C_{3,6}$. The arrows in FIG. 32C show the flight route of each flying object. The areas A1 and A2 are areas adjacent to the flying objects F1 and F2, respectively, and are set by the respective flying objects as areas for an adjudication. As described above, the flying objects F1 and F2 can participate in the adjudication process by grasping each other's positions and establishing communication with each other by P2P.

In this example, the areas A1 and A2 overlap at $C_{2,4}$, $C_{2,5}$, $C_{3,4}$, $C_{3,5}$, $C_{4,4}$, $C_{4,5}$, $C_{5,4}$, $C_{5,5}$. The flying objects F1 and F2 grasp the overlapping relation in each area by broadcast communication. Thus, the flying object F2 can participate in the adjudication process for the flying object F1 for these space cells. For example, when the flying object F1 allocates the $C_{4,4}$ as its own mobile desired cell, the flying object F1 broadcasts the request to the flying object F2. At this time, it is assumed that the flying object F2 allocates the space cell to the time frame overlapping with the flying object F1. As in this example, it is F2's intent to also request allocation for the same space cell, the flying object F2 may respond with the weighted vote "No". F2 may also separately initiate its own allocation request for $C_{4,4}$, which it broadcasts to F1, who in turn may also respond with a weighted vote of "No". Both F1 and F2 shall calculate the result of their initiated voting process based on an algorithm involving the weight of the Requestors' vote including elements (a)-(g) and the resulting weight of the respondent votes including the respondents' elements (a)-(g) and publish the results. Since the requests, responses, and final results of the voting process of both flying objects are published here, the flying object to which the allocation is assigned will be that object whose results of their initiated voting process carried the greatest weight. The successful allocation of the space cell is then re-broadcast to all participants in the adjudication (F1, F2). Note that a participant may also abstain from the voting process, if it has no interest in the outcome.

When the flying objects F1 and F2 continue to move along their respective flight routes, the areas A1 and A2 are further overlapped from the state shown in FIG. 32C. As a result, the number of space cells in which the flying objects participate in each other's adjudication process increases. This continues until each flight route begins to separate from each other.

The areas A1 and A2 may be resized based on at least one of the elements shown in (a) to (g), for example. Furthermore, the positions of the flying objects F1 and F2 in the regions A1 and A2 may also be offset based on at least one of these elements (e.g., a flight route). That is, the flying objects F1 and F2 need not be disposed at the center of each area.

In the above example, a case where the number of participants is two is considered for simplification, but an example where the number of participants increases and the adjudication becomes complicated is shown below.

Figure 32D:
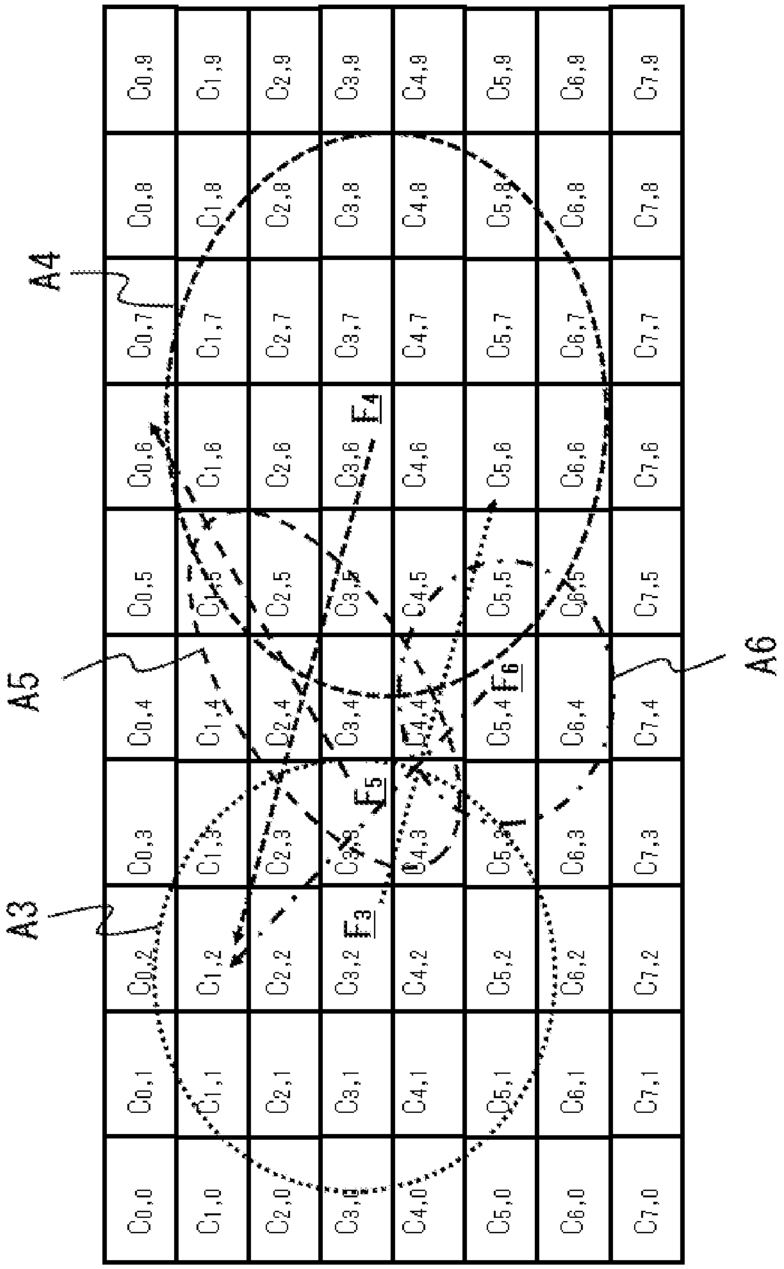
FIG. 32D is a schematic diagram illustrating an adjudication of four flying objects in a space according to the thirteenth example embodiment.

FIG. 32D is a schematic diagram showing an adjudication in the space of the four flying objects F3-F6, and further specific examples will be described below with reference to this diagram.

In FIG. 32D, the space and space cell settings are the same as in FIG. 32C. At the same time, the flying object F3 is located in the space cell $C_{3,2}$, the flying object F4 is located in the space cell $C_{3,6}$, the flying object F5 is located in the space cell $C_{3,3}$, and the flying object F6 is located in the space cell $C_{5,4}$. In FIG. 32D, arrows extending from each flying object indicate the flight route of each flying object. The areas A3-A6 are areas adjacent to the flying objects F3-F6, and are set by the flying objects as areas for adjudication. The flying objects F3-F6 can participate in the adjudication process by grasping each other's positions and establishing communication with each other by P2P. Hereinafter, an adjudication process relating to the allocation of the space cells $C_{4,3}$ by F3 and F6; and $C_{3,5}$ by F4 will be described.

In this example, since areas A3, A5 and A6 overlap at the cell $C_{4,3}$, F3, F5 and F6 participate in the adjudication regarding the allocation of the cell $C_{4,3}$. Since the area A4 does not cover the cell $C_{4,3}$ at the time of voting, F4 is not a participant of the adjudication process. At this time, F3 initiates its request for allocation for $C_{4,3}$ by publishing its request to F5 and F6. F6 also initiates its request for allocation of $C_{4,3}$ in the same manner.

As $C_{4,3}$ is not present in F5's route, the weight of F5's vote may be diminished accordingly, however F5 may still choose to abstain or cast its vote towards F3 or F6 or both depending on its preference. In one scenario, based on elements (a)-(g) presented by each requestor, F5 may prefer F6 as F6's route is more divergent from F5's route than F3's route, and possibly other factors, thereby responding 'No' to F3 and 'Yes' to F6 in consideration of safety. F6 is presumed to respond with its own weighted vote of 'No' to F3's request, and F3 is presumed to respond with its own weighted vote of 'No' to F6's request. Both F3 and F6 would calculate the result of their respective request for allocation including each participants' weighted vote and the weight of their own request for $C_{4,3}$ via an algorithm involving (a)-(g) and broadcast the result of the adjudication process of their respective requests for $C_{4,3}$. In this case the preference of F5 towards F6 and not F3 may result in F6 publishing the heaviest weighted result, and winning the allocation. Each participant may also update their respective memory's as to the adjudicated allocation state of $C_{4,3}$ to F6. The use of Blockchain technology here can help participants reach an agreement relating to a consensus on potential variations of the space cell allocation states represented in the individual participants' memories at any given point in time. Note also that each participant may also calculate the adjudication of all votes of all participants on behalf of each requestor and publish their own results leading to a "consensus" process similar to that of blockchain.

Since areas A4 and A5 overlap at the cell $C_{3,5}$, F4 and F5 participate in the adjudication concerning the allocation of the cell $C_{3,5}$. Also, F3 and F6 are not participants in this adjudication process because areas A3 and A6 do not cover this cell at the time of voting. At this time, since the cell $C_{3,5}$ is not on the flight route of the F5, it is considered that the weight of the vote of the F5 is reduced and the result of the adjudication is hardly affected. In contrast, the heavier weight of F4's votes makes it more likely that F4 will make an adjudication on the cell and broadcast the cell's allocation evaluation.

As a result of the above processing, it is possible to show that the adjudication processing of the space cell can be executed even when a larger number of flying objects are located nearby. By voting based on the elements (a)-(g) described above, the flying object can execute an adjudication of a space cell that the flying object does not want other flying objects to come.

A participant may also choose to completely opt out of the adjudication for a particular space cell if the participant is not interested in the outcome of the adjudication. For example, in the example shown in FIG. 32D, since both F3 and F6 are located very close to the cell $C_{4,3}$, the cell is allocated to themselves almost simultaneously. F3 and F6 broadcast a request to allocate the cell, and F5 receives the information. Based on the information, F5 recognizes that F3 and F6 want the cell, and alternatively determines that F3 is preferred as the assignment target based on the acquired priority (and possibly other factors) of F3 and F6. Therefore, F5 gives priority to F3, not F6, with respect to the cell ("on F3's side"), so that F5 can effectively affect the result of the adjudication without itself making the cell $C_{4,3}$ its target cell. Since the area A5 of F5 covers this cell, F5 can participate in the adjudication in this manner.

Also, in the example of FIG. 32D, assuming that F3 has acquired the allocation of the cell $C_{4,3}$, F6 may choose either to change its path to adjudication the allocation of another space cell adjacent to the cell $C_{4,3}$, such as $C_{5,3}$, $C_{6,3}$ or $C_{6,4}$ or to adjudicate the allocation of the cell $C_{4,3}$ again within a time frame (additional time) that does not overlap the allocation of F3 in the cell $C_{4,3}$.

The form of voting in the adjudication may be similar to so-called "cumulative voting.". In this case, each participant may choose to vote or abstain from voting on each space cell's adjudication request. The latter means that the participant is not interested in the outcome of the adjudication.

The aforementioned decision processing for each flying object is realized by the decision unit 47 of the flying object 40' executing the selection of the presence or absence of voting, the decision of the contents of voting, and the allocation processing for each space cell based on the information stored in the memory 41 and the information acquired from the communication unit 46. At this time, the flight management apparatus according to the other example embodiment is not a physical server but a blockchain system, and exists in a virtualized state between the flying objects. Thus, the various configuration allocation structures (Space cells, routes and subroutes, assignment status, and so on) have the same characteristics as disclosed in other embodiments.

(13-2)

In the process shown in (13-1), a plurality of flying objects performed adjudication processing by P2P communication. However, since the P2P communication format is open to anyone, a third party may attack (Denial of service attacks, snooping, etc.) the communication. Therefore, in this example, the concept of a SuperNode in networking is introduced to improve the robustness of a network composed of a distributed system.

For example, in the example shown in (13-1), a Supernode server SN may be further provided for use in verifying a certificate of a flying object and relating the flying object for which the certificate is valid to an adjudication process with another flying object located in the vicinity thereof. For this purpose, the server SN needs to recognize the position of each flying object. The server SN may be a server dedicated for this purpose.

Here, the "vicinity of the flying object" is uniquely generated for each flying object by the server SN, and the vicinity may include other flying objects (That is, it has "interest" about a space cell located in the vicinity) that are likely to fly in the vicinity in the future due to the viewpoint of any one of the elements (a) to (g) of the flying object (For example, the flight route or direction of travel is close to the flying object, etc.).

In addition, the radius of the vicinity area can be arbitrarily set by the server SN, or it can be changed based on the viewpoint (e.g., priority) of any one of the elements (a) to (g) of the flying object, the location where the target space cell is located, or other factors. For example, if the location where the target space cell is located is a low-population area (e.g., a rural area), the server SN may set the radius to be larger than that in a densely populated area (e.g., a large city). For example, in FIG. 32D, the server SN may allocate areas A3-A6 to each flying object based on the factors shown above.

(13-3)

Figure 32E:
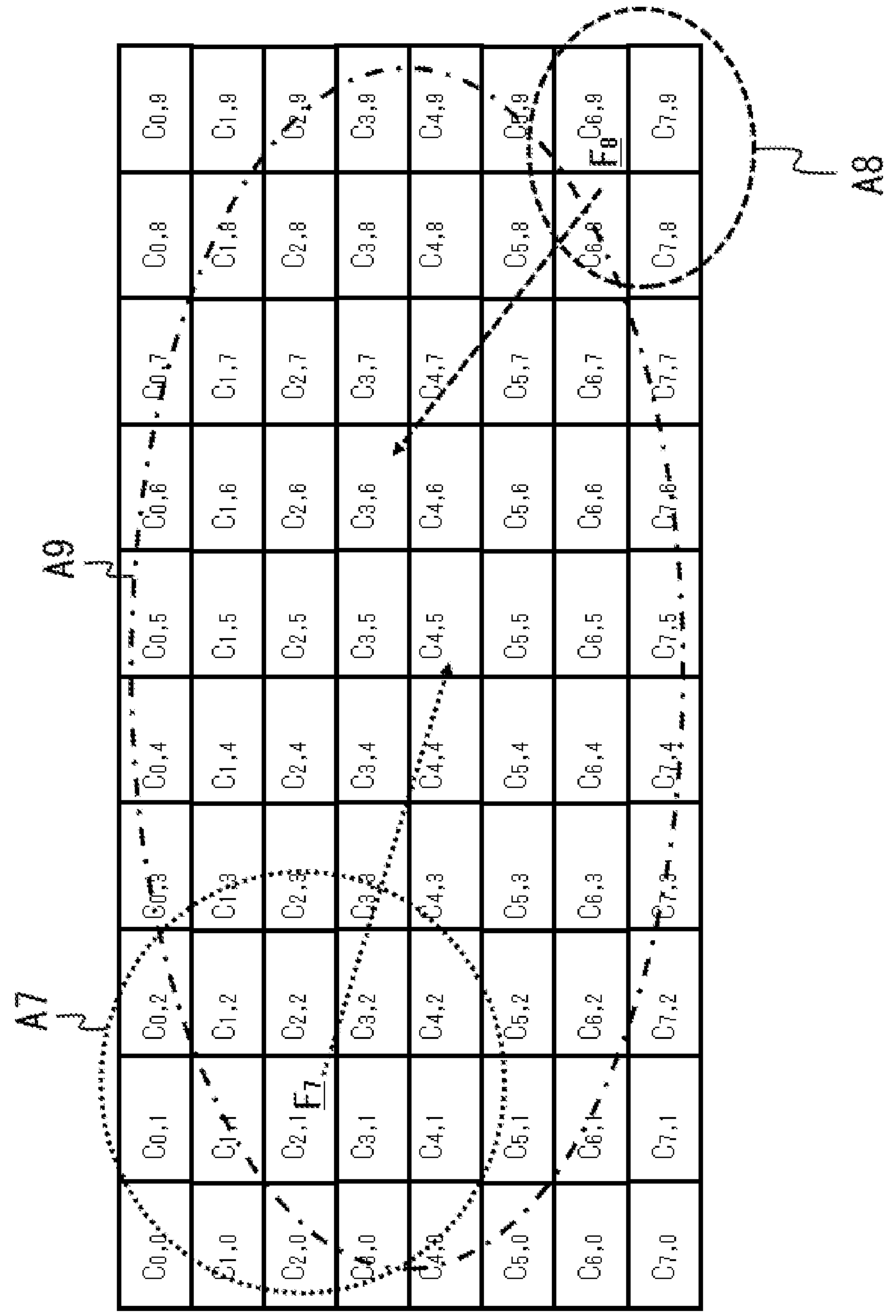
FIG. 32E is a schematic diagram illustrating an adjudication of two flying objects in a space around an airport according to the thirteenth example embodiment.

FIG. 32E shows an example of a further adjudication. The coordinate settings of the space and space cells in FIG. 32E are the same as those in FIG. 32C. However, FIG. 32E shows the space of the airport and its surrounding area. At the same time, the flying object F7 is located in the space cell $C_{2,1}$, and the flying object F8 is located in the space cell $C_{6,9}$. In FIG. 32E, an arrow extending from each flying object indicates the flight route of each flying object, and areas A7 and A8 are areas near the flying objects F7 and F8, respectively.

In FIG. 32E, a regional controller server 90 for managing the airspace around the airport is further provided. The area A9 is a vicinity area of the regional controller server 90. Here, the server SN allocates the areas A7-A9, which are areas for adjudication, to the flying objects F7 and F8 and the regional controller server 90, respectively.

Figure 32F:
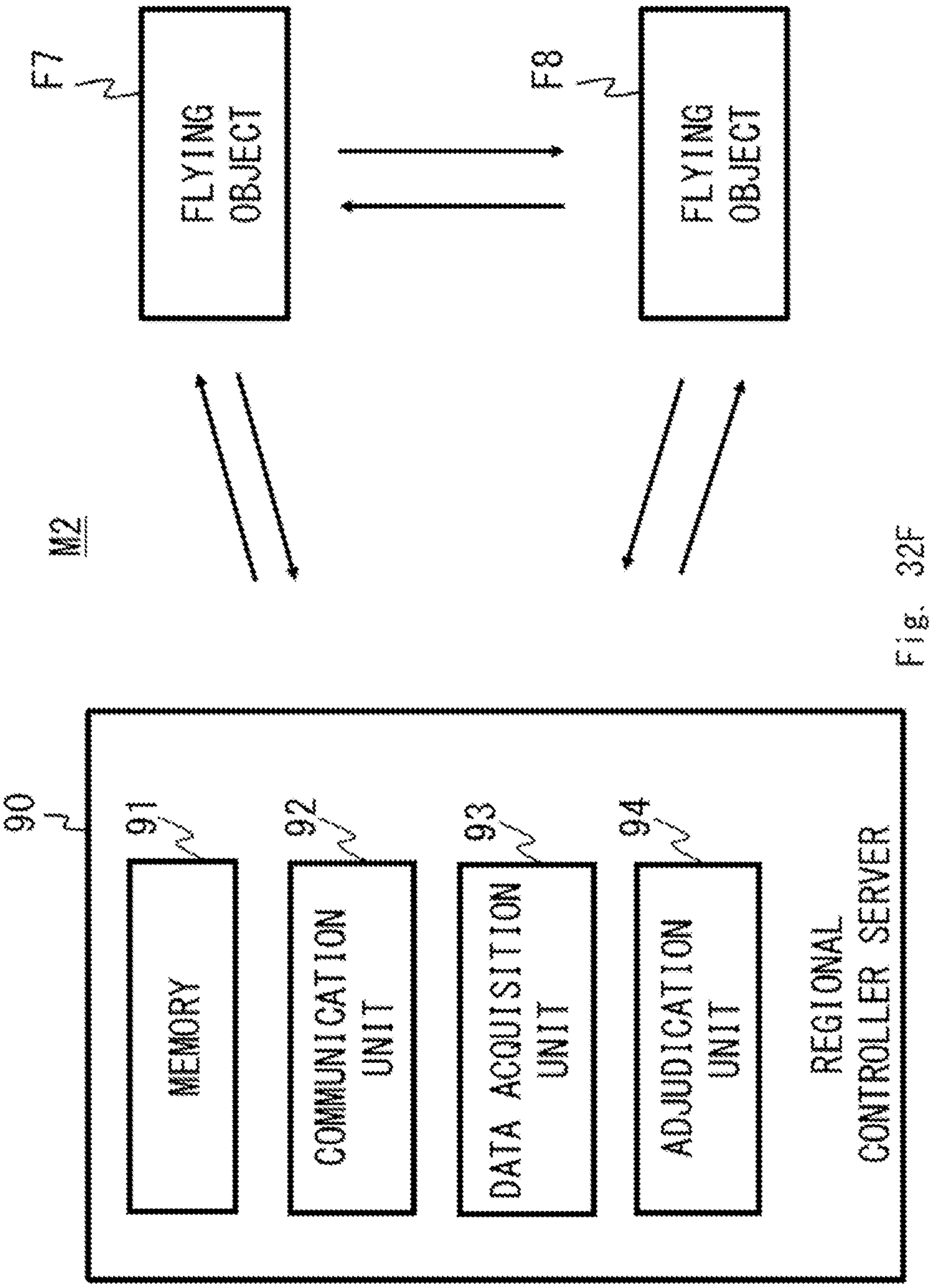
FIG. 32F is a block diagram of a flight management system M2 according to the thirteenth example embodiment.

FIG. 32F is a block diagram of the flight management system M2 in this example. The flight management system M2 includes flying objects F7 and F8 and the regional controller server 90. Since the configurations of the flying objects F7 and F8 are as described above, the description thereof is omitted. The regional controller server 90 includes a memory 91, a communication unit 92, a data acquisition unit 93, and an adjudication unit 94.

The memory 91 stores information of a plurality of space cells C which can be specified by coordinates and reservation states of space cells of a plurality of flying objects. The memory 91 may store the information of the non-flyable area described above as information related to the space cell C. Further, a super priority (That is, higher priority than all other flying objects in region A9) is set as a priority and stored in the memory 91.

The communication unit 92 is an interface through which the regional controller server 90 performs P2P communication with the flying objects F7 and F8. The data acquisition unit 93 is composed of detection units such as sensors, radars, and cameras, and acquires information relating to air traffic such as general flying object within the area A9 (Information on flying object other than F7 and F8).

The adjudication unit 94 executes the adjudication for each space cell C shown in FIG. 32E based on the information acquired from the memory 91 and the communication unit 92. Here, since the super priority is set to the regional controller server 90 as the priority, the regional controller server 90 can effectively control the adjudication result of the space cells for all the flying objects in the area A9.

The flying objects F7 and F8 can participate in the adjudication process by grasping each other's positions and establishing communication with each other by P2P. The regional controller server 90 can also participate in the adjudication process by establishing communication with each other by the flying objects F7, F8 and P2P.

Hereinafter, the adjudication processing of the adjudication unit 94 will be described by way of example. For example, the flying object F7 is a secure flying object selected by an airport controller to permit entry into an airport area. The adjudication unit 94 can perform the above-mentioned adjudication control so that the arrangement of the flying object F7 does not overlap with other flying object. Also, assuming that the flying object F8 is a private flying object requesting the allocation of the space cell $C_{6,8}$, the adjudication unit 94 may disallow the allocation and transmits non-permission information in response to the adjudication allocation. The adjudication is made based on the reservation state of the space cell and information on air traffic.

In either case, the adjudication unit 94 can substantially determine the result of the adjudication on the basis of the priority of the super priority. Therefore, the flying object F7 can land at the airport by moving to the space cell allocated to the flying object F7 in accordance with the adjudication of the regional controller server 90. The flying object F8 may recalculate its flight route based on the non-permission information received from the regional controller server 90 and request allocation of a cell different from $C_{6,8}$ which is outside of the regional controller server's area (e.g., $C_{7,9}$), thus the regional controller server 90 would not be a participant in this cell adjudication. Thus, the regional controller server 90 can prevent the flying object F8 from being moved to the space cell $C_{6,8}$.

It is expected that there will be a large number of flying objects around the airport for takeoff and landing. In such a case, it is possible to efficiently control the adjudication process of the space around the airport by assigning a special priority to the regional controller server 90 managing the airport and allowing it to participate in the distributed system. The regional controller server 90 manages only the local area A9, and the allocation of space cells in the other areas where the density of the flying object is small (e.g., outside A9) is performed by a distributed system among the flying objects as shown in (13-1) and (13-2). Therefore, the calculation amount executed is distributed among the participants in any given adjudication, and it is not necessary to introduce a large-scale computer system as a management server. Such a system is considered to be particularly useful, for example, in a local airport where there is a large difference in the density of flying objects per same volume between the area around the airport and the rest of the region.

Figure 32G:
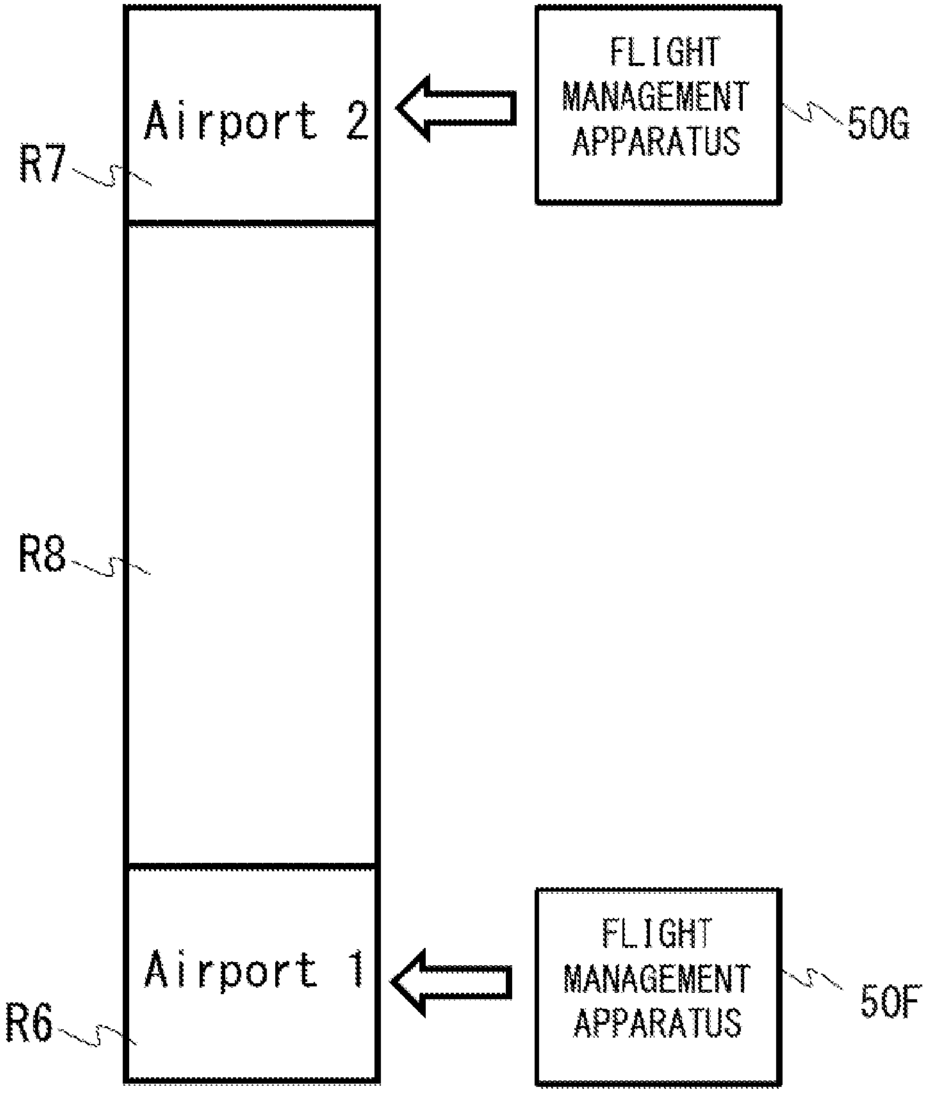
FIG. 32G is a schematic diagram of a system including two spatial regions managed by a plurality of flight management apparatus and another spatial region.

FIG. 32G is an image diagram of a system showing an example of such a situation. The flight management apparatuses 50 F and 50 G have the same configuration as that of the flight management apparatus 50 of the third example embodiment, and manage the spatial regions R6 and R7, respectively. In FIG. 32G, the spatial region R6 includes the airport 1, and the spatial region R7 includes the airport 2. The spatial region R8 is a region connecting the airport 1 (spatial region R6) and the airport 2 (spatial region R7), and the flying object moves from one spatial region R6 or R7 to the other through the spatial region R8.

Here, the flying object 40" further includes the configuration of the flying object 60 according to the seventh example embodiment in addition to the configuration of the flying object 40' shown above. Therefore, in the spatial regions R6 and R7, the flying object 40" flies through these spatial regions by obtaining the permission of the space cell reservation from the flight management apparatuses 50F and 50G. This detail is as described in the third example embodiment. On the other hand, in the spatial region R8, without such control, the flying object constitutes the distributed system as described in the thirteenth example embodiment with the flying object in the vicinity thereof, and flies while executing the adjudication concerning the surrounding space cells.

As described above, the spatial regions managed by the flight management apparatuses 50F and 50G need not be adjacent to each other, but may be separated from each other. In this case, the flight management apparatuses 50F and 50G may or may not be connected. This is because, since the spatial regions R6 and R7 are not adjacent to each other, it is not necessarily necessary for the flight management apparatuses 50 to share information on the flying object 40". The same variation as that described in the seventh example embodiment can be applied to this example.

It should be noted that the following variations may be employed in the thirteenth example embodiment. For example, the data acquisition unit 42 further includes a detection unit such as a sensor, radar, or camera mounted on the flying object 40', and it is also possible to detect that another flying object is less than a predetermined distance (for example, less than 100 m). In this way, when the other flying object is abnormally close to its own flying object, the flying object 40' broadcasts the information to a distributed system (P2P network), which is configured with the other flying object, and a Supernode, and performs an avoidance operation as necessary. This operation may be similar to that which is disclosed in (9-1).

The flying object 40' may broadcast a pulse signal containing its identification information to other flying objects. For example, in FIG. 32D, the flying object F3 broadcasts the pulse signal, and the other flying objects F4-F6 and the server SN detect the pulse signal by their own communication units, thereby detecting the presence of the flying object F3. When the flying object F3 is unable to communicate with other flying object due to the failure of its communication unit or the like, the other flying objects F4-F6 and the server SN detect the unexpected disappearance of the pulse signal and recognize that the flying object F3, which should have been able to detect its existence, has become undetectable (so-called AWOL: absent without leave). Based on this recognition, the flying objects F4-F6 and the server SN issue an alert by broadcasting the information to another flying object that can communicate with each other. It should be noted that the flying objects F4-F6 and the server SN may include the information of the position of the last detected pulse of the flying object F3 in the alert if the position can be specified by the data from their own communication unit or data acquisition unit.

The regional controller server 90 may further include an airport air traffic control unit in addition to its unit configuration shown in FIG. 32F to more effectively control air traffic around the airport. The airport air traffic control unit can analyze the information on the air traffic acquired by the data acquisition part 93 based on the guidelines and rules specific to the airport stored in the memory 91 and update the information of the non-flyable area stored in the memory 91. For example, an airport air traffic control unit can set space cell(s) used by a general flying object as a non-flyable area. In addition, the airport air traffic control unit may acquire weather information from network or a data acquisition unit such as a locally provided camera or sensor, and update the information of the non-flyable area based on the weather information. For example, when a strong wind with a wind velocity equal to or greater than a predetermined value is blowing in the area A9, the airport air traffic control unit can set space cell(s) in a space where the approach to the airport is judged to be dangerous due to the strong wind as a non-flyable area. As a result, the adjudication unit 94 can execute the adjudication operation based on the updated information of the non-flyable area (the space cell is allocated to the flying object), thereby enabling safe and efficient take-off and landing of the flying object. In addition, this method can suppress large-scale calculation for flight control, while it is simple and inexpensive.

Fourteenth Example Embodiment

In the above embodiments, the flight management apparatus grasps the position of the flying object, receives a request for a space cell from the flying object, judges whether to permit or not, and notifies the result to the flying object. In the present embodiment, it is an object to achieve an encrypted spatial representation by using a public key encryption method for communication between a flying object and a flight management apparatus in order to conceal a place where the flying object is flying.

Figure 33A:
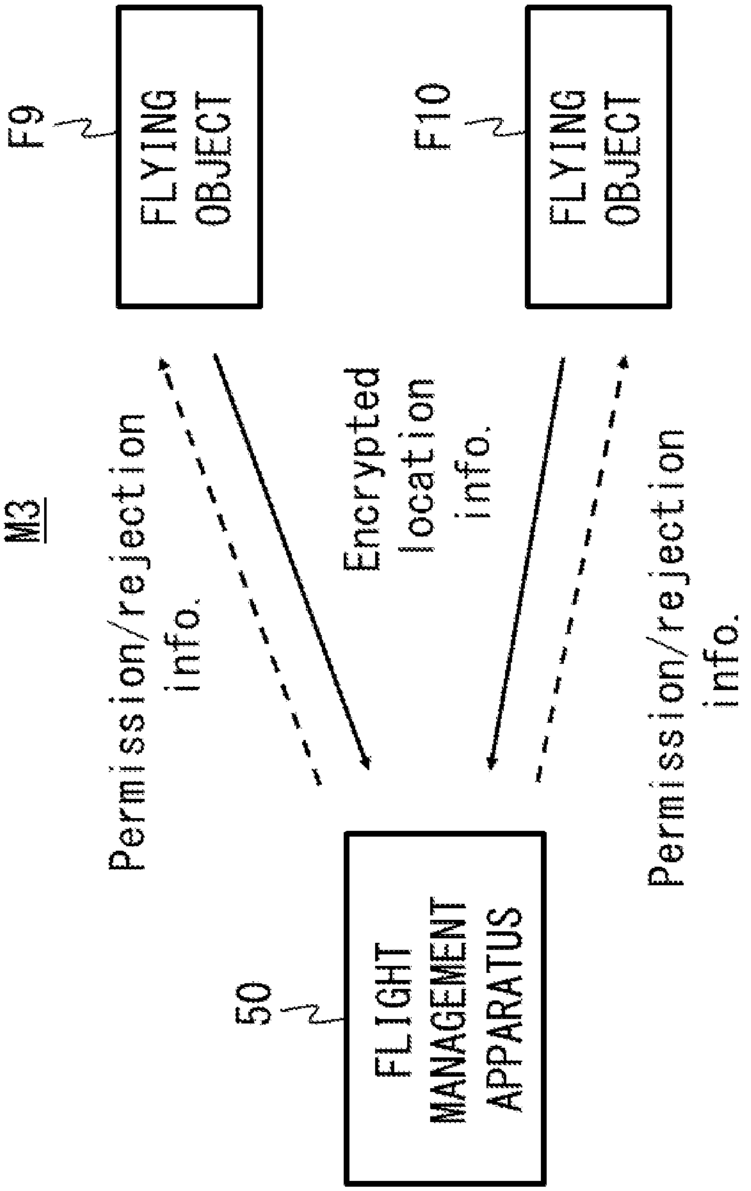
FIG. 33A is a block diagram of a flight management system M3 according to a fourteenth example embodiment.

FIG. 33A is a block diagram of a flight management system M3. The flight management system M3 includes flying objects F9 and F10 and the flight management apparatus 50. When the flying objects F9 and F10 transmit a request for permission to move to the selected space cell to the flight management apparatus 50, the flying objects F9 and F10 transmit, in an encrypted state, position information in the request indicating the position information of the space cell C in which they are present and the space cell desired to move. The flight management apparatus 50 receives the encrypted position information, determines whether a specific space cell to be a request object is already reserved, and transmits permission or rejection information for the request to the flying objects F9 and F10.

Figure 33B:
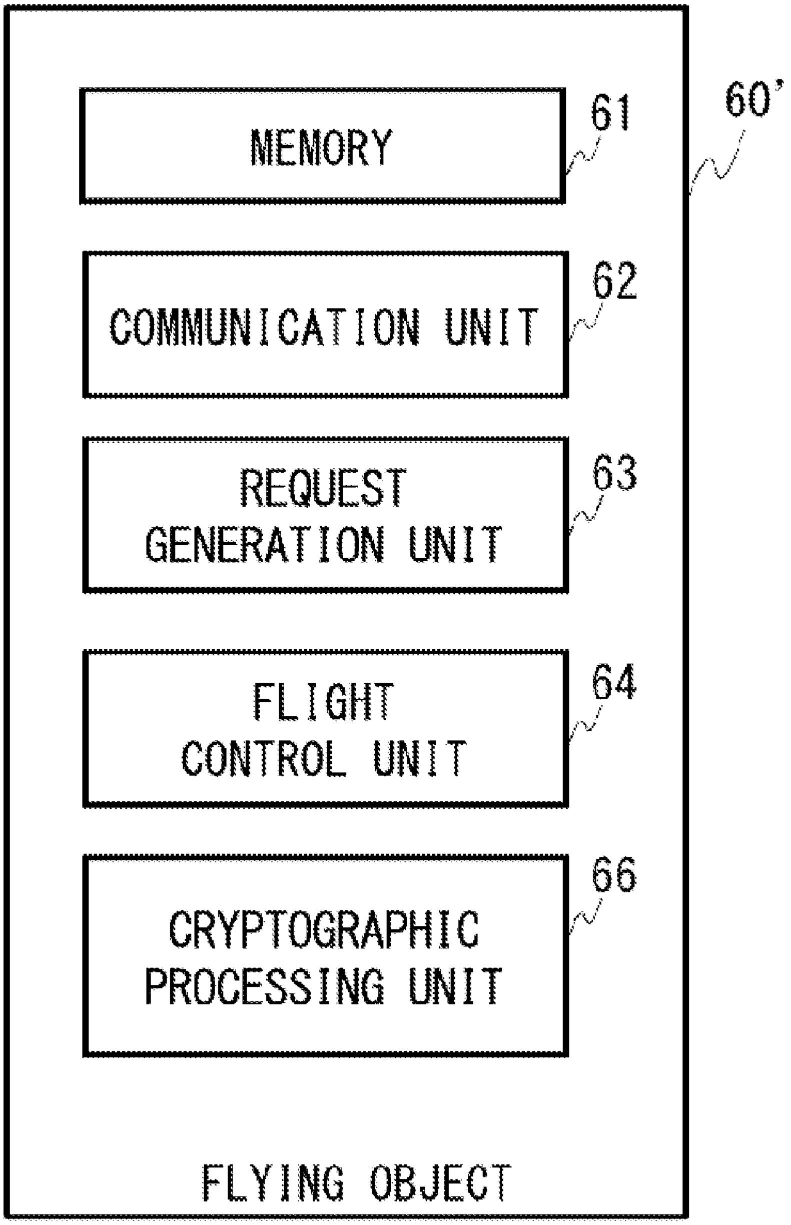
FIG. 33B is a block diagram of a flying object 60' according to the fourteenth example embodiment.

FIG. 33B shows a configuration of the flying object 60' constituting the flying objects F9 and F10. The flying object 60' further includes a cryptographic processing unit 66 as compared with the configuration of the flying object 60 shown in the third embodiment. The cryptographic processing unit 66 encrypts the current position information of the flying object 60' and the position information requested to be moved with the public key obtained in advance, and the communication unit 62 transmits the encrypted position information to the flight management apparatus 50. When receiving the position information from the flight management apparatus 50, the cryptographic processing unit 66 decrypts the information using the secret key obtained in advance. The public key and private key information are stored in the memory 61.

The configuration of the flight control apparatus 50 is roughly as described in the third embodiment. However, the flight management apparatus 50 stores, in the memory 51, information in which the position coordinates are encrypted, instead of information on the actual position coordinates of cells, as information on the space cell C, the reservation state of the space cell, and the flight route of each flying object, and the flight management apparatus 50 executes the processing described in the third embodiment using the information. That is, the flight management apparatus 50 executes processing using information about the encrypted space, not the real space.

Processing performed by the flight management system M3 will be described below. In the following description, the detailed description is as described in the third embodiment, and accordingly, the description is omitted. First, the same public key and private key are distributed to all the flying objects to be managed in advance. The public and private keys are generated by the key generation server and stored in a secure place.

Each flying object 60' encrypts the current position information and the position information desired to be moved by the encryption processing unit 66 with the public key, and transmits the encrypted information to the flight management apparatus 50 by including it in the first request of the cell reservation. The flight management apparatus 50 receives the request, refers to the reservation state stored in the memory 51 by using the encrypted information included in the request as it is, and determines whether a specific space cell related to the request has already been reserved.

Figure 33C:
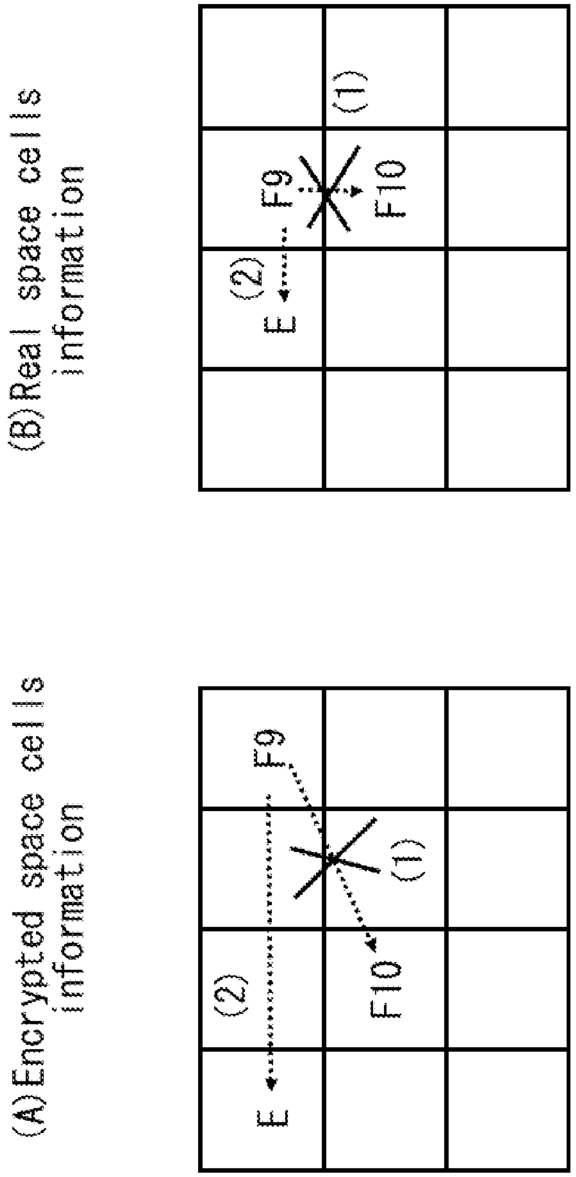
FIG. 33C is a schematic diagram illustrating an example of state of space cells in encrypted space and real space according to the fourteenth example embodiment.

FIG. 33C is a schematic diagram showing an example of a state of space cells in an encrypted space and a real space. In the figure, (A) shows the state of the space cells in the encrypted space, and (B) shows the state of the space cells in the real space. Each of the squares in (A) and (B) represents one space cell, and the space cells labeled F9-F10 represent the cells in which each flying object is currently located. A space cell denoted by E indicates an unreserved cell.

(1) First, the flying object F9 encrypts and transmits the information of the space cell at its current position and the space cell desired to be moved in order to move downward on the real space from the space cell at the current position. The flight management apparatus 50 determines the reservation state of the space cell related to the request based on the encrypted information.

As can be seen from FIG. 33C, the flight management apparatus 50 cannot understand where the requested space cell is in the real space. However, the flight management apparatus 50 can determine whether the requested cell has already been reserved by using the information stored in the memory 51. As shown in the figure, the determination unit 55 determines that the requested cell has already been reserved and occupied by the F10. Therefore, the permission unit 56 does not permit the movement of the flying object F9 to the space cell, and uses the communication unit 54 to transmit the rejection information for rejecting the movement to F9.

When receiving the rejection information by the communication unit 62, the flying object F9 generates a second request (second request) for obtaining permission to move to another space cell selected by the request generation unit 63 based on a predetermined algorithm. The communication unit 62 transmits this request to the flight management apparatus 50.

(2) The communication unit 54 of the flight management apparatus 50 receives the second request. Based on the request, the determination unit 55 of the flight management apparatus 50 determines whether the requested space cell is already reserved by using the reservation state stored in the memory 51. Here, since the requested space cell is "E", the permission unit 56 permits the movement of the flying object 60 to a new specific space cell. The permission unit 56 uses the communication unit 54 to transmit permission information for permitting movement to the flying object F9, and the flying object F9 moves toward the space cell based on the permission information.

Note that, when the flight management apparatus 50 transmits the rejection information to reject the movement to F9, the determination unit 55 may or may not specify a candidate of a space cell (for example, a cell of "E") in which the flying object F9 moves next instead, and transmit it to the flying object F9. As the flight management apparatus 50 may not know which space cells are adjacent to the space cell under allocation request, depending on how the encrypted space is provisioned, the flight management apparatus 50 may not have any knowledge as to a potential candidate space cell alternate to the one requested. Therefore, the flight management apparatus 50 does not necessarily need to specify the candidate of the space cell to be moved next. The coordinate information of the space cell transmitted at this time is in an encrypted state, and the flying object F9 receiving the information decodes the information by the cryptographic processing unit 66 to grasp the position of the space cell presented by the flight management apparatus 50 in the real space. The flying object F9 performs the same processing as described in the third embodiment. Also, when the position information of the flight route is transmitted and received between the flight management apparatus 50 and the flying object 60, similarly to the case of the position information of the space cell, the flying object 60 can grasp the flight route in the real space by using the public key cryptography, and the flight management apparatus 50 can be set to grasp the flight route in the encrypted space.

In the fourteenth Example Embodiment, since the position information is encrypted and decrypted in this way, even if the flight management apparatus 50 is hacked, it becomes difficult for an attacker to grasp the position information of the flying object managed by the flight management apparatus 50. Therefore, more favorable effects can be obtained from the viewpoints of personal information protection and cybersecurity. It should be noted that a server (not shown), which is a reliable entity that knows the secret key, may be further provided for the administrator so that the actual position of each flying object can be decrypted using the secret key.

It should be noted that the present disclosure is not limited to the above-described example embodiments, and may be modified as appropriate without departing from the spirit of the invention. For example, the priority of the flying objects is not limited to two levels, but may be set to three or more levels. As an example, in the case of the priority level three, emergency vehicles or general flying objects having a battery residual capacity less than the first threshold value th1 may be set as the flying objects having the 1st priority, general flying objects having a battery residual capacity less than the second threshold value th2 (>th1) may be set as the flying objects having the 2nd priority, and general flying objects having a battery residual capacity greater than or equal to the second threshold value th2 may be set as the flying objects having the lowest priority.

In the above example embodiments, GPS information, radar information, identification information, engine status, battery remaining capacity, weather information (information on rainfall, wind velocity, wind direction, atmospheric pressure, etc.), maintenance status, driver's license information, and speed information are enumerated as data that can be acquired or stored by the flying object. However, the flying object may acquire other information such as acceleration data by a sensor. The flying object may also store flight rules. Further, by performing V2V (Vehicle-to-Vehicle) communication between the flying objects, it may be detected that the flying objects are close to each other in the above-described example embodiments.

In the above example embodiments, as data stored in the memory of the flight management apparatus, information of the space cells, information on the reservation states (traffic information), and information on the non-flyable area are enumerated. However, in addition to this, the present time, date, weather information, and rules for flight management may be stored in addition to other data. The memory is provided outside the flight management apparatus as a database, and the flight management apparatus may acquire data by communicating with the database. The variation of the flight management apparatus described above can also be applied to the regional controller server.

Figure 34:
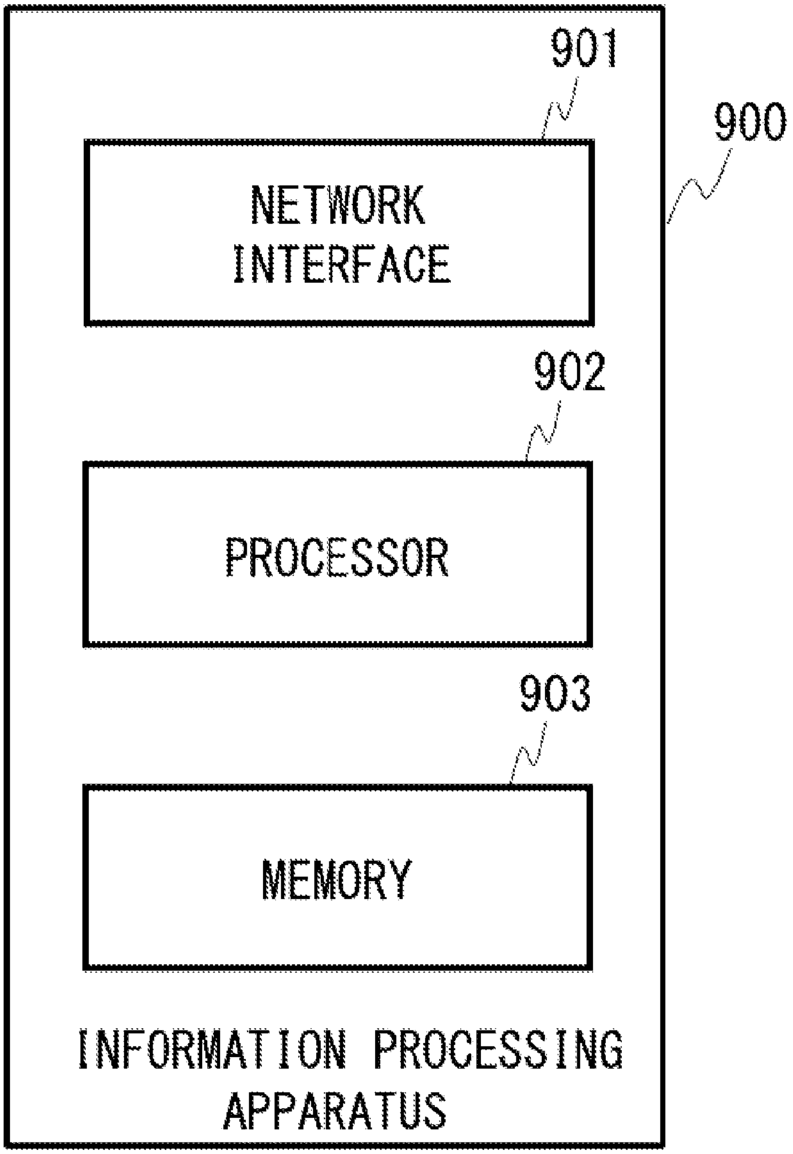
FIG. 34 is a block diagram showing an example of a hardware configuration of a flight management apparatus, a flying object or a regional controller server.

FIG. 34 is a block diagram showing an example of a hardware configuration of the flight management apparatus, the flying object or the regional controller server shown in an arbitrary example embodiment. Referring to FIG. 34, an information processing apparatus 900, which is a generic term for the above-described flight management apparatus, flying object or the regional controller server, includes a network interface 901, a processor 902, and a memory 903. The network interface 901 can transmit and receive data to and from other devices by wireless communication or in the case of the flight management apparatus, the regional controller server or external servers (such as weather, traffic, etc.), the network interface 901 can do this by wired communication.

The processor 902 reads the software (computer program) from the memory 903 and executes it to perform the processing of the flight management apparatus, the flying object or the regional controller server described in the above example embodiments. The processor 902 may be, for example, a microprocessor, an MPU (Micro-Processing Unit), or a CPU (Central Processing Unit). The processor 902 may include a plurality of processors.

The memory 903 comprises a combination of a volatile memory and a nonvolatile memory. The memory 903 may include storage located away from processor 902. In this case, the processor 902 may access the memory 903 via an I/O (Input/Output) interface, which is not shown.

In the example of FIG. 34, the memory 903 is used to store a group of software modules. The processor 902 reads the group of software modules from the memory 903 and executes it, thereby performing the processing described in the above example embodiments.

As described with reference to FIG. 34, each of the processors of the flight management apparatus, the flying object or the regional controller server in the above-described example embodiments executes one or more programs including a group of instructions for causing a computer to perform the above-described algorithms. By this processing, the processing described in the above example embodiments can be realized.

In the above-described examples, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Compact Disc Read Only Memory), CD-R (Compact Disc Recordable), CD-R/W (Compact Disc Rewritable), and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

While the present disclosure has been described above with reference to example embodiments, the present disclosure is not limited by the foregoing description. The structure and details of the disclosure may be modified in a variety of ways as will be understood by those skilled in the art within the scope of the disclosure.

This application is based upon and claims the benefit of priority from international patent application PCT/JP2020/040323, filed on Oct. 27, 2020, the disclosure of which is incorporated herein in its entirety by reference.

REFERENCE SIGNS LIST

10 flight management apparatus
11 memory
12 determination unit
13 permission unit
flying object
21 request generation unit
22 transmission unit
23 flight control unit
30 flight management apparatus
31 memory
32 data acquisition unit
33 route generation unit
34 transmission unit
40' flying object
41 memory
42 data acquisition unit
43 route generation unit
44 transmission unit
45 flight control unit
46 communication unit
47 adjudication unit
50 flight management apparatus
51 memory
52 data acquisition unit
53 route generation unit
54 communication unit
55 determination unit
56 permission unit
57 traffic management unit
60' flying object
61 memory
62 communication unit
63 request generation unit
64 flight control unit
65 relinquishing unit
66 cryptographic processing unit
70 flight management apparatus
71 memory
72 data acquisition unit
73 emergency management unit
74 communication unit
80 flying object
81 memory
82 data acquisition unit
83 emergency detection unit
84 selection unit
85 communication unit
86 flight control unit
90 regional controller server
91 memory
92 communication unit
93 data acquisition unit
94 adjudication unit
900 information processing apparatus
901 network interface
902 processor
903 memory

The invention claimed is:

1. A flight management apparatus comprising:
at least one memory configured to store instructions; and
at least one processor configured to execute the instructions to:
receive, from one of a plurality of flying objects, a first request for permission to move to a specific space cell in a space on a flight route of the one flying object determined by the one flying object;
determine whether the specific space cell is already reserved for another flying object of the plurality of flying objects based on a reservation state about the specific space cell, when the at least one processor receives the first request;
permit movement to the specific space cell of the one flying object when the at least one processor determines the specific space cell is not reserved for the another flying object, and not to permit the movement to the specific space cell of the one flying object when the at least one processor determines the specific space cell is already reserved for the another flying object;
cause a transmitter to transmit its own vote with a predetermined weighting for the specific space cell in a space to other flying objects; and
execute an adjudication to determine which one of the flying objects is allocated the specific space cell.

2. The flight management apparatus according to claim 1, wherein the at least one processor is further configured to:
transmit, to the one flying object, non-permission information indicating that the at least one processor does not permit the movement to the specific space cell of the one flying object when the at least one processor does not permit it;
determine whether another space cell in the space other than the specific space cell is already reserved for another flying object based on a reservation state of another space cell, when the at least one processor receives a second request from the one flying object requesting permission to move to another space cell after the at least one processor transmits the non-permission information; and permit the movement to another space cell of the one flying object when the at least one processor determines another space cell is not reserved for another flying object, and not to permit the movement to another space cell of the one flying object when the at least one processor determines another space cell is already reserved for another flying object.

3. The flight management apparatus according to claim 1, wherein;

the at least one memory is further configured to store reservation states of the plurality of flying objects related to a plurality of space cells into which the space is divided; and at least one processor is further configured to cancel the reservation state of the specific space cell related to a third request, being for canceling the reservation of the specific space cell passed by the one flying object, when the at least one processor receives the third request from the one flying object.

4. The flight management apparatus according to claim 1, wherein:

the at least one memory is further configured to store reservation states of a plurality of space cells into which the space is divided; and the at least one processor is further configured to control the plurality of flying objects to fly two-dimensionally in a plane constituted of space cells of a same height to manage traffic of the plurality of flying objects in the plane.

5. The flight management apparatus according to claim 4, wherein the at least one processor is further configured to:

permit movement of the plurality of flying objects in a predetermined axial direction in the plane, and not to permit movement in any other direction.

6. The flight management apparatus according to claim 5, wherein the at least one processor is further configured to:

set a plurality of lanes for moving the flying objects in the predetermined axial direction in the plane, reference speeds of the flying object being different from each other in the plurality of lanes.

7. The flight management apparatus according to claim 5, wherein the at least one processor is further configured to:

set a plurality of lanes for moving the flying objects in the predetermined axial direction in the plane, and;

determine moving direction of the lanes by using at least one of time information and date information.

8. The flight management apparatus according to claim 1, wherein:

the at least one memory is further configured to store reservation states of a plurality of space cells into which the space is divided; and the at least one processor is further configured to change size of space cells according to at least one of locations where the plurality of space cells are located or time information.

9. The flight management apparatus according to claim 1, wherein the at least one memory is further configured to store reservation states of a plurality of space cells into which the space is divided; and wherein predetermined priority is set to the one flying object, and the at least one processor is further configured to permit movement to a first space cell or movement in a predetermined direction from a second space cell to the one flying object having high priority, and not to permit the movement to the one flying object having low priority.

10. The flight management apparatus according to claim 1, wherein:

the at least one memory is further configured to store reservation states of a plurality of space cells into which the space is divided; and the at least one processor is further configured to switch, according to predetermined conditions, whether or not the one flying object can move to a predetermined space cell constituting an area where weather unsuitable for flight has occurred, or to a predetermined space cell in which density of flying objects in surrounding space cells is equal to or greater than a threshold value.

11. The flight management apparatus according to claim 1, wherein;

the at least one memory is further configured to store reservation states of a plurality of space cells into which the space is divided; and wherein the at least one processor is further configured to switch propriety of movement to a space cell above the one flying object according to at least one of real-time data of the one flying object and a state of a driver's license relating to the one flying object.

12. The flight management apparatus according to claim 1, wherein;

the at least one memory is further configured to store reservation states of a plurality of space cells into which the space is divided; and wherein the at least one processor is further configured to reserve an adjacent space cell adjacent to a space cell in which the one flying object is located and permit the one flying object to move to the adjacent space cell, when receiving an emergency request from the one flying object.

13. The flight management apparatus according to claim 1, wherein the at least one processor is further configured to set each space cell dividing the space in a shape of a regular hexagonal column.

14. A flying object comprising:

at least one memory configured to store instructions; and at least one processor configured to execute the instructions to:

determine own flight route; and generate a first request for permission to move to a specific space cell on the flight route in a space;

transmit the first request to a flight management apparatus;

move an airframe to the specific space cell when the specific space cell is not reserved by another flying object and the at least one processor receives permission information permitting movement to the specific space cell from the flight management apparatus, and not to move the airframe to the specific space cell when the specific space cell is already reserved by the another flying object and the at least one processor receives non-permission information not permitting the movement to the specific space cell from the flight management apparatus;

update the flight route based on the non-permission information received from the flight management apparatus;

cause a transmitter to transmit its own vote with a predetermined weighting for the specific space cell in a space to other flying objects; and execute an adjudication to determine which one of the flying objects is allocated the specific space cell.

15. The flying object according to claim 14, wherein the at least one processor is further configured to:

generate a second request for permission to move to another space cell other than the specific space cell, when the at least one processor receives the non-permission information; and transmit the second request to the flight management apparatus.

16. The flying object according to claim 15, wherein the at least one processor is further configured to determine another space cell by using at least one of positional relationships between a present position and a destination, weather information, a remaining amount of resources necessary for the flight of the flying object, and speed of the flying object.

17. The flying object according to claim 14, wherein the at least one processor is further configured to:

generate a third request for canceling reservation of a space cell passed by the flying object; and transmit the third request to the flight management apparatus.

18. The flying object according to claim 14, wherein the at least one processor is further configured to:

detect an emergency situation in the flying object;

generate an emergency request for permission to move to an adjacent space cell adjacent to a space cell where the flying object is located, when the at least one processor detects the emergency situation; and transmit the emergency request to the flight management apparatus.

19. The flying object according to claim 14, wherein the at least one processor is further configured to move the airframe along the determined flight route through the space cell where the movement is permitted by the permission information.

20. A flight management method comprising:

receiving, from one of a plurality of flying objects, a request for permission to move to a specific space cell in a space on a flight route of the one flying object determined by the one flying object;

determining whether the specific space cell is already reserved for another flying object of the plurality of flying objects based on a reservation state about the specific space cell;

permitting movement to the specific space cell of the one flying object when determining the specific space cell is not reserved for another flying object and not permitting the movement to the specific space cell of the one flying object when determining the specific space cell is already reserved for another flying object;

causing a transmitter to transmit its own vote with a predetermined weighting for the specific space cell in the space to other flying objects; and executing an adjudication to determine which one of the flying objects is allocated the specific space cell.

* * * * *